Nov. 3, 1953  M. DEMEULENAERE  2,657,854
CASH REGISTER
Filed Aug. 7, 1947   21 Sheets-Sheet 1

Inventor
Marcel Demeulenaere
By Strauch & Hoffman
Attorneys

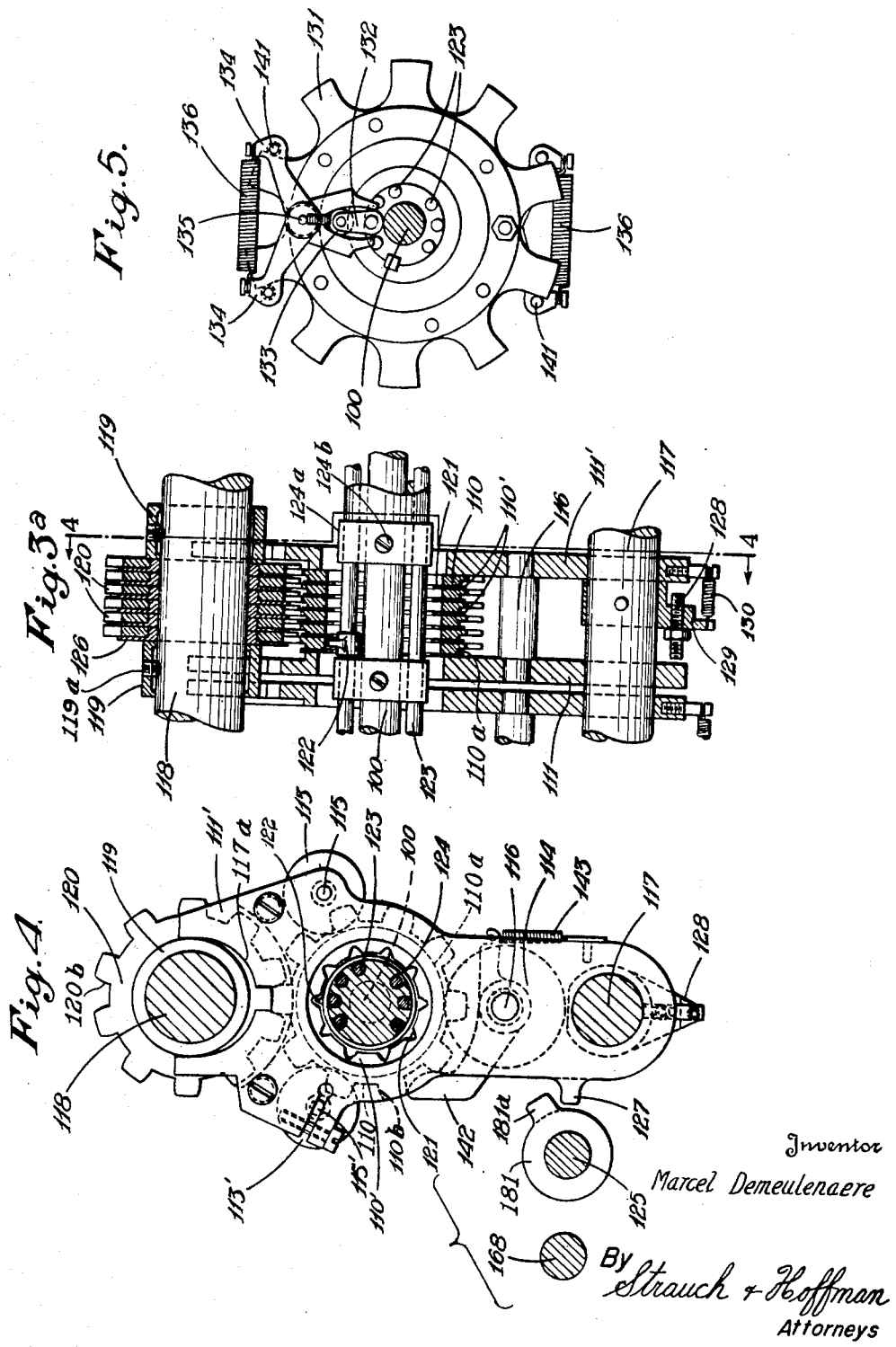

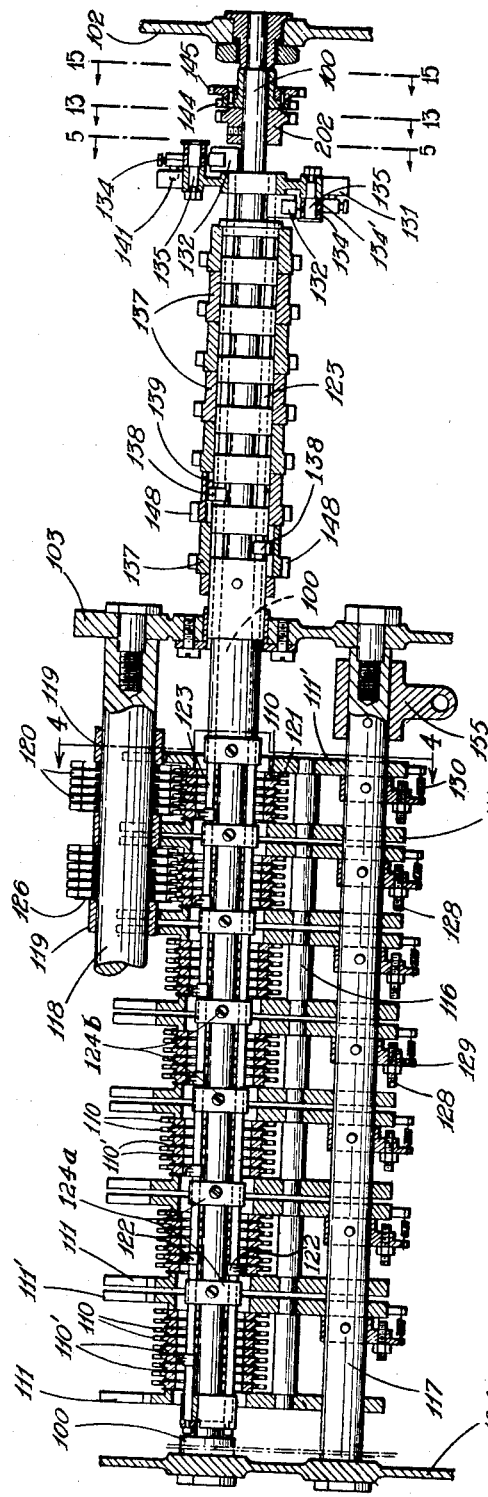

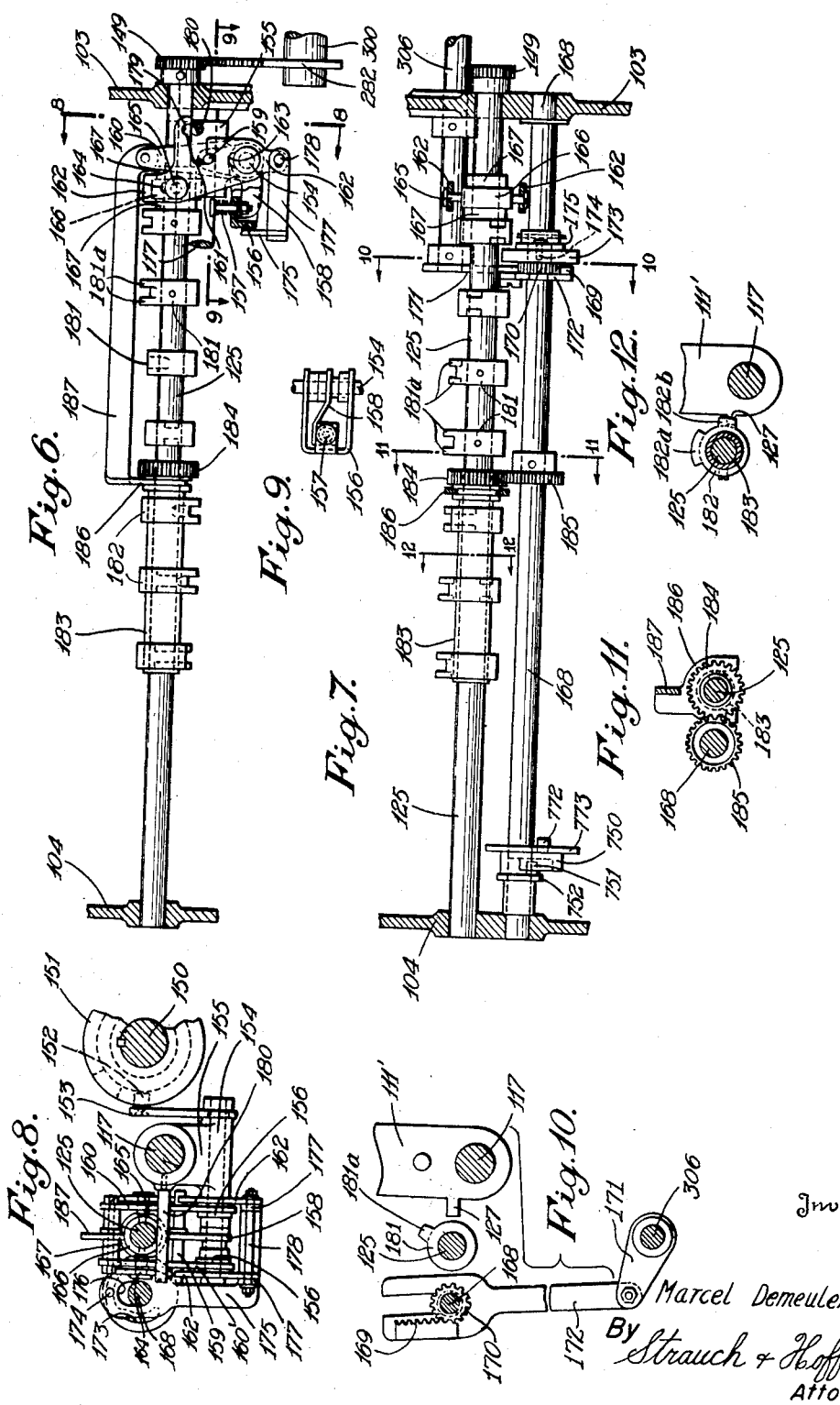

Nov. 3, 1953  M. DEMEULENAERE  2,657,854
CASH REGISTER

Filed Aug. 7, 1947

Inventor
Marcel Demeulenaere
By Strauch & Hoffman
Attorneys

Nov. 3, 1953        M. DEMEULENAERE        2,657,854
                    CASH REGISTER
Filed Aug. 7, 1947                         21 Sheets-Sheet 6
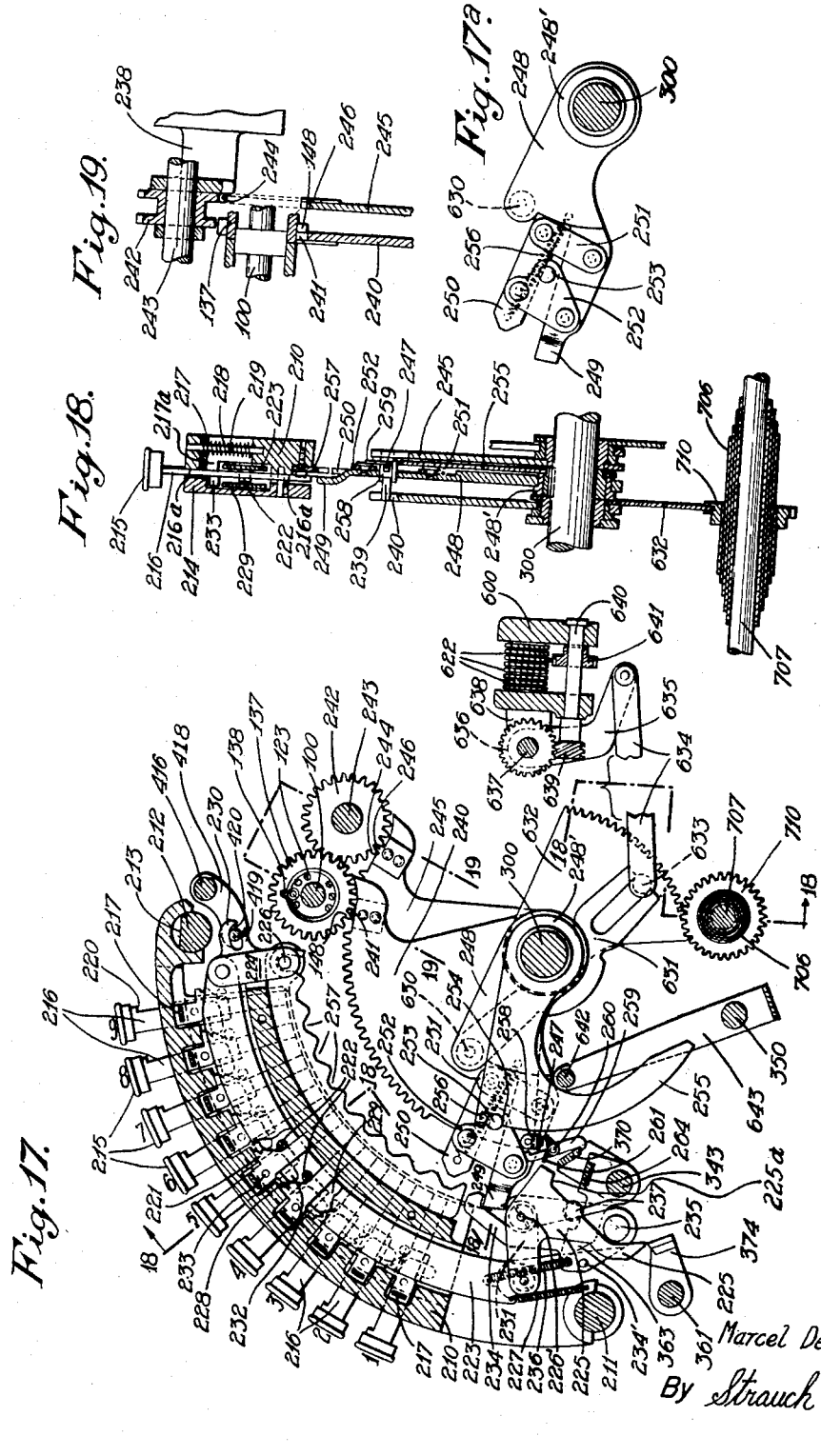
Inventor
Marcel Demeulenaere
By Strauch & Hoffman
Attorneys Nov. 3, 1953

M. DEMEULENAERE 2,657,854

CASH REGISTER

Filed Aug. 7, 1947

Inventor

Marcel Demeulenaere

By Strauch & Hoffman

Attorneys

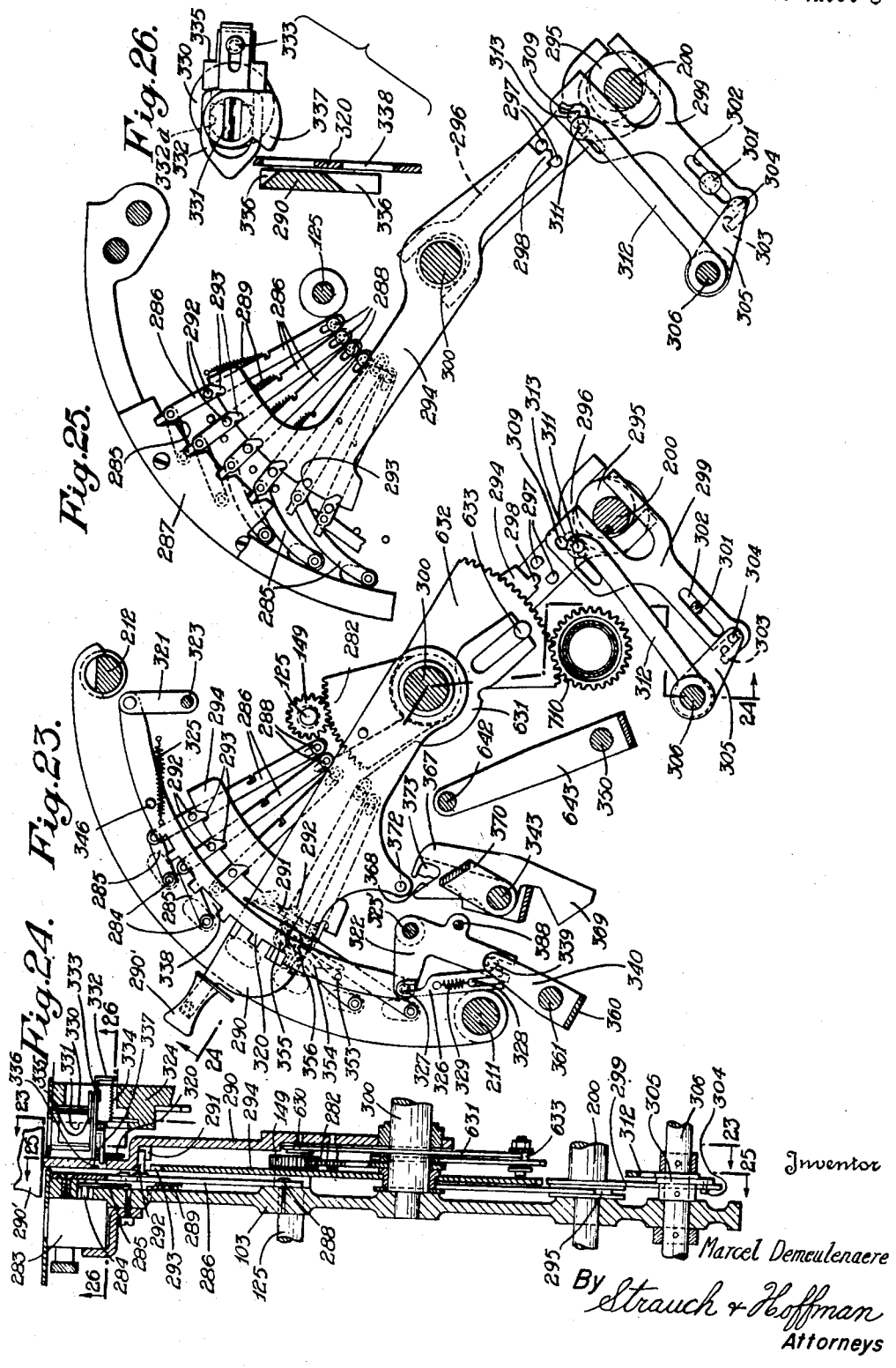

Nov. 3, 1953  M. DEMEULENAERE  2,657,854
CASH REGISTER
Filed Aug. 7, 1947  21 Sheets-Sheet 9
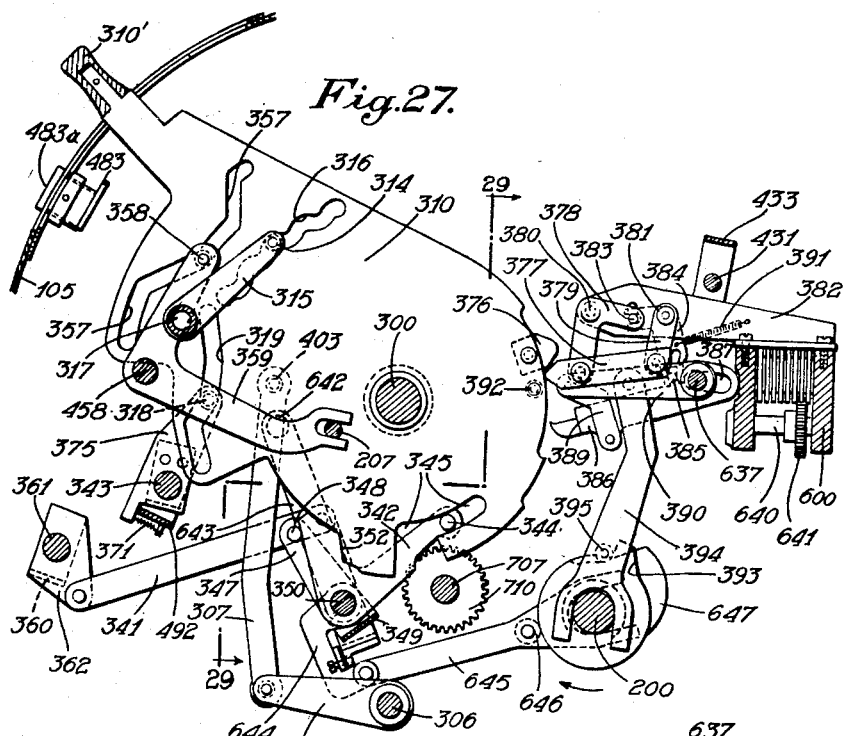
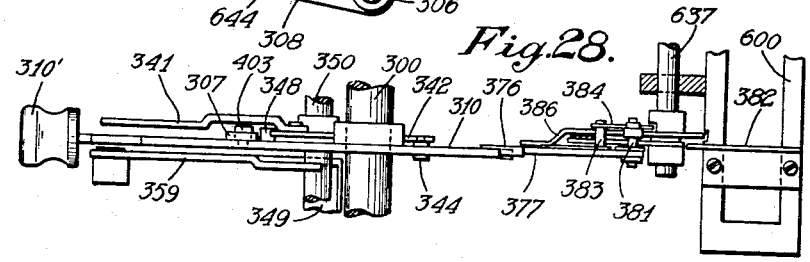
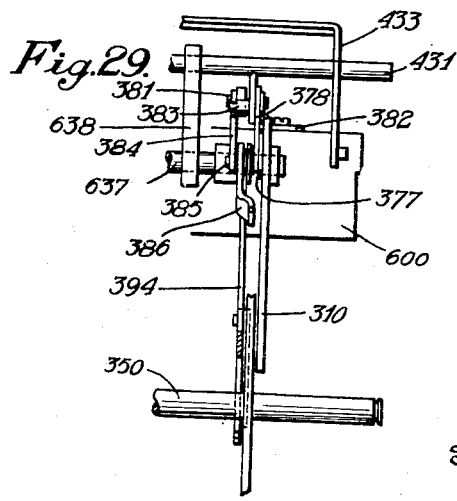
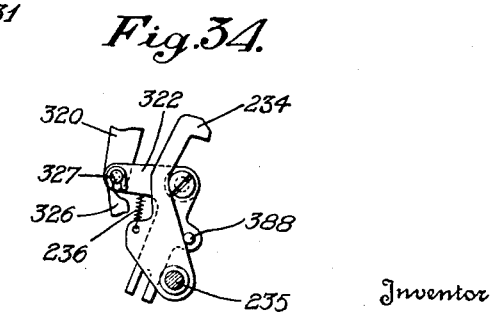
Inventor
Marcel Demeulenaere
By Strauch + Hoffman
Attorneys Nov. 3, 1953
M. DEMEULENAERE
2,657,854
CASH REGISTER
Filed Aug. 7, 1947
21 Sheets-Sheet 10
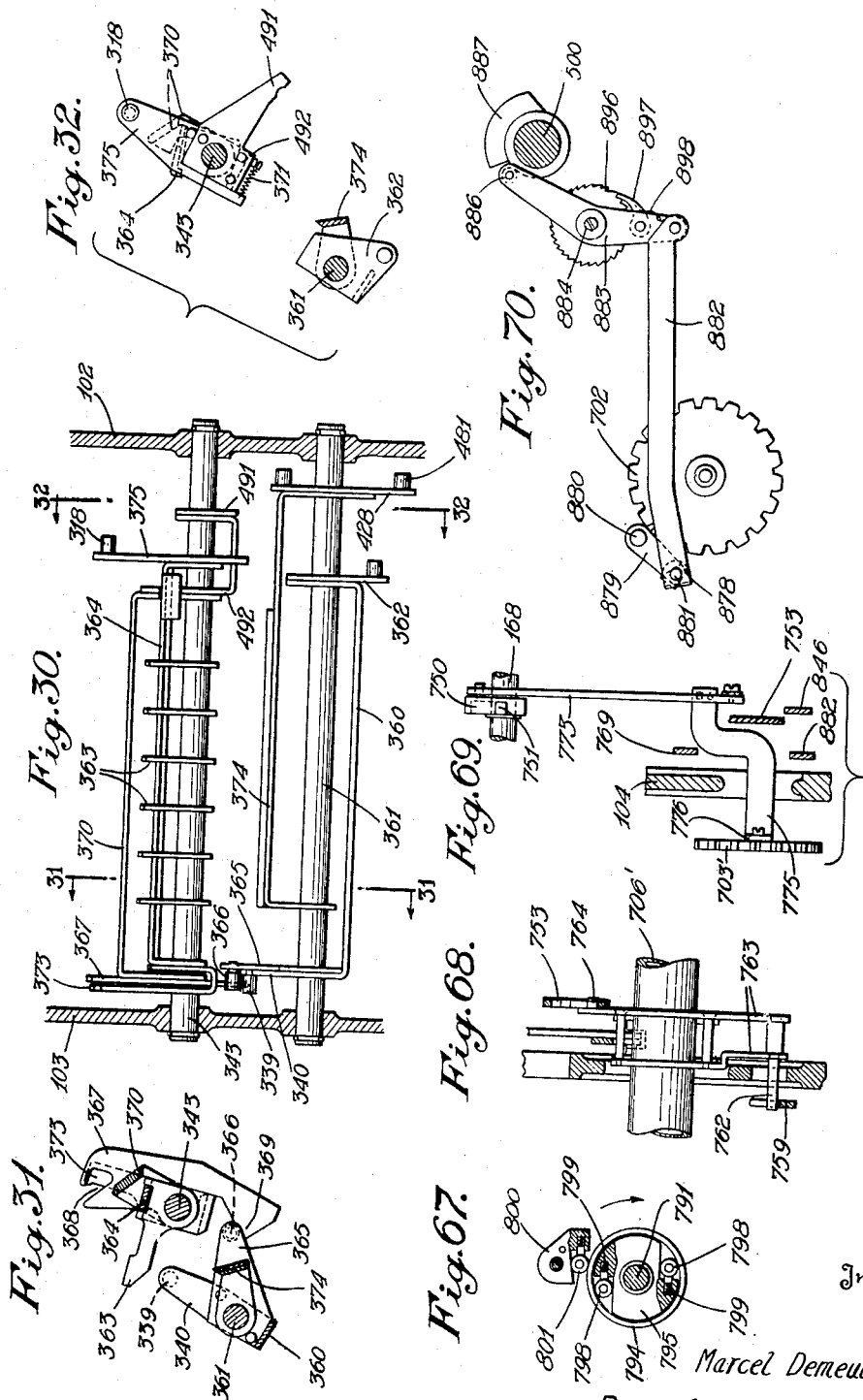
Inventor
Marcel Demeulenaere
By Strauch + Hoffman
Attorneys

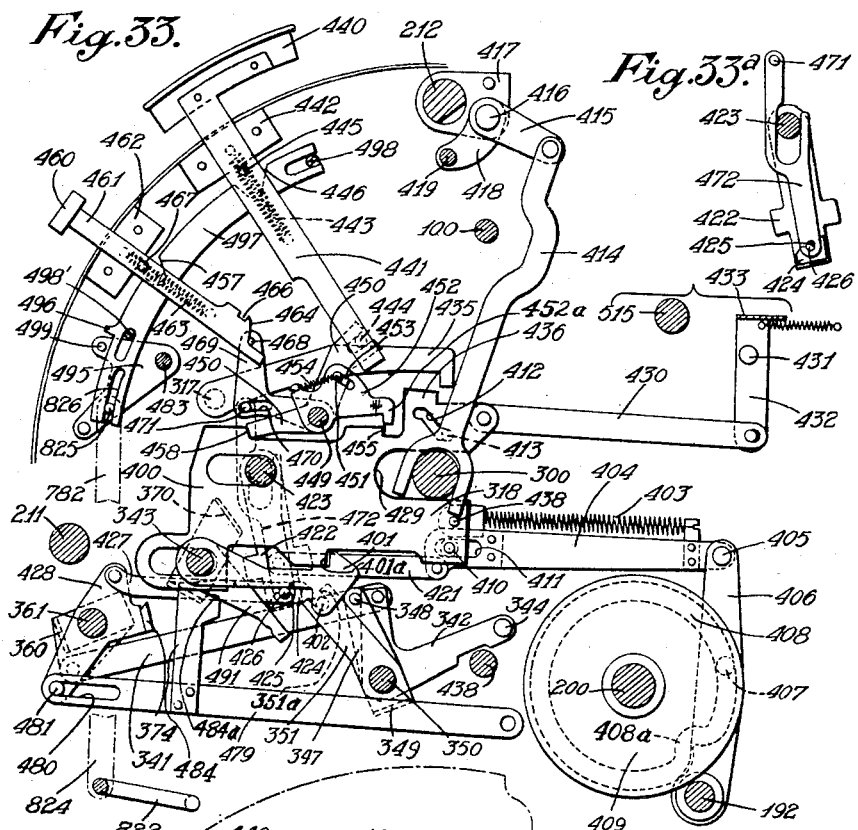
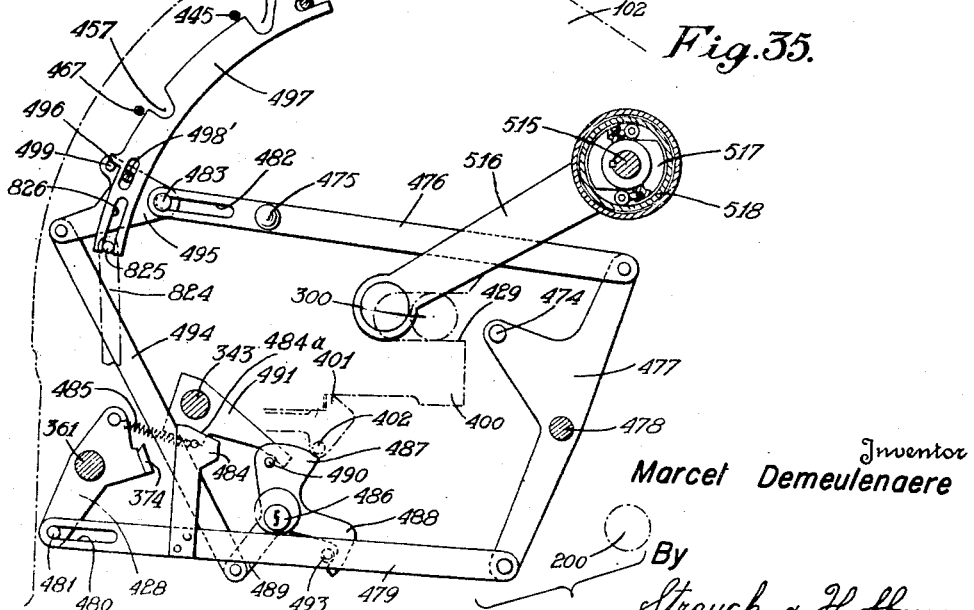

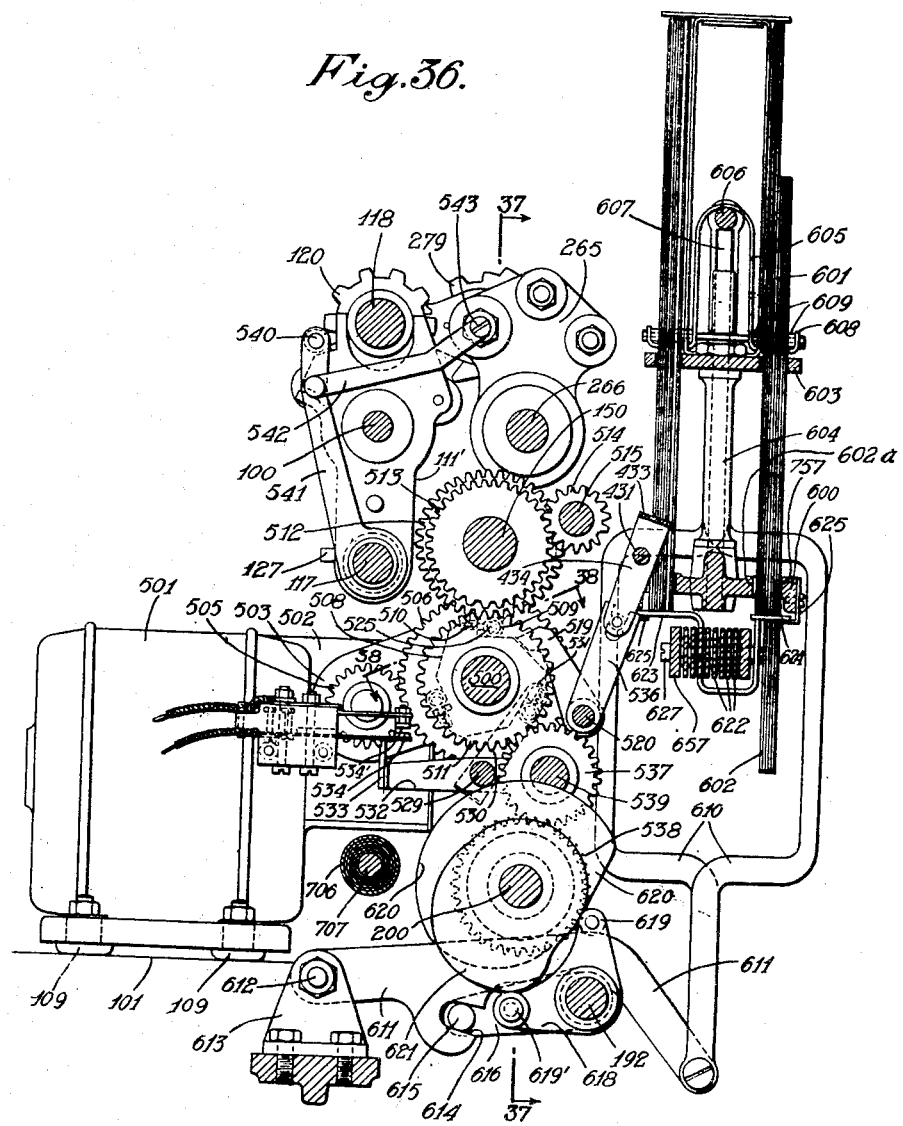

Nov. 3, 1953         M. DEMEULENAERE         2,657,854
                       CASH REGISTER
Filed Aug. 7, 1947                          21 Sheets-Sheet 13
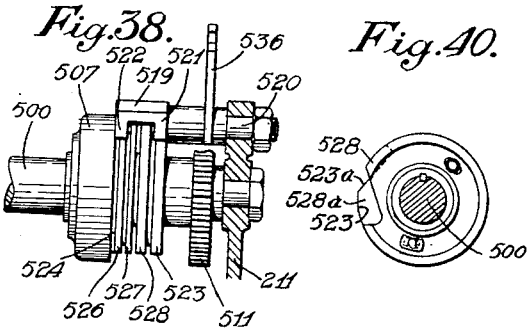
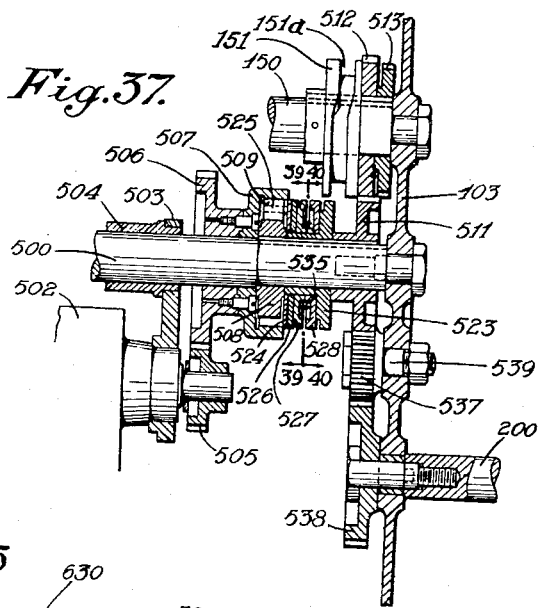
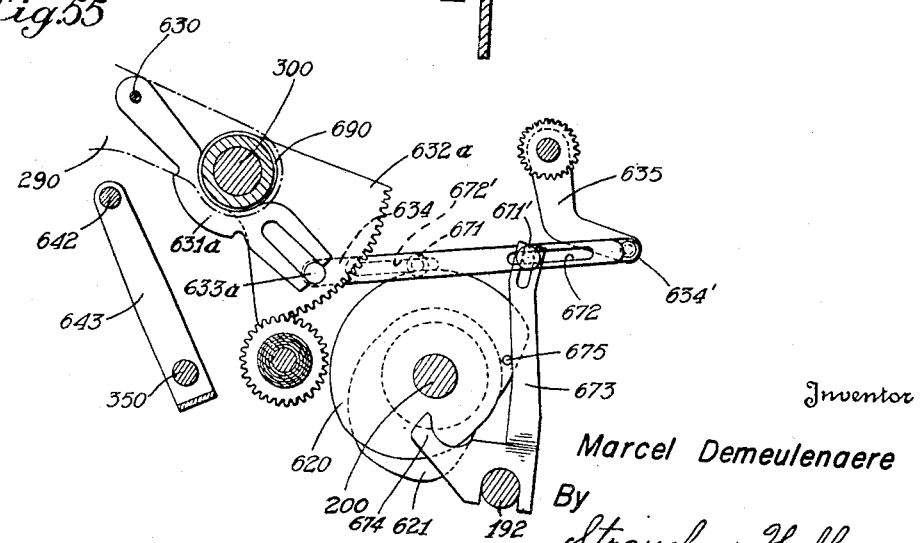
Inventor
Marcel Demeulenaere
By
Strauch & Hoffman
Attorneys Nov. 3, 1953
M. DEMEULENAERE
2,657,854
CASH REGISTER
Filed Aug. 7, 1947
21 Sheets-Sheet 14
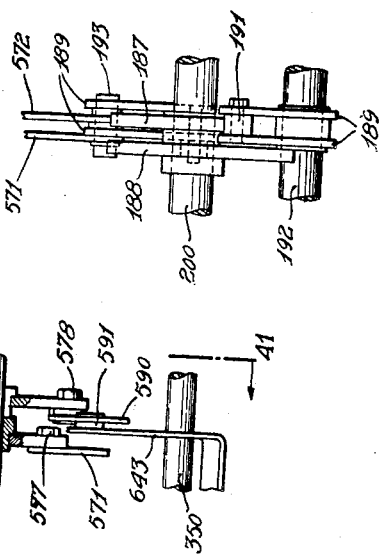
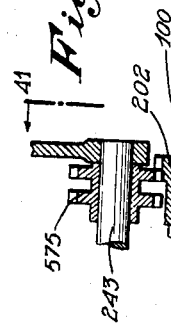
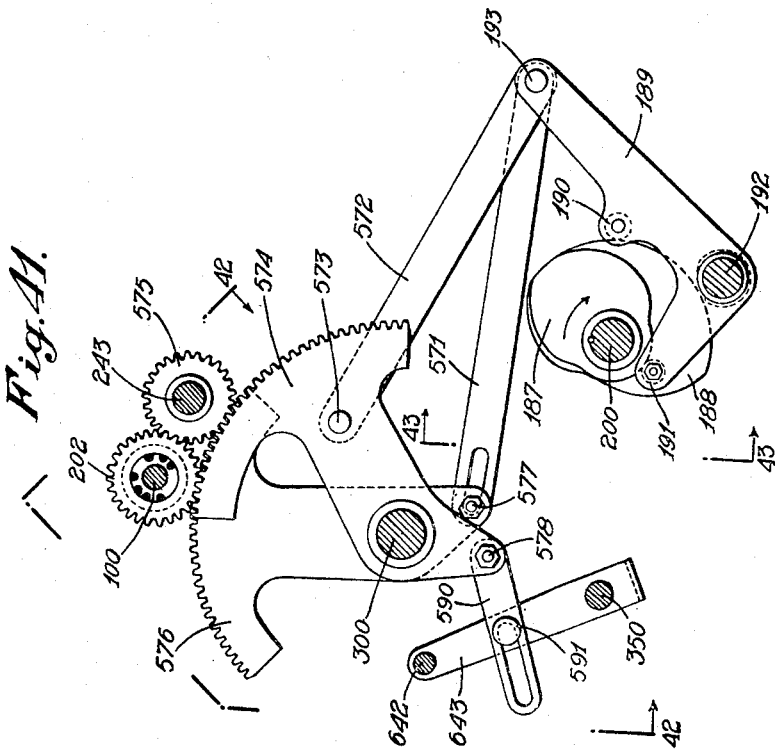
Inventor
Marcel Demeulenaere
By Strauch & Hoffman
Attorneys Nov. 3, 1953 M. DEMEULENAERE 2,657,854
CASH REGISTER
Filed Aug. 7, 1947 21 Sheets-Sheet 15

Inventor
Marcel Demeulenaere
By Strauch & Hoffman
Attorneys

Nov. 3, 1953         M. DEMEULENAERE         2,657,854
                        CASH REGISTER
Filed Aug. 7, 1947                    21 Sheets-Sheet 16
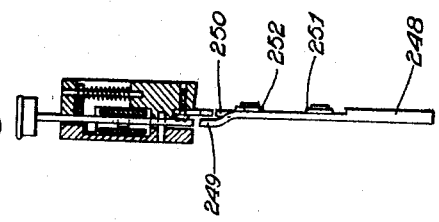
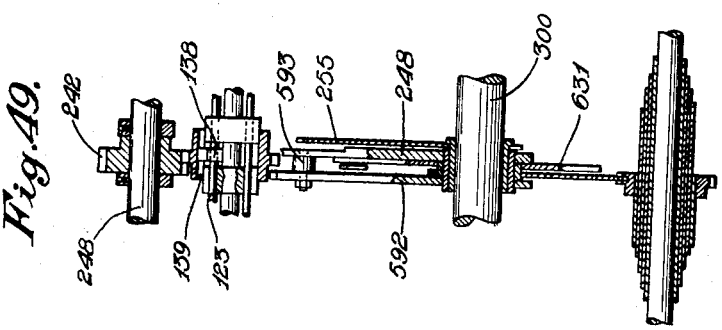
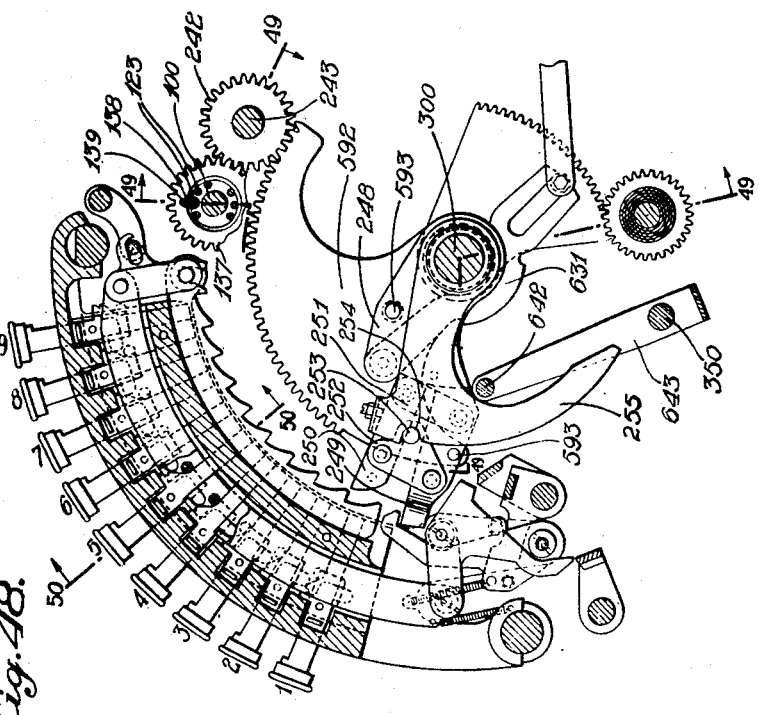
Inventor
Marcel Demeulenaere
By Strauch & Hoffman
Attorneys

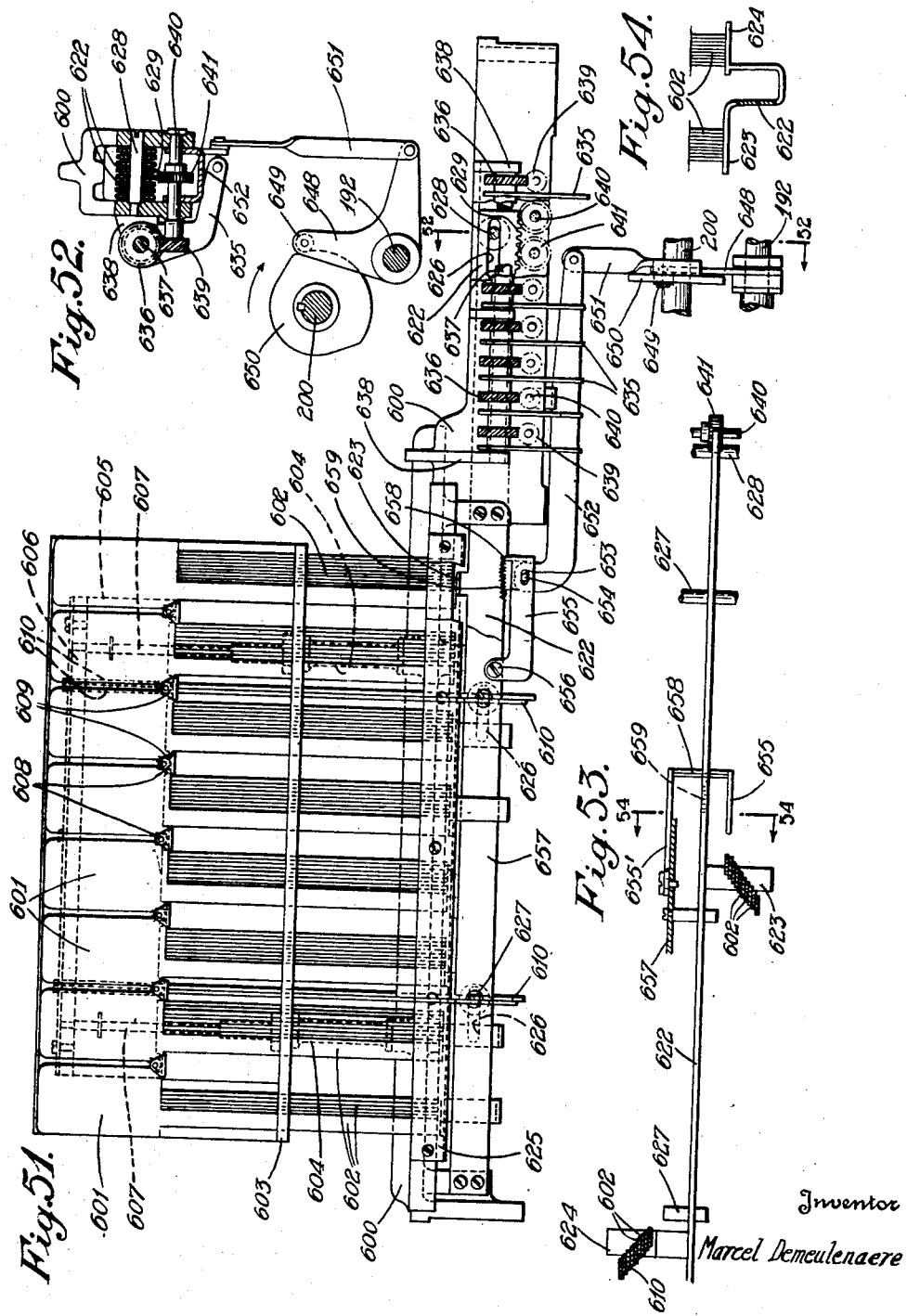

Nov. 3, 1953 M. DEMEULENAERE 2,657,854
CASH REGISTER
Filed Aug. 7, 1947 21 Sheets-Sheet 18
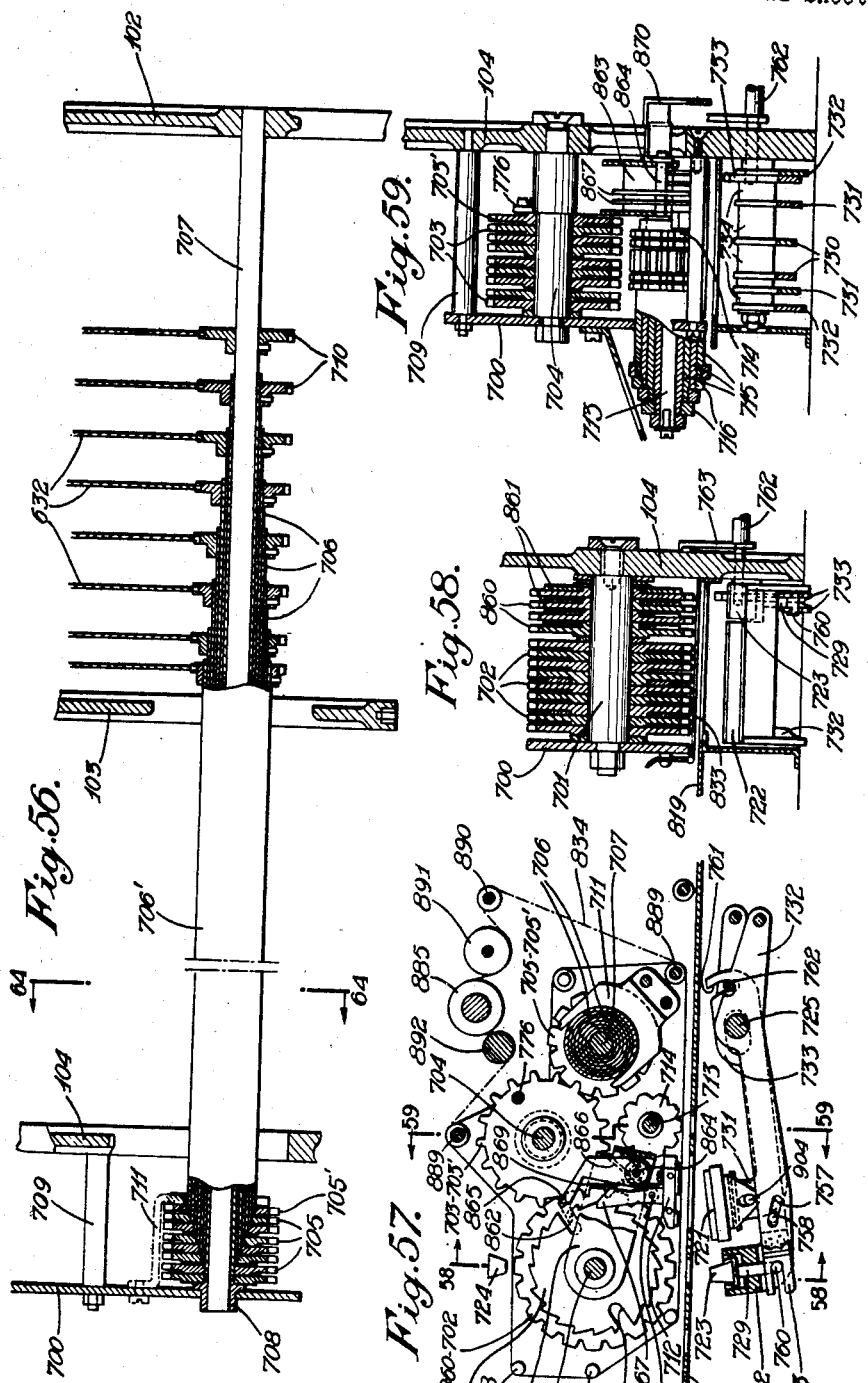

Nov. 3, 1953    M. DEMEULENAERE    2,657,854
CASH REGISTER
Filed Aug. 7, 1947    21 Sheets-Sheet 19

Inventor
Marcel Demeulenaere
By Strauch & Hoffman
Attorneys

Nov. 3, 1953  M. DEMEULENAERE  2,657,854
CASH REGISTER
Filed Aug. 7, 1947  21 Sheets-Sheet 20
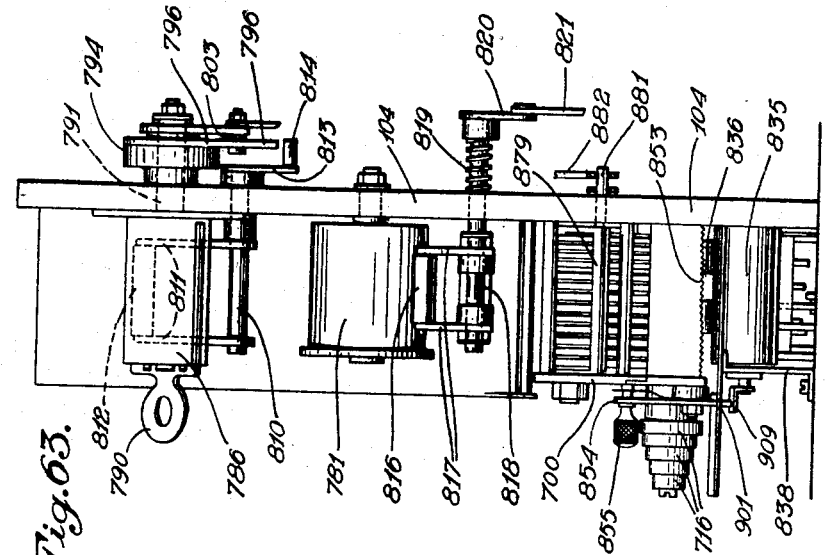
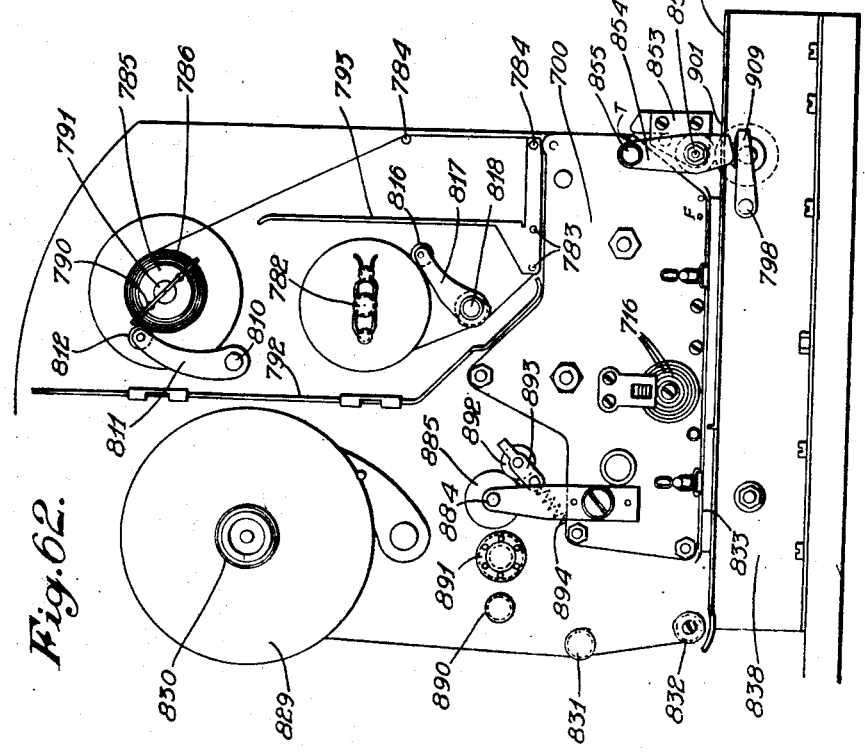
Inventor
Marcel Demeulenaere
By Strauch & Hoffman
Attorneys

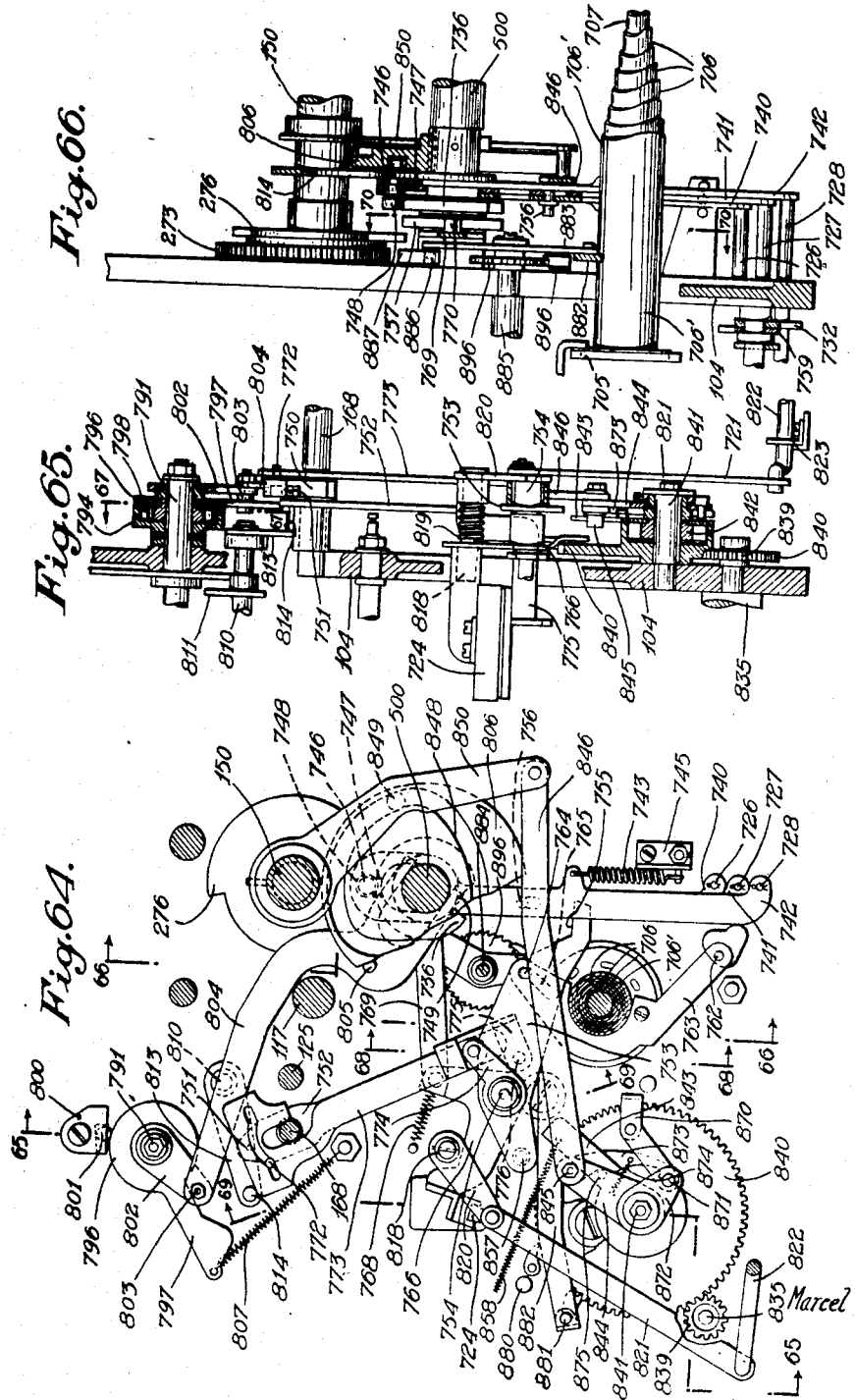

Patented Nov. 3, 1953

2,657,854

UNITED STATES PATENT OFFICE 2,657,854

CASH REGISTER

Marcel Demeulenaere, New York, N. Y.

Application August 7, 1947, Serial No. 767,027
In Belgium February 11, 1942

Section 1, Public Law 690, August 8, 1946
Patent expires February 11, 1962

36 Claims. (Cl. 235—6)

The present invention relates to a cash register provided with several totalizers, especially general totalizers and individual totalizers, each composed of several rotary disks, as well as the usual auxiliary mechanisms, such as an indicating arrangement and a printing arrangement.

The object of the invention is, first, to simplify the construction of such a cash register by disposing the totalizers and other elements on longitudinal shafts so that their number may be increased by the addition of similar elements on their respective shafts, and, secondly, to render its operation very expeditious irrespective of the number of totalizers, by the simultaneous operation of all the totalizer disks that are destined to take part in a given operation, as well as of the auxiliary mechanisms participating therein. At the same time the invention contemplates improvement in the operation of the cash register by using the same operating elements both for the registering operations as well as for the operations involved in setting the totalizers back to zero, said same elements serving furthermore for operating the indicating devices and the printing mechanism. Other objects will be apparent from the description and the accompanying drawings.

In accordance with the invention, the driving element of the cash register simultaneously operates a drive shaft for all the totalizers, and also operating mechanisms which serve to co-ordinate the movements of the totalizer disks and elements of the auxiliary mechanisms.

The drive shaft for the totalizers, during the course of each operation, effects a movement of unchanging amplitude, while the operating mechanisms, each of which corresponds to a different numerical order, serve, under the control of the keyboard or other number-setting device, to stop the totalizer disks of each numerical order in the respective positions which correspond to the registering operation that is to be performed. The movement of the drive shaft is preferably equal to one complete rotation followed by one rotation in the opposite direction. In order to act on the totalizer disks, which are arranged on the drive shaft, the operating mechanisms may be arranged so as to cooperate with this shaft either during its forward movement or during its return movement.

For the purpose of selecting and actuating the totalizers, suitable clutch devices are interposed between the operating shaft and the totalizer disks, said clutches, during the registering operations, being actuated by suitable operating mechanisms, while during the zero setting operations they are operated by the totalizer disks themselves. These clutch devices comprise drive members equal in number to those of the disks and adapted to engage with the latter, and all of the drive members of the same numerical order are mounted on a common support carried by the drive shaft. In acting on this support by means of the operating mechanism of a given numerical order, it is thus possible to simultaneously actuate all of the disks of the same order that participate in the same operation.

Each operating mechanism furthermore is provided with members that serve to control the functioning of the auxiliary mechanisms, especially the indicator and the printing device.

An embodiment of the cash register constituting the subject matter of the invention and modifications of several of its mechanisms are described herein by way of example, reference being had to the accompanying drawings wherein:

Figure 3 is a partial longitudinal section showing the relative arrangement of the different totalizers.

Figure 3a shows, on a larger scale, a fragment of Figure 3, illustrating the arrangement of the totalizer disks and the indicia wheels of one of the totalizers.

Figure 4 is a cross section taken on line 4—4 of Figure 3 or Figure 3a.

Figure 5 is a cross section, on a larger scale, taken on line 5—5 of Figure 3.

Figures 6 and 7 are elevational and plan views, respectively, of the totalizer selecting mechanism.

Figure 8 is a cross section taken on line 8—8 of Figure 6.

Figure 9 shows a detail of the selecting mechanism.

Figures 10, 11, 12 are fragmentary cross sections taken on lines 10—10, 11—11, and 12—12, respectively, of Figure 7.

Figure 21:
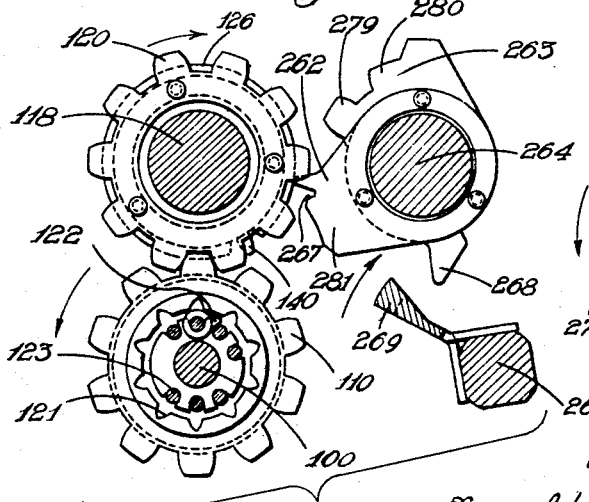

Figures 12a, 12b, and 12c (Sheet 2) are enlarged sectional views somewhat similar to Figures 4 and 21, showing the disengagement of a stud 122 from a notch 121 in a totalizer wheel or disk 110.

Figure 13:
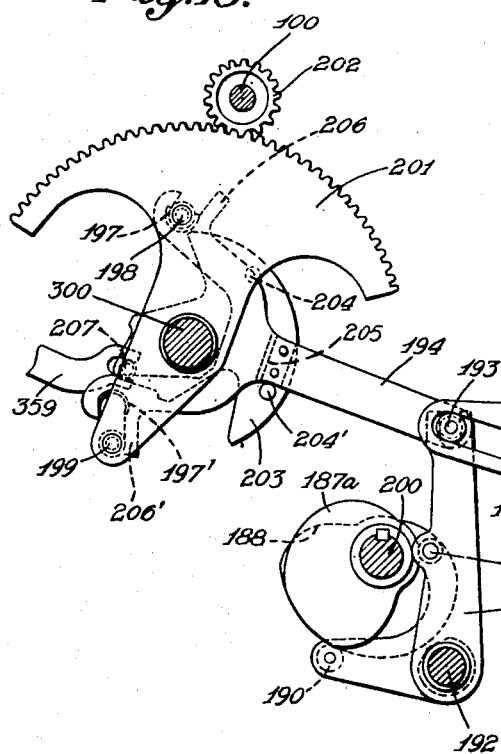
Figure 14:
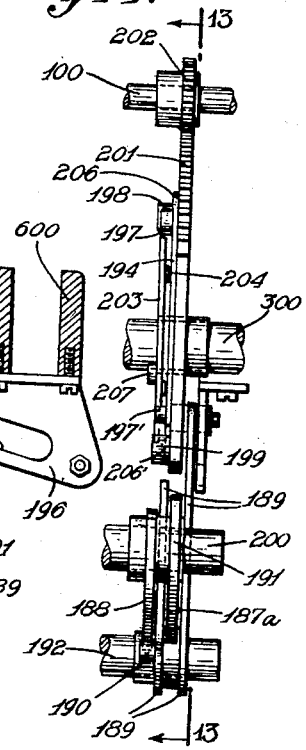

Figure 13 is a side view of the mechanism that actuates the operating shaft, shown in a plane disposed along line 13—13 of Figure 3 and along line 13—13 of Figure 14.

Figure 14 is a profile view corresponding to Figure 13.

Figure 15:
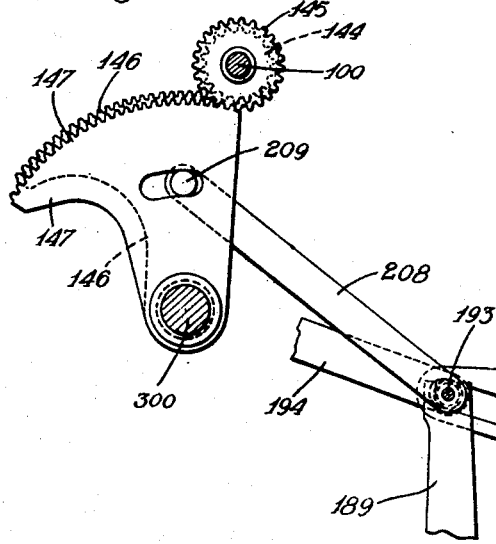
Figure 16:
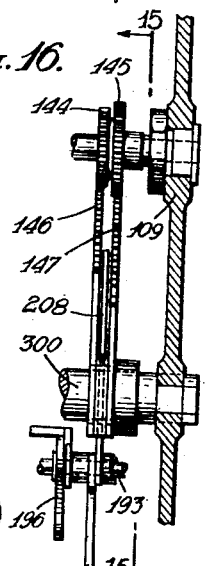

Figure 15 is a side view of the mechanism which actuates the central shaft of the cash register, shown in the plane of line 15—15 of Figure 16.

Figure 16 is a profile view corresponding to Figure 15, said mechanism being disposed, in the cash register, along the line indicated by 15—15 in Figure 3.

Figure 1:
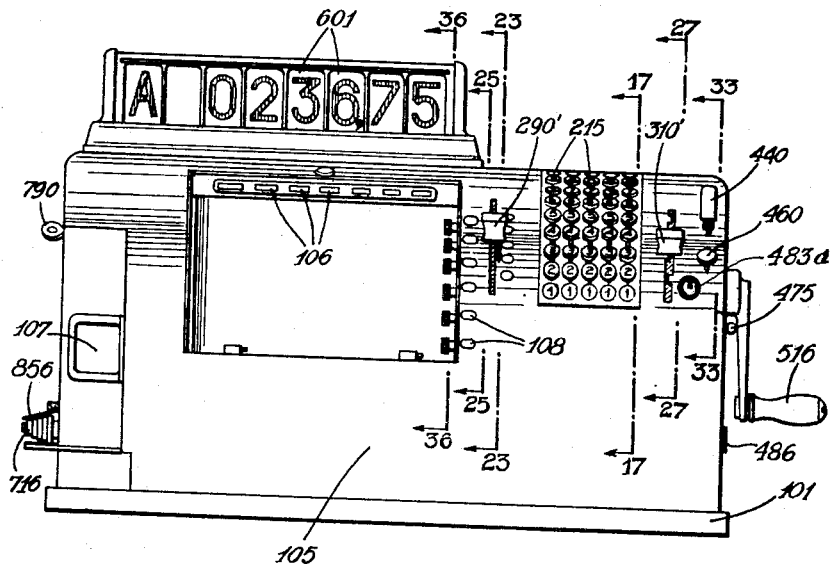
Figure 1 is an external view of the cash register, shown on reduced scale.

Figure 17 is a cross section through the number setting mechanism, said section being taken at the portion of the cash register designated by line 17—17, in Figure 1.

Figure 17a shows a detail of Figure 17.

Figure 18 is a section on the broken line 18—18 of Figure 17, showing the mounting of one of the keys.

Figure 19 illustrates diagrammatically a detail of Figure 17 viewed along the broken line 19—19 of Figure 17.

Figure 20:
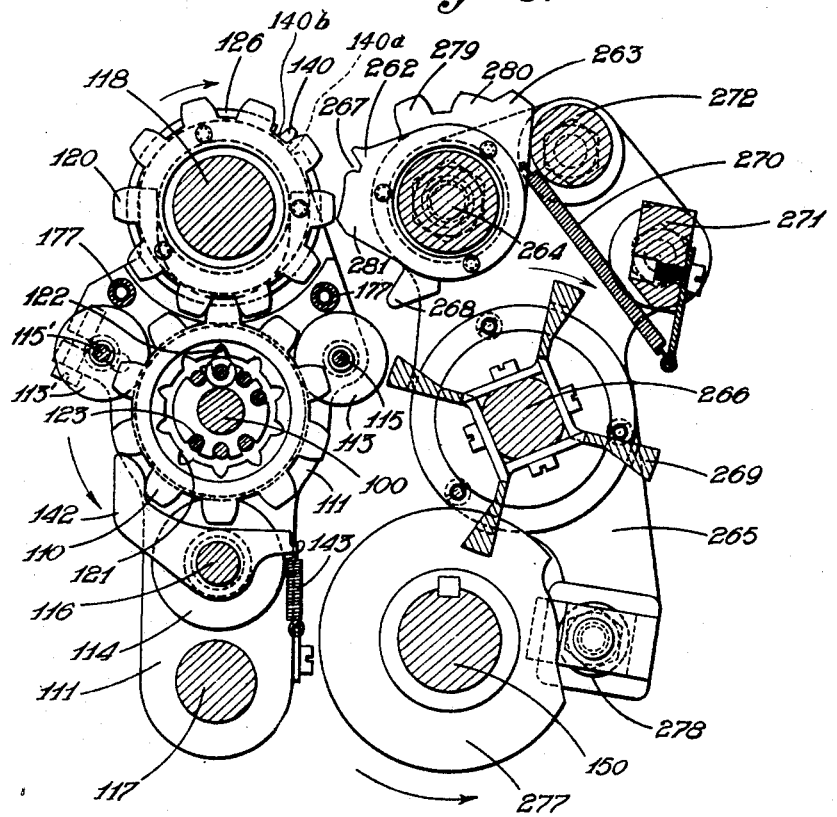

Figure 20 is a cross section analogous to Figure 4 but amplified by showing the carry-over mechanism.

Figure 21, like Figure 20, shows the cooperation of a totalizer disk with its carry-over mechanism, the members being shown in a different position than in Figure 20.

Figure 22:
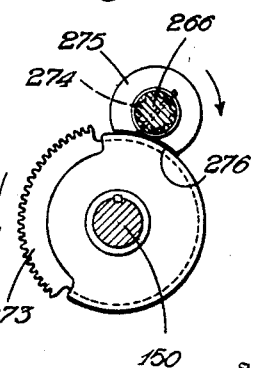

Figure 22 is a detail view showing the operation of the tens carry-over roller.

Figure 23 is a cross section of the cash register taken along line 23—23 of Figure 1, showing the mounting of the selecting lever.

Figure 24 is a corresponding profile view taken on broken line 24—24 of Figure 23.

Figure 25 is a cross section of the cash register taken along line 25—25 of Figure 1, showing the mechanism used for controlling the operation counters.

Figure 26 is a bottom view of one of the selector locks.

Figure 27 is a cross section of the cash register taken along line 27—27 of Figure 1, showing the control lever.

Figure 28 is a plan view of said lever.

Figure 29 shows a section of the same lever taken along broken line 29—29 of Figure 27.

Figure 30 is an elevational view of a safety mechanism disposed, inside the cash register, below the keyboard.

Figures 31 and 32 are partial cross sections taken on lines 31—31 and 32—32, respectively, of Figure 30.

Figure 33 is a cross section of the cash register taken along line 33—33 of Figure 1, showing the mechanism for starting or blocking the cash register.

Figure 33a shows a detail of Figure 33.

Figure 34 (Sheet 9) shows a special operating pawl.

Figure 35 shows the mechanism used for releasing the keys and for generally locking the cash register, as viewed from the right of Figure 1, the right hand wall of the cash register having been removed.

Figure 36 is a cross section of the cash register taken on line 36—36 of Figure 1, showing the drive elements that actuate the various mechanisms of the cash register.

Figure 37 is a partial section taken on line 37—37 of Figure 36.

Figure 38 is a partial view along line 38—38 of Figure 36, of the drive shaft together with the drive pawl.

Figures 39 and 40 are partial sections taken on lines 39—39 and 40—40, respectively, of Figure 37, showing the electric contacts used for operating the motor. These figures show what is seen in the same section, but looking in opposite directions.

Figure 41 is a view analogous to Figure 13 showing a modified construction of the mechanism that actuates the drive shaft, and taken along line 41—41 of Figure 42.

Figure 42 is a section taken on line 42—42 of Figure 41.

Figure 43 is a section on line 43—43 of Figure 41.

Figure 44:
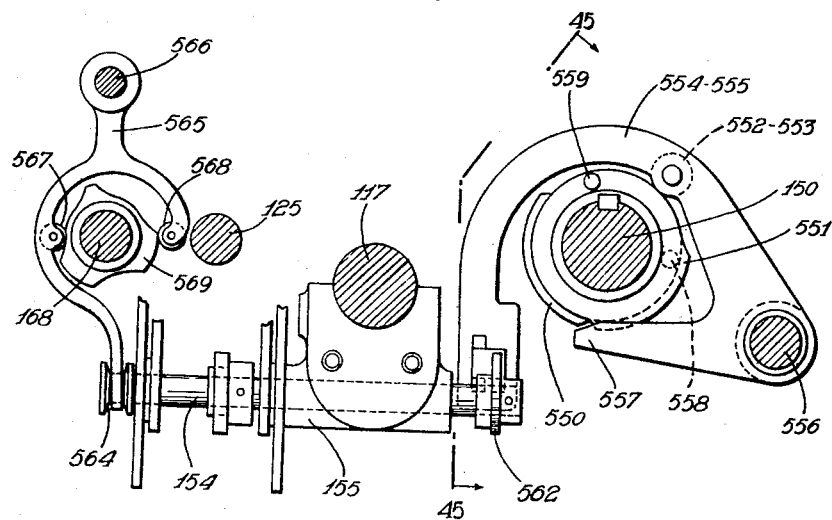

Figure 44 shows, as a profile view, a portion of the selector mechanism, intended for ascertaining the instant that the selection of the totalizers is effected.

Figure 45:
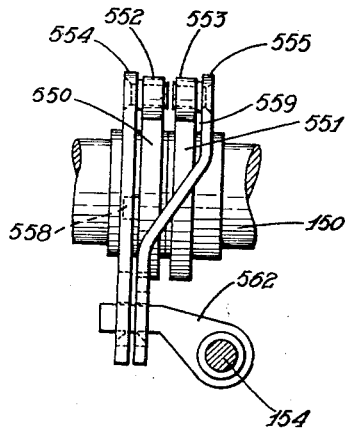

Figure 45 is a front view taken on line 45—45 of Figure 44.

Figures 46, 47:
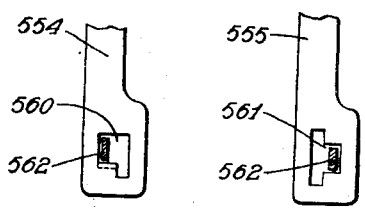

Figures 46 and 47 are two detail views of Figure 44, showing one of the levers in two different positions.

Figure 48 is a cross section analogous to Figure 17, showing a modified construction of the operating mechanisms.

Figures 49 and 50 are sections taken on lines 49—49 and 50—50, respectively, of Figure 48.

Figure 51 is an elevational front view of the indicating portion of the cash register.

Figure 52 is a cross section taken on line 52—52 of Figure 51.

Figure 53 is a partial plan view of the indicator shown in Figure 51.

Figure 54 is a cross section taken on line 54—54 of Figure 53.

Figure 55 (Sheet 13) is a side view of a special mechanism constituting part of the operating arrangement of the indicator.

Figure 56 (Sheet 18) is a longitudinal section through the drive shafts of the printing mechanism.

Figure 57 is a cross section through the printing mechanism which is disposed at the left hand end of the cash register.

Figure 58 is a longitudinal section taken on line 58—58 of Figure 57.

Figure 59 is a longitudinal section taken on line 59—59 of Figure 57, showing the dating mechanism.

Figure 60:
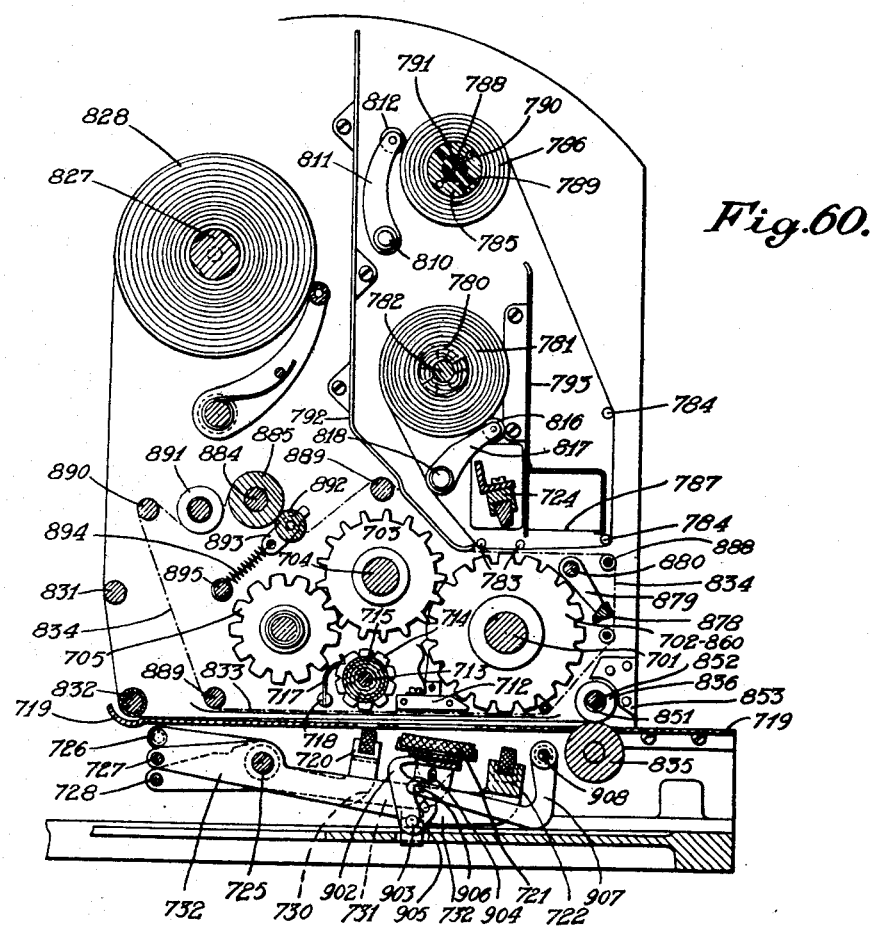

Figure 60 is a cross section through the printing mechanism, showing the arrangement of the means used for driving the printing paper rollers.

Figure 61:
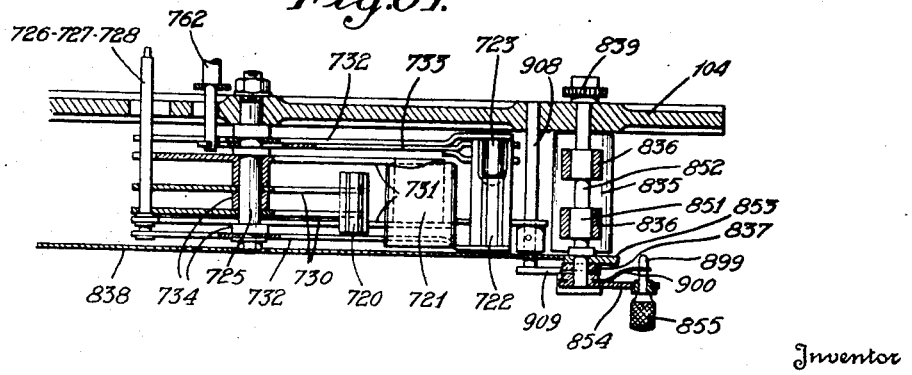

Figure 61 is a plan view of the printing hammers.

Figure 62 is an exterior view of the printing mechanism at the left hand side of the cash register, the left hand wall having been removed.

Figure 63 is an exterior front view of the printing mechanism.

Figure 64 shows the printing mechanism as a side view taken on line 64—64 of Figure 56.

Figure 65 is a section taken on broken line 65—65 of Figure 64.

Figure 66 is a section on broken line 66—66 of Figure 64.

Figure 67 (Sheet 10) is a detail in section taken on line 67—67 of Figure 65.

Figure 68 is a partial section taken on line 68—68 of Figure 64.

Figure 69 is a partial section taken on line 69—69 of Figure 64.

Figure 70 is a partial section taken on line 70—70 of Figure 66.

External appearance

The cash register shown in the drawing (Figure 1) has the shape of an elongated casing resting on a bedplate 101 from which three interior transverse partitions (Figure 3) 102, 103 and 104 extend from the front towards the back and serve as supports for the internal elements of the cash register, which are protected by a sheet metal covering 105.

At its front side, near the right hand end, the casing is provided with a keyboard having amount keys 215 for setting the amount to be registered. The keyboard is flanked on the left by a selecting lever 290 having a handle 290', which serves for selecting the individual totalizers that are to participate in the operation in hand. The individual totalizers, in the embodiment shown, are four in number, being designated A, B, D and E (Figure 3). Furthermore, the cash register includes (Figure 3) a ticket totalizer K, a day totalizer J, and a general totalizer G; the amounts totalized by each of the totalizers are directly readable in windows 106 ranged at the left of the keyboard and normally covered by a key-operated blind, omitted in Figure 1.

At the right of the keyboard is a control lever 310 (Figure 27) with a handle 310' (Figures 27, 1 and 2) intended to be placed in one of the positions corresponding to the nature of the operation that is to be performed, e. g. simple registering, setting a totalizer to zero, etc. At the right end of the front wall is a large key 440, referred to as a release or starting key, which is pushed to start the electric motor housed inside the casing so as to perform the operation preset by the keys 290' and 310' and levers 290 and 310. Below the starting key 440 is a repeat key 460 which permits repeating several registering operations going into the same total without requiring the amount to be set up each time by the keys 215. A button 475 in the right hand side wall serves to render the repeat key inoperative after the series of operations performed with an unchanging sum have been terminated. A crank 516 makes it possible to operate the cash register by hand when the electric current fails.

The amount of each operation is rendered visible in large characters of means of a plate indicator 601 surmounting the cash register. The same amount is printed on a ticket delivered at 856 through the left hand wall of the cash register. The date carried by each ticket is set up by means of an exteriorly accessible composing device 716, likewise disposed in the left hand wall. The amount of each operation is also printed on a control or record strip inside the cash register and the amounts of some of the last-performed operations are visable in a window 107 before which the control strip passes. The key 790 in the left hand wall permits access so as to allow replacing the spool from which this strip uncoils.

In the center of the machine, to the left of the selecting lever 290, are windows 108 which show the indications of the counting devices that count the number of the operations of the day totalizer and of the individual totalizers as well as the number of "no sale" ("change-making") operations performed.

A lock 486 disposed the right side wall of the machine serves to prevent unauthorized use of the cash register by blocking all of the operating members thereof. A lock 483a to the right of the operating lever 310, serves to prevent the resetting of the individual totalizers to zero.

The mounting of the various elements of the cash register will now be described:

Totalizers

These are all mounted in the upper portion of the machine between the cross partitions 103 and 104 (Figure 3); they are all of identical construction, except insofar as the number of disks is concerned, so that only one of the devices need be described, for example the individual totalizer D (see Figures 3, 3a and 4).

Each totalizer is composed of a certain number of annular disks 110 of different orders (cents, tens of cents, dollars, tens of dollars, etc.), held between two side plates 111, 111', each totalizer disk corresponding to a given numerical order, each disk having ten teeth 110b (Figure 4) at its outer periphery. In the totalizer D the disks 110 are six in number which makes it possible to totalize amounts up to a total of 9999.99 in that totalizer. The disks are arranged in juxtaposed coaxial relation on a drive shaft 100 common to all the totalizers. The disks 110 are no journalled on shaft 100 but are each exteriorly supported by three rollers (Figure 4) 113, 113' and 114 which engage in an outer peripheral groove 110a of each disk 110 and are themselves mounted on shafts 115, 115' and 116 respectively, disposed parallel to shaft 100 and carried by the side plates 111 and 111' of the totalizer. These side plates 111, 111' are journalled at their lower portions to slide on a guide 117 (Figure 3) attached between the partitions 103 and 104, parallel to shaft 100. At their top, the side plates 111 and 111' terminate in bifurcations 117a (Figure 4) the hollows of which receive a stationary shaft 118 carried through agency of sleeves 119. The latter are secured to shaft 118 by set screws 119a, and serve to retain sets of gears 120 (Figures 3a and 4) in place on the shaft 118, these gears 120 being similar to the disks 110 both as to diameter and number of teeth. Each gear 120 meshes with a totalizer disk 110, the number of gears 120 in each set being equal to the number of disks 110 of the corresponding totalizer. The peripheral surfaces of each of the ten teeth 120b of each gear 120 carry figures from 1 to 0 visible through the windows 106 in the housing 105 of the machine, and permit the amount totalized by the totalizer in question to be read.

The totalizer disks 110 are actuated in the following manner:

As shown in Figures 3a and 4, each disk 110 has affixed to it or integral with it a relatively thin annular plate 110' having a series of internal equally spaced notches 121. Ten such notches are shown in Figure 4. These integral or attached plates 110' project towards the shaft 100 beyond the inner periphery of the disks 110 proper, for a reason to be seen. Studs 122, carried by the rods 123 cooperate with these notches 121. There is one stud 122 for each of the totalizer disks that are destined to be actuated directly; the higher order disks of the general totalizers G and J however are actuated solely by being carried forward and are not directly driven by any stud 122. All of the studs 122 corresponding to the disks 110 of the same numerical order in the various totalizers are keyed onto a rod 123 (seven such studs, one for each totalizer, being shown carried by a single rod 123 in Figure 3) lodged in a longitudinal groove 124 of the shaft 100 (Figure 4). The grooves 124 are formed in the spaced collars 124a (Figures 3, 3a, 12a, etc.) which are rigidly attached to the shaft 100 by set screws 124b, so that the collars 124a are to all intents and purposes a part of the shaft 100. The shaft 100 therefore has at least as many grooves 124 that support rods 123 carrying studs 122 as there are directly actuated disks 110 in a given totalizer. Six such grooves 124 and rods 123 are sufficient for the totalizers of Figure 3 because there are only six disks in the totalizers A, B, D, E and K. However, it will be noted that there are actually seven of the rods 123 in Figures 4, 5, 20 and 21, etc. This is because the day totalizer (j) has seven disks 110, since it must register the sum put into all of the individual totalizers (A, B, D, and E) in one day. While the seventh disk 110 of the day totalizer is actuated solely by being carried forward, as mentioned before, its indication must be transferred to the indicator and to the printing mechanism when it is reset to zero at the end of a day (or any other suitable period). Thus, for reasons which will become apparent, a seventh rod 123, having only one stud 122 (Figure 3) engageable with the seventh disk 110 of the day totalizer J, is provided. This same rod will have a stud 138 as will be described. The rods 123 are distributed about the shaft 100 in the same angular spacing or multiples thereof as the equally spaced notches 121 inside the disks 110. In the illustrated embodiment the notches 121 are 36 degrees apart. Each rod 123, along with the studs that it carries, constitutes a clutch device for driving the totalizing disks, except the seventh rod 123, previously described. In order to register an amount in one or more totalizers, the studs 122 are caused to engage with the notches 121 of the disks 110 that are destined to participate in the operation, and each disk is caused to turn in the desired direction as many tenths of a revolution as there are units to be registered. As will also become apparent, in connection with Figures 12a, 12b, and 12c, the studs 122 serve not only as clutches to connect the disks to the shaft 100, but also serve as stop members to positively stop the rotation of the disks.

As shown in Figure 3a, the width of each stud 122 is less than the thickness of a totalizer disk 110. Furthermore, the plate or cam 110' in which the notches 121 are provided, likewise only occupies a portion of the thickness of each disk, whereas, laterally of this portion, the internal diameter of the disk is sufficiently large to form an annular hollow within which the stud 122 is able to turn freely. When the machine is at rest, none of the studs 122 are in engagement with the corresponding disk 110, all of the studs 122 being within the annular hollows of the disks. Each totalizer that is destined to participate in a registering operation must therefore be shifted, along with its side plates 111 and 111' along the guide 117, from left to right as viewed in Figure 3, to such an extent that the notches 121 engage with the studs 122.

*Selection of the individual totalizers*

Figure 2:
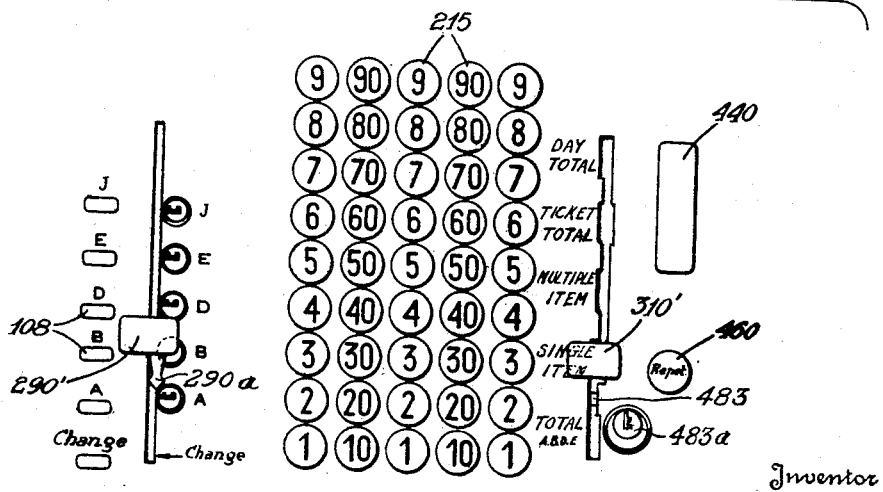
Figure 2 is a diagrammatic view of the keyboard and the principal operating levers of the cash register.

The selection of an individual totalizer is effected at the end of the registering operation with the aid of lever 290 (Figure 23) the handle 290' of which is disposed exteriorly of the machine to the left of the keyboard (Figures 1 and 2). This lever, which turns about a central shaft 300 of the machine (Figures 23, 24) may occupy any one of several positions, depending on what totalizer is to be selected, and these positions are indicated by an arrow 290a (Figure 2) integral with the handle 290' playing over suitable indicia placed on the housing 105 of the machine. The lever 290, during its angular movements, shifts a toothed sector 282 which meshes with a pinion 149 keyed to the right hand end of a selector shaft 125 (Figures 6, 8 and 23). This shaft is journalled in the partitions 103 and 104 for free turning and for sliding and carries, for each of the totalizers A, B, D and E, a bifurcated member 181 adapted to engage between its pair of spaced arms 181a a tooth 127 of the side plate 111' of each totalizer (Figures 4 and 10). The pairs of arms forming the bifurcations 181a of the various bifurcated members 181 extend in the same direction, but each member 181 is angularly offset from every other member 181 by an angle corresponding to that described by the lever 290 in passing from one position to the following one. It is apparent therefore that, depending on the position of the lever 290, only one of the bifurcated members 181 is caused to grasp the tooth 127 of the side plate of its corresponding totalizer and that it is then merely necessary to shift the shaft 125 from left to right a suitable distance to cause one of the notches 121 inside each of the disks 110 of the selected totalizer to be brought into engagement with its stud 122, thus causing the latter to actuate the totalizer disks.

The axial movement of the shaft 125 is obtained from the drive shaft 500 (Figures 36 and 37) which is set in rotation, in the manner hereinafter described, each time the machine is operated. The shaft 500 carries a gear 511 which meshes with a gear 512 keyed on the shaft 150. The latter likewise carries a peripherally grooved cam 151 (Figures 37 and 8). A roller 152 (Figure 8) disposed at the end of an arm 153 fixed on a shaft 154 of Figures 8 and 6 engages in the groove 151a of the cam 151, the shape of said groove being such that during one revolution of the cam, the arm 153 first partakes of a movement which causes a clockwise movement of shaft 154 of Figure 6, and then, after coming to rest, it returns to its original position. The shaft 154 oscillates in a support 155 fixedly mounted on the guide 117 (Figures 3 and 8). At its other end, the shaft 154 carries a U-shaped lever 156 (Figures 6, 8 and 9) yieldingly connected, by means of a compression spring 157, to a bellcrank 158. The latter is traversed by a pin 159 which likewise traverses two supports 160, 160' (Figures 8 and 6) pivoted on the shaft 154. The pin 159 furthermore is adapted to engage in the notches 161 (Figure 6) of two spaced plates 162. Each plate 162 has vertical slots 163 and 164 (Figure 6) through which pass respectively the shaft 154 and a pair of diametrically opposed pivot screws 165 protruding from a ring 166 on the shaft 125. By this arrangement the plates 162 are guided for vertical movement. The shaft 125 can turn freely within the ring 166, but axial movement of shaft 125 with respect to the ring 166 is prevented by two rings 167 disposed on either side of the ring and which move with the shaft. After one of the totalizers has been selected by manipulation of the selecting lever, and the shaft 150 partakes of one revolution, the arm 153 causes the shaft 154 along with the levers 156 and 158 and pin 159 to oscillate. The latter, having engaged in the notches 161, carries the plates 162, and, through agency of screws 165, the ring 166, towards the right (as shown in Figure 6). The shaft 125 is forced to follow this movement and the particular bifurcated member 181 thereon, which has engaged the tooth 127 on the side plate 111' of the selected totalizer, carries it to the right (Figure 3) the desired amount to place one of the notches 121 of each of its disks 110 into engagement with a stud 122. The travel of the selected totalizer is limited by the engagement of its side plate 111 against an adjustable stop 128 (Figure 3) screwed onto a support 129 attached to the fixed guide 117. At the end of the operation, the totalizer is brought back to its position of rest by the cam 151 and the arm 153, aided by a recall spring 130 tensioned between the support 129 and the side plate 111'; this same spring also prevents all untimely movement of a non-selected totalizer.

Certain operations of the machine, such, for example, as that of setting the day totalizer J back to zero, do not require the axial movement of the individual totalizers. For such operations it is therefore necessary to render the above described mechanism inoperative. For this purpose use is made of the control lever 310 (Figure 27) the knob 310' of which is located exteriorly of the machine. Before proceeding with the operation, the lever 310 is brought into a position corresponding to the indicia marked at the side of knob 310' (Figure 2). As it moves, the lever 310 serves, by means of a rod 307 pivoted to the lever at 403 and by means of an intermediate lever 308, to move a shaft 306 (Figures 27 and 10) on which is keyed a lever 171 pivoted to a fork 172 guided on a rotatable shaft 168 parallel to shaft 125. One of the arms of the fork 172 carries a rack 169 which meshes with a pinion 170 keyed to the shaft 168. A cam 173 (Figures 7 and 8) is rigidly associated with this pinion and a stud or lug 174 slides in the groove of said cam, said lug being carried by a plate 175 vertically guided by a slot 176 therethrough upon the shaft 168. The plate 175 is prolonged at its lower end by means of a horizontal portion which carries two arms 177 (Figures 6 and 8) provided with aligned slots through which pass a pin 178 which likewise passes through the plates 162. When the control lever 310 is brought into a position that corresponds to an operation requiring the selection of one of the individual totalizers, all of the aforesaid elements occupy the positions shown in Figures 6 and 8 and the selection is effected as described. However, when the lever 310 is brought into one of the positions for setting the day totalizer to zero or the "ticket total" position which do not require the selection of individual totalizers, this lever, by virtue of the connecting members aforesaid (rod 307, lever 308, shaft 306, lever 171, fork 172, gears 169—170, and shaft 168) turns the cam 173, which, through agency of the stud 174, plate 175, arms 177 and pin 178, causes the plates 162 to descend to such an extent that their notches 161 become disengaged from the pin 159 and so that other notches 179 (Figure 6) of plates 162 engage with a stationary pin 180 mounted on the support 155. In this position, the rotation of the cam 151 (which effects the pivoting of the pin 159) will have no effect on the selector shaft 125 and none of the individual totalizers will be shifted laterally. It will be apparent that although pin 159 is disengaged from the plates 162 at this time, the bellcrank 158 will still oscillate the plates 160 and 160' to shift the general totalizers by means of the rod 187, as will be described.

*Selection of the general totalizers*

The connections which, when the control lever 310 is in certain positions, serve to render the mechanism used for selecting the individual totalizers, also serve, as needed, to effect selection of the totalizers G, J and K. The side plates 111' thereof, like the corresponding side plates of the individual totalizers, each have one tooth 127 adapted to be grasped by forks analogous to the forks 181a which act on the individual totalizers. However, the forks intended for the general totalizers are angularly larger and are subdivided into two parts 182a (Figure 12) so as to be able to act in several angular positions. These forks are fixed to a sleeve 183 (Figures 6, 7, 11, 12) which surrounds the shaft 125 and carries a gear 184 that meshes with a gear 185 keyed to shaft 168. A fork 186, engaged in a recess of the hub of the gear 184 serves to connect the sleeve 183, through agency of a rod 187 integral with the fork 186, with the support 160, which, as already described, pivots from left to right, or clockwise in Figure 6, when the machine starts operating, and then, after a pause, it returns to its position of rest. The sleeve 183 therefore moves axially and this movement is transmitted by the forks 182a, 182b to the selected general totalizers, as has been described in the case of the individual totalizers. The transmission of the angular movement of lever 310 to the sleeve 183 is so arranged that for the five positions of the lever there are as many corresponding angular positions of the sleeves 183 and forks 182a, 182b; the size and angular position of the forks on the sleeve 183 are predetermined so as to actuate the totalizer or totalizers destined to participate in the contemplated operation. Thus, when (Figure 2) the lever 310 is in the first lower position (as when setting an individual totalizer to zero) none of the general totalizers is in selected position, none of the forks 182a, 182b is in engagement with the teeth 127 of the side plates 111'; in the second position (simple registering position), the day totalizer J and the general totalizer G are in selected position so as to participate in the operation, in addition to the selected individual totalizer, as above described, with the aid of the lever 290; in the third position (multiple entry registering), the three totalizers G, J and K are in selected position; in the fourth position (ticket totalizing position) only the ticket totalizer K is in operation; finally, in the fifth position, only the day totalizer J is in selected position so as to be set back to zero.

*Operation of the totalizers*

When any totalizer is selected, that is, when the notches 121 of its disks 110 are caused to engage with the studs 122, the latter are used to turn each of the disks as many tenths of a turn as this disk is intended to register units. The rotation of the disks is effected when addition is to be performed, in the direction shown by the arrow in Figure 20 and in the reverse direction when subtraction is to be effected, that is, when the totalizer is to be set to zero. As already recited, each totalizer has a stud 122 for each disk 110, but each stud for one totalizer is on a different rod 123. The studs which, in the various totalizers, belongs to the same numerical order, are grouped on the same rod 123, and all of the rods 123 participate in the rotation of the shaft 100 which effects one complete rotation during each operation of the machine. The rods 123, along with the studs which they carry, constitute clutch means between the shaft 100 and the disks 110. The movement of the shaft 100 is derived, as in all other cases, from the drive shaft 500 which, also, makes one complete rotation for each operation. The shaft 500 carries a gear 511 (Figure 37) which, through an intermediate gear 537 on a stub shaft 539, transmits the movement to a gear 538 keyed to shaft 200 disposed at the bottom and rearwardly of the machine between the partitions 103 and 102 (Figures 13 and 14). A pair of cams 187*a*, 188 attached and keyed near the right hand end of the shaft 200 serves to positively operate a bellcrank 189 which carries two rollers 190 and 191 that cooperate with the cams 188 and 187*a* respectively. The lever 189 is able to pivot on shaft 192 and has a sliding pivoted connection at the top, at 193, to a fork-shaped rod 194. The pivot 193 is guided in a straight slot 195 of a stationary support 196 and the upper end of lever 189 is forked to receive the pivot 193, since 193 moves in a straight path while the upper end of 189 moves in an arcuate path. The two arms of the fork 193 have outwardly directed tips provided laterally with small rollers 197, 197′ (Figure 13). By means of these two tips, the fork 194 is adapted to hook onto one or the other of two lugs 198, 199 attached to the side of a toothed sector 201 which turns about the central shaft 300.

The toothed sector 201 meshes with a pinion 202 keyed on the operating shaft 100, near its right hand end (Figure 3). When at rest, the pinion 202 is substantially in the center of the toothed sector 201 which is therefore able to turn the pinion in either direction. The cams 187 and 188 are so shaped that, during the rotation of the shaft 200, the lever 194, hooked against the lug 198, is able to turn the shaft 100, first one rotation in a clockwise direction, and then, after a moment of repose, one rotation in the reverse direction. If, on the contrary, the lever 194 engages the toothed sector 201 by means of the lower lug 199, the shaft 100 will perform the same movements in the reverse order.

In order to prevent untimely unhooking of the fork 194 during operation, a segment 203 (Figure 13) is pivotally mounted on the shaft 300. The radius of the circular portion of segment 203 is such that this portion serves to hold one or the other roller 197 or 197′ of the fork 194 when the latter is hooked by one or the other of the lugs 198, 199. Furthermore, the fork 194 is held by one or the other of two lugs 204, 204′ attached to the segment 203; depending on whether the fork is hooked by the lug 198 or lug 199, the lugs 204′ or 204 respectively will bear from below or above against a small plate 205, attached to the fork 194 to project into the plane of the lugs. To reverse the initial direction of rotation of the shaft 100, it is merely necessary therefore to rotate the segment 203 clockwise (Figure 13) until the lug 204 strikes against the plate 205 and pushes it down with the fork 194 which then becomes unhooked from the lug 198, and rehooks itself to lug 199. During this movement, the fork is guided by the elongated lips 206 and 206′ of the ends of the fork which moreover serve to limit the travel of the toothed sector 201.

The segment 203, when the initial direction of rotation of the shaft 100 is to be changed, is actuated by the control lever 310 mentioned above. This lever (Figure 27) has a suitably shaped slot 357 in which a roller 358 travels which is carried by one of the arms of a bellcrank 359 (Figures 13 and 27) pivoted on the end of a stationary shaft 458. The other arm of the lever 359 ends in a fork and is adapted to grasp a knob 207 attached to the segment 203. The shape of the slot 357 is such that when the lever 310 is in the second or third position from the top (in Figure 2 these are the "ticket totalling" and the "multiple item registering" positions respectively), the roller 358 engages in the inner portion of the slot 357 where it is shown in Figure 27 and the fork 194 becomes hooked to stud 198 of the toothed sector 201 (Figure 13), so that the rotation of shaft 100 starts off in clockwise direction which represents an addition operation. If the lever 310 is brought into one of its three other positions, the roller 358, riding in slot 357, pivots the lever 359, segment 203, and fork 194, so as to bring the latter into engagement with the stud 199 of the toothed sector 201 and to reverse the initial direction of rotation of the shaft 100 as well as forcing it to perform the operations predetermined by the movement of the control lever 310.

When one operation of the cash register, for example, that of simple registering or addition on an individual totalizer, has been set up by the above described manipulations, each disk of the selected totalizer must be turned as many tenths of a rotation as there are units to be registered by the disk. As recited above, the shaft 100 which carries the clutch means rods 123 on which the studs 122 are ranged, serves to effect, during the operation, one complete rotation in the desired direction and then, after a short period of repose, it returns to its starting position. The studs are normally in active position, with their points directed radially with respect to the shaft 100 and engaged in notches 121 of the disks of the selected totalizer or totalizers.

A braking arrangement in the form of a serrated wheel 131 (Figure 5) adapted to prevent the untimely pivotal movement of studs 122, is keyed on the shaft 100 near the right hand end thereof (Figure 3). The hub of the serrated wheel holds the ends of all the rods 123 which carry the studs 122. Laterally of the wheel 131 there is keyed to each rod a small radially extending lever 132 the free end of which carries a roller 133 engaging between the two jaws of a pair of pincer members 134. Each of these pincer members has a pivot 135 disposed near the periphery of the wheel 131 and its two arms are connected together by a spring 136. There is one pair of pincer members for each rod 123, and, for convenience, two adjacent pincers are mounted alternately right and left for the serrated wheel 31. For the sake of clearness, Figures 3 and 5 show only two pincer pairs, diametrically oppositely disposed upon the wheel 131.

When the operation of the cash register is started and the shaft 100 is caused to rotate, the serrated wheel 131 and all the elements that it carries, participate in this movement. Likewise participating in the same movement is the series of gears 137 keyed on the shaft 100 (Figure 3) between the totalizers and the wheel 131, as well as studs 138 (Figure 3 shows two) which are similar to studs 122 except that they are slightly larger, and which are keyed onto the rods 123. There is one stud 138 engaged in each gear 137 and its point engages in an internal longitudinal groove 139 of its respective gear 137. The engagement therein is similar to the engagement of studs 122 in notches 121 in that they can topple out of engagement due to the rotation of rods 123 with respect to the gears 137 as the studs 122 can topple out of engagement with the notches 121 due to the same respective rotation. There is however, only one internal groove 139 in each gear 137, and when the machine is at rest each rod 123 is connected to its respective gear 137 by means of the stud 138 which cooperates with that groove 139. The number of gears 137 is equal to that of the numerical orders in the highest figure to which an operation of the cash register can be carried, that is, seven, in the embodiment shown. Each of the five rightmost gears 137 in Figure 3 engages with a toothed sector 240 (Figure 17) which rotates on the central shaft 300 and of which the amplitude of rotation is regulated by depressing one of the amount keys 215 of the corresponding numerical order. The sixth and seventh gears 137 are not operative during a registering operation, but only during a zero setting operation, and for that reason there is no sector 240 cooperating with these two gears. The sixth totalizer wheel of each totalizer is actuated only by the carry over from the fifth wheel and in the J totalizer the seventh wheel is actuated only by the carry over from the sixth wheel. Thus the sixth and seventh gears 137 of Figure 3 are active only during a zero setting operation, as will be apparent. Thus, when a number is to be registered comprising for example one tens figure and five units, the key "1" of the tens range serves (as hereinafter described) to stop the corresponding segment 240 after a predetermined rotation, while the analogous segment 240, cooperating with the units key, is arrested, after five times as great a rotation, by the "5" units key. In the case of the tens segment 240, the corresponding gear 137 is likewise arrested, after rotating a tenth of a revolution. From this moment on, its stud 138, keyed onto a rod 123, therefore cannot rotate along with rod 123 and shaft 100 and still remain in active position with its point directed radially with respect to shaft 100. Thus as shaft 100 proceeds in its rotation, the stud 138 tends to rotate the rod 123 and to turn out of its radial position so as to disengage itself from its internal groove 139 in gear 137, until it attains a terminal position somewhat similar to that of the stud 122 shown in Figure 21. However, in this terminal position it is spring pressed against the inner periphery of its gear 137 by means of its associated lever 132, pincer members 134, and spring 136. Thus when the shaft 100 is rotated in the reverse direction, during its return movement, the spring held stud 138 will reenter its groove 139 at the same angular position where it left it, and thus will connect its respective gear 137 to the shaft 100 again and return the gear back to its initial position where it is when the machine is at rest. During the pivotal movement of the rod 123 which disengages a stud 138 from its groove 139 all of the studs 122 keyed on the same rod, that is, belonging to the numerical order of tens in the various totalizers, likewise become inclined so that those which have engaged in the notches 121 of the disks 110 become disengaged therefrom after having carried the disks 110 of the tens of all the selected totalizers around the tenth of a revolution corresponding to the figure "1" that is to be registered. This disengaging procedure is repeated for the disks of each numerical order at the instant when these disks have performed as many tenths of a revolution as there are units to be registered in that particular order.

While one rod 123 is performing its pivotal movement, thus permitting the studs 122 and 138 which it carries to become disengaged from the notches 121 and 139 in which they repose, the lever 132 carried by this rod pivots in the same fashion as the studs and its roller 133 serves to separate one of the jaws 134, 134' (against the action of spring 136), while the other is held in place by a stop 141 (Figure 5) which bears against the adjacent arm of the serrated wheel 131. The springs 136 thus serve to oppose all untimely pivotal movement of the rods 123 with the studs 122 and 138, because, as long as these are not caused to oscillate by depressing an amount key to stop the rotation of a gear 137 they cannot effect tensioning of the spring 136.

The shape of the notches 121 (Figures 4 and 20) is such that during the pivoting of the studs 122 they continue to engage the notches 121 so as to hold them stationary until studs 122 are fully disengaged therefrom. Thus the disks are prevented from continuing to rotate, as a result of their momentum, beyond their desired final position. This is another important function of the studs 122 beside their function as clutches to engage the individual disks with the shaft 100. Figures 12a, 12b and 12c show three relative positions of a stud 122 with respect to its notch in a disk 110. Figure 12b shows the stud 122 holding a disk 110 stationary while it is being disconnected from it due to the rotation of rod 123 within and with respect to shaft 100. Moreover, correct alignment of the totalizer disks 110 is insured by means of spring pressed pawls 142 (Figures 4 and 20) which are mounted on the shaft 116, one being provided for each disk 110, and which are resiliently forced into place between the teeth of the disks by the action of springs 143.

*Mechanism for setting up the amount (keyboard)*

The keys 215 (Figure 2), the depression of which determines the amplitude of rotation of the totalizer disks 110, are grouped, at the front face of the machine, into a keyboard that has as many columns as there are figures in the largest amount that can be registered at one time, that is, five, in the embodiment shown. Each column has nine keys, carrying figures 1 to 9, mounted in an arched support 210 (Figures 17, 18) which is carried by two longitudinal rods or bars 211 and 212. The bar 212, over the entire width of the support assembly 210, has a flat portion 213 which, after the bar 212 is suitably rotated, makes it possible during assembling and dismantling, to remove individually each of the supports 210, which then pivot about the lower bar 211. The bar 216 of each key 215 is guided in a recess 216a in its support 210 and supported laterally by the cover 214 thereof (Figure 18). A lug 217 integral with each bar 216 protrudes into an opening 217a through the support 210 and bears against a recall spring 218 mounted in this recess around a stud 219 which likewise serves as a supplementary guide for the bar 216 and which passes through a hole in the lug 217. The downward travel of the key 215 is limited by a claw 220 near the outer end (Figure 17) of bar 216 and its upward or outer travel by a shoulder 221 (Figure 17) on the bar. The lower surface of the shoulder 221 is inclined and cooperates with a stud 222. All of the studs 222 of the same column of keys are attached along an oscillating arcuate member called the "detent arc" 223 suspended at the top of support 210 by a small link 224 and at the bottom by a follower 225, these two members being pivotable about pivots 226 and 226' respectively. The detent arc may therefore oscillate to a small extent, substantially along an arc of a circle having the shaft 300 as its center. When a key is depressed, its shoulder 221, as it acts against the corresponding stud 222, slightly pushes the detent arc 223 clockwise against the action of a recall spring 227, until the stud 222 engages into a notch 228 of the shoulder 221 as the arc 223 recoils slightly under the action of spring 227. The depressed key therefore cannot rise under the action of its spring 218.

The detent arc 223 is flanked by a locking arc 229 (Figure 18) guided by small links 230 and 231 which oscillate on the same pivots 226 and 226' respectively as do the link 224 and the follower 225. The locking arc 229 has angular recesses or transverse holes 232 (Figure 17) of a number equal to those of the keys of a column, that is, nine, adapted to cooperate with studs 233 each attached to the side of a rod 216. Normally the studs 233 are above the arc 229 facing the entry of the angular recesses 232 each of which has a radial portion and a lateral portion as shown in Figure 17. When a key is depressed, its stud 233 engages in the angular recess down to the bottom of its radial portion. During operation, the locking arc 229 is moved clockwise (as viewed in Figure 17) by means hereinafter described, so that the stud 233 of each depressed key engages into the lateral portion of the recess 232 and is retained there by the outer edge thereof; this edge likewise comes in front of the stud of each non-depressed key so that after the locking arc 229 is moved clockwise and until the end of the operation, that is, until the arc 229 is brought back to its normal position, no new key can be depressed, whereas the already depressed keys cannot become untimely released. However, before the locking arc is moved clockwise, any error made in choosing the keys to be depressed can be corrected, thus: if, in addition to the key depressed by error, another key of the same column is depressed, it will move the detent arc 223 as above described and at this instant the first key will be freed and will spring back under the action of its recall spring 218.

The keyboard has no "zero" keys, the function of such being fulfilled in each column by a pawl 234 (Figure 17) mounted on a pivot 235 attached to the support 210. The pawl 234 is pulled by a spring 236 which holds it inclined towards the center of the machine. In this position, the pawl 234 bears against a pin 237 which carries the follower 225. When, as a key is depressed, the movement of the detent arc 223 causes the follower 225 to oscillate clockwise, the pin 237 lifts the pawl 234 which thus becomes inoperative. When, on the other hand, the figure to be registered in the column under consideration is "0," no key need be depressed and the role of the "zero" key that should be depressed is played by the end of the pawl 234.

When an amount that is to be registered is set up by means of the keys, the operating shaft 100 is turned, as already described, in counter-clockwise fashion (Figures 17 and 20) to register the amount on the selected totalizer or totalizers; the rotation may also be effected in the reverse direction when performing a zero-setting operation. At the same time that the drive shaft 100 is rotated, the central shaft 300 is also rotated in the same direction and to the same amplitude, the movement being derived from the cam shaft 200 (Figures 13 and 14). The double lever 189 which operates the fork-shaped rod 184 also operates, through agency of a link 208 (Figure 15) and a pivot 209, a toothed sector 146 which freely turns on the central shaft 300. The toothed portion of the sector 146 is identical to that of the sector 201 which operates the shaft 100, and the amplitude of rotation of the two sectors is the same; however, the rotation of sector 146 is always effected in the same direction. The toothed sector 146 meshes with a pinion 144 cooperating with a pinion 145 of slightly larger diameter. The two pinions are loosely mounted on the shaft 100 and the pinion 145 meshes with a toothed sector 147 keyed onto the central shaft 300. This return movement is so effected as to produce a maximum amplitude of the sector 147 equal to the angle formed by the radii extending from the shaft 300 towards the key "9" and towards the zero pawl 234, respectively (Figure 17), it being understood that the amplitude of movement of sector 147 is greater than that of sector 146 because of the various sizes of the pinions and the diameters of the sectors.

*Operating elements*

The gears 137 carried by shaft 100 each have a tooth 148 of slightly larger width than the other teeth (Figures 3, 17 and 19) which is adapted to engage with an isolated tooth 241 carried by the sector 240 slightly beyond the plane of the other teeth of a gear 137. The tooth 148 only strikes the isolated tooth 241 when the rotation of shaft 100 takes place in counter-clockwise direction, corresponding to a registering operation; it then moves the sector 240, the toothed portion of which engages with the ordinary teeth of the gear 137.

It will be remembered that in the case of the sixth and seventh gears 137 from the right in Figure 3, the sectors 240 do not exist, and these two gears 137 cooperate only with the sectors 245, this cooperation being only during a zero setting operation.

Furthermore, each gear 137 engages with one of the sets of teeth of a double pinion 242 loosely mounted on a shaft 243 supported by the partition 103 and by a stationary support 238 (Figure 19). The other set of teeth of the pinion 242 are adapted to mesh with a toothed sector 245 rotating on shaft 300. This second toothed portion of pinion 242 includes a larger width tooth 244 and the toothed sector 245 has an isolated and laterally offset tooth 246. These two special teeth only come into engagement (as the shaft 100 starts to rotate) when said rotation occurs in clockwise direction, which corresponds to a zero-setting operation. Thus, depending on the individual direction of rotation of shaft 100 it is either the sector 240 or the sector 245 which is moved clockwise.

Either of the toothed sectors 240 and 245 during its rotation carries along a plate 248 (Figures 17 and 18) which is adapted to pivot on shaft 300. For this purpose the sector 240 is provided with a lug 239 (Figure 18) perpendicular to the plane of the sector, whereas the sector 245 has a lug 247. The plate 248 has a shoulder 249 offset laterally so as to place it in the plane of the rods 216 of the keys (Figure 18) and which is sufficiently long to strike the rod of a depressed key or the end of the zero pawl 234 when the latter is not lifted. The plate 248 likewise carries a bolt 250 guided radially by two small links 251 and 252, pivoted, for one thing, to the shoulder 249, and for another thing, to the bolt 250. To the small link 252 is attached a roller 253 which normally engages into a notch 254 on a crescent-shaped segment 255, the hub of which is keyed to shaft 300. Since the rotation of shaft 300 is synchronous with that of sector 240, the members 240, 248, 250 and 255 move together, during the registering operation, until the shoulder 249 of plate 248 is stopped by the pawl 234 or by the rod of a depressed key 215. The shaft 300 continues its rotation with segment 255 which forces the roller 253 to become disengaged from notch 254 of the segment and to move the bolt 250 outwardly in a radial direction against the action of a coil spring 256 until the tip of the bolt engages in one of the recesses 257 provided in the interior periphery of the key support 210. The roller 253 rolls on the segment 255, which continues to advance, whereas the plate 248 remains stopped, along with segment 240 and gear 137 in an angular position determined by the numerical value of the depressed key. As already described, this stoppage causes the stud 138 (Figure 3) to become disengaged from the groove 139 of the gear 137, and to rotate the rod 123 along with the lugs 122 that it carries, and to immobilize the disks 110 which indicate the figure corresponding to the key that has been depressed. If the figure to be indicated is "0," the shoulder 249 will have been stopped by the pawl 234 as if a "zero" key had been disposed ahead of key "1" and had been duly depressed. However, the shaft 100 and the studs 122 and 138 along with it (which, as shown in Figure 21, are in the inactive or inclined position) continue their rotation until the revolution is completed. The shaft 300 likewise continues its rotation and stops when the tip of segment 255 comes adjacent the roller 253.

During the return rotation of shaft 100 in the other direction, the studs 138 which participated in the operation, remain in inclined position, with their points directed in the direction of the movement. When a stud 138 encounters the groove 139 it engages therein (Fig. 17), becoming straightened out under the action of spring 136 (Fig. 5) and brings the gear 137 into its position of rest. This gearing likewise carries the corresponding sector 240 to its position of rest so long as the teeth thereof remain in mesh. It is to be noted that the studs 122 for their part do not move back the totalizer disks 110 which they actuated, because before the shaft 100 moves backward, the lever 153 operated by the groove of cam 151 (Fig. 8) has brought the selected totalizers to a position of rest by an axial right-to-left movement (Fig. 3) so that the studs 122 are able to turn freely and straighten out in the annular space of the disks 110 without rotating their disks.

Along with shaft 100, the shaft 300 also moves back with segment 255. When the notch of the latter comes beneath roller 253, the latter engages therein and allows the spring 256 to withdraw the bolt 250. The plate 248, thus set free, is likewise brought back, and, acting on the lug 239 of the toothed sector 240, it serves to bring the latter into its position of rest.

*Resetting a totalizer to zero*

The operation is similiar during the time that a totalizer is being set to zero. In that case the control lever 310, having been placed in corresponding position, and the totalizer that is to be set to zero having been selected with the aid of lever 290 (when one of the individual totalizers is involved) the rotation of shaft 100 is effected, as already described, in clockwise direction (Fig. 17). The plates 248 of all of the numerical orders participating in the operation are therefore driven through intermediary of the gears 137 and 242 and the toothed sectors 245, whereas the sectors 240 remain stationary. The disks 110 of the selected totalizer are all driven, in the direction opposite to that in which they turn during the registering operation, by the lugs 122, each of which engages in one of the notches 121 of the corresponding disk. Each disk 110 which engages with an indicia wheel 120 (Fig. 20), carries the latter along during its rotation and is stopped, when it reaches the zero position, by an abutment tooth 140 integral with wheel 120 (Fig. 20). As shown in Fig. 3, each wheel 120 is integral with a ring 126 adapted to turn on the stationary shaft 118. The tooth 140 is formed on ring 126 and serves principally, in cooperation with a carry-forward cam 262 (Fig. 20), carried by a shaft 264, to condition the mechanism for carrying forward the tens of a disk 110 to the adjacent disk 110 of a higher numerical order, as will be explained. However, during the operation of setting the totalizer to zero, when the wheels 120 turn counterclockwise, the tooth 140 of each wheel strikes the portion 281 of the cam 262 at the instant when the wheel 120 (and the corresponding disk 110 along with it) reach the zero position. At this instant the disk 110 stops, but its stud 122 (which is rotated along with its rod 123 so as to become disengaged from the notch 121) continues its rotation along with shaft 100 until a complete revolution has been effected. Obviously, the disks of one and the same totalizer (which, before being set to zero, indicate different figures) will stop at different instants, each one after as many tenths of a revolution as there are units to be indicated.

At the same time that each disk 110 stops, the gear 137 will also stop, said gear corresponding to the same numerical order, because the rotation of rod 123 disengages the stud 138 from the groove 139 of gear 137. When the latter stops, the pinion 242 and the toothed sector 245 will likewise stop. The plate 248, previously carried along by sector 245 through intermediary of its lug 247 acting on a member 258 integral with the plate, is likewise stopped because the hook 259, oscillating about a pivot 260 carried by the sector 245, serves, under the action of a coil spring 261, to hook itself to the member 258 and to lock the plate 248 and sector 245 together. On the other hand, the segment 255 continues its rotation along with shaft 300 and, as previously described, moves the roller 253 along with the bolt 250 which blocks the plate 248 in the position corresponding to the figure indicated by the disk 110, of the same numerical order. The plate 248 is retained in this position until the return rotation of shaft 100 brings all the elements above mentioned to their position of rest, all as if a registering operation had been performed.

The hook 259 just mentioned, performs still another function which resides in preventing the untimely movement of one of the toothed sectors 240 or 245 when the other is actuated. For this purpose, when it returns to the position of rest after a zero-setting operation, the hook 259 strikes a yoke 370 which extends the whole width occupied by the key mechanism, and it disengages itself, by a counterclockwise pivotal movement, from the member 258, thus permitting the plate 248 to accompany the sector 240 to the next registering operation. At the same time the hook 259, through agency of a notch at its lower end, hooks onto the live end of yoke 370 so that the toothed sector 245 (with which this hook is integral) cannot move during the registering operation. On the other hand, when the operation to be performed is a zero-setting operation, the yoke 370 pivots for a purpose and through agency of means hereinafter described, in counterclockwise fashion, which serves to free the hook 259 and permits it again to hook itself to the member 259 so that the sector 245 can participate in the zero setting operation.

The shaft 300 carries, for each numerical order, in addition to the members already described, a bifurcated lever 631 (Fig. 17) and a sector 632 which communicates the movements of the shaft to an indicating and a printing mechanism respectively, so as to render the result of each registering or zero-setting operation of the cash register visible and to print the result on tickets or slips. These mechanisms will be hereinafter described.

Carry-over mechanism

The manner of turning each totalizer disk 110 as many tenths of a rotation as this disk is supposed to mark units has already been described, the angle of rotation being limited by the depression of one of the keys 215. It is apparent that when a disk, during the course of a registering operation, passes from the position "9" to the position "0," or beyond, a unit should be carried over to the adjacent left-hand disk 110 (Figure 3), that is, to the disk 110 of the immediately higher numerical order. This carrying-over of the tens is effected with the aid of rings 126 (Figs. 20, 21) each of which flanks and is integral with an indicia wheel 120 that engages with a totalizer disk 110. Each ring 126 has a tooth 140 which cooperates with the corresponding carry-over cam 262 with which a carry-over stud 263 is integrally associated, located, like the cam 262, on a shaft 264, but facing the adjacent left-hand disk 110. The shaft 264 is mounted, parallel to shaft 118, between two supports 265 which are adapted to pivot on a shaft 266. The distance between the shafts 264 and 118, during the operation of the machine, and the angular position of the rings 126 on the latter, are such that when a disk 110 passes from "9" to "0," its carry-over tooth 140 engages into a recess 267 on the corresponding cam 262 and causes it to turn counterclockwise along with its carry-over stud 263 such an angular distance that the finger 268 of the stud 263 comes into the path of the blades 269 attached to the shaft 266. When the shaft 264 is moved from the position of Figure 20 to the position of Figure 21 the distance between it and shaft 118 so reduced that the circular periphery of ring 126 lies in the path of the carry over cam 262 and prevents the cam 262 from passing through the plane common to shafts 264 and 118, as will be apparent from a study of Figure 21. Accordingly, the ring 126 is provided with peripheral recesses 140a and 140b on either side of the tooth 140, and the tooth 140 protrudes slightly outward beyond the otherwise circular profile of the ring 126. Thus when the shafts 118 and 264 are in the relative positions of Figure 21, clockwise rotation of an indicia wheel 120 will cause the tooth 140 to engage the recess 267 as described, and rotate the cam 262 to the position shown in Figure 21. The carry over cam 262, while passing through the plane containing shafts 118 and 264, enters the recess 140b in the ring 126, but once having passed through this plane it is held below this plane, and against the action of a return spring 270, by the periphery of ring 126, as shown in Figure 21. Each counterclockwise rotation of the members 262—263 in this manner is effected against the tension of a spring 270 tensioned between each stud 263 and a spring-carrying bar 271 that interconnects the supports 265. Each spring 270 therefore tends to bring its member 263 to the position of rest in which it rests against a stationary bar 272 fitted between the supports 265.

The member 262—263, moved by the carry-over tooth 140, thus reposes, in the carry-over preparatory position of Figure 21. The subsequent clockwise rotation of the shaft 266 brings one of the blades 269 into engagement with the finger 268 of member 263 and turns the latter to such an angular extent that a tooth 279 of this member, as it comes into engagement with one of the teeth of the toothed portion of the corresponding gear 120, turns the latter as well as the corresponding disk 110 a tenth of a revolution, after which, the carrying-over having thus been effected, the gear 120 is blocked due to the striking of its ensuing tooth against the portion 280 of the member 263. If the gear 120 is originally in position "9," its rotation, caused by the carry-over operation will in turn start the carrying-over of a unit on the following left hand wheel, and this carrying-over will be rendered effective by the blade 269 which follows the one that effected the first carry-over. The shaft 266 makes two complete turns during each operation of the machine so that it can effect, if necessary, eight consecutive carry-overs, after which the shaft 264 becomes spaced from shaft 118 to the position of Figure 20 so as to permit the members 263 to become disengaged from the wheels 120 and to be brought back to the position of rest by their springs 270.

The shaft 266 obtains its rotational movement from the shaft 150 which, for this purpose carries an incompletely toothed wheel 273 (Fig. 22) meshing with a pinion 274 on the shaft 266. The ratio of the gears is such that the shaft 266 makes its two turns while the shaft 150 makes almost the last third of its rotation, while, during the first two-thirds of the revolution of the shaft 150, during the course of which the carry-over operations are being prepared, the shaft 266 is held stationary by the two locking cams 275 and 276 carried by the shafts 266 and 150 respectively.

The recoil movement of shaft 264 and its supports about their pivot, shaft 264, is likewise derived from shaft 150 (Fig. 20) to which two identical cams 277 are keyed that act on two rollers 278 each carried by one of the supports 265 of the shaft 264. When the machine is at rest (position represented by Fig. 20) the rollers 278 are respectively opposite the cut-away portion of each of the cams 277, which permits a spring (not shown) to hold the shaft 264 separated from shaft 118. However, when the shaft 150 starts to rotate, the cams push the rollers (against the action of the spring) and cause shaft 264 to approach shaft 118 so as to permit the conditioning of the mechanism for the carry-over operations and the effecting of the same. At the end of the operation, the cut-away portions of the cams 277 again engage the rollers 278 thus permitting the spring to bring the shaft 264 so as to straighten out all the carry-over members 262—263 that have participated in the operation.

The recoil movement of the shaft 264 is utilized to block the gears 120, and, along with them, the disks 110 when the machine is not in use. For this purpose a blocking bar 540 (Fig. 36) extending the length of all the totalizers, is mounted between two levers 541 adapted to pivot on the stationary guide 117 on either side of the totalizer assembly. The levers 541 are operated by two rods 542 pivoted at 543 to the supports 265 of shaft 264. When the machine is at rest and the shaft 264 is spaced from shaft 118 which carries the gears 120, the bar 540 is engaged between the teeth of the latter and serves to block them (while keeping them exactly aligned) against untimely rotation. At the start of an operation, when the shaft 264 is brought near shaft 118 by the means above described, the rods 542 push the levers 541 along with the blocking bar 540 and thus release the gears 120 and the disks 110 for rotation during the operation, after which these gears and disks are again blocked by the recoil of the shaft 264.

*Operation counters*

The various operations effected by the cash register are separately counted by means of six counters, four of which count the operations of each of the individual totalizers A, B, D, and E, one being used for counting the non-registered operations (or so-called "making change" operations) and one being used for the counting of operations involving the setting-to-zero of the day totalizer J.

The counters may be of any suitable known construction provided they can be operated by a reciprocating movement. Hence the constructional details will not be described, but only the method of operating them.

All of the counters 283 (Fig. 24) are attached to the partition 103 of the machine near the selecting lever 290. It has already been explained that before each operation, this lever is brought into a position coresrponding to the operation that is to be effected, that is, to the lowest position of Figure 2, which represents a "making change" operation, or to one of the positions A, B, D, or E for registering an amount with the aid of one of the four totalizers A, B, D or E, the selection of which is being conditioned at the same time, or to the uppermost position for the operation of setting the day totalizer J to zero.

To the end of the shaft 284 by which each counter is actuated is pivoted a small rod 285 which is in turn pivoted to an oscillating lever 286 (Figs. 23, 24, 25). The latter terminates at its peak in a point which normally engages in a recess in a stationary stop segment 287 whereas the lower end of the oscillating lever 286 is guided by a slot, in a direction radial to the machine, on a stationary knob 288. Each oscillating lever is urged outwardly by a spring 289. The selecting lever 290 has a boss having two inclined ramp surfaces (Figs. 23, 24) which cooperate with pins 292 each attached to one of the oscillating levers 286. When the lever 290 is brought into one of its six aforementioned positions, its boss 291 bears against one of the pins 292 and forces the oscillating lever 286 which it carries, to descend against the action of the spring 289 until its pin 292 engages against the bottom of a notch 293 of a sector 294 which is adapted to pivot on the central shaft 300. The oscillating lever 286 is thus coupled to the sector 294 which, when the machine is started, has a slight oscillatory movement imparted to it by an eccentric 295 keyed to the camshaft 200 and transmitted to the sector 294 by a double fork 296 that cooperates with the eccentric 295 and oscillates about the shaft 300. The fork carries two lugs 297 between which normally extends the end 298 of the sector 294. The oscillatory movement thus transmitted to the sector 294 is transmitted by the lowered oscillating lever 286 and the corresponding small rod 285 to the counter that is destined to count the operations of the totalizer whose selection is determined by the position of the lever 290.

During multiple entry registering operations requiring additions to be made of such entries along with printing of the total on a ticket, this printing must not be done while a counter is operating, because each individual entry has already been counted. The counter which is engaged must therefore be prevented from operating while the total is being printed despite the rotation of the camshaft 200. For this purpose the fork 296 is disconnected from the sector 294 by the following arrangement:

A fork 299, the arms of which encompass the shaft 200, is guided longitudinally by a stud 301 which engages in a slot 302 of the fork. At its lower end the fork 299 has a slot 303 perpendicular to the direction of movement of the fork and in this slot engages a stud 304 carried by a lever 305 keyed to the shaft 306. This shaft receives an oscillatory motion, controlled by the control lever 310, through agency of rod 307 and arm 308 (Figure 27). One of the arms of the fork 299 has a suitably shaped slot 309 in which engages a stud 311 carried by a rod 312 that pivots on shaft 306. The same stud 311 engages in a socket 313 of the fork 296 (Figures 23 and 25). The shape of the slot 309 is such that, when the fork moves due to manipulation of control lever 310, the stud 311 will not act unless the latter is brought into the "ticket total" position (Figure 2). In that case the stud 311 is brought to the bottom of the V-shaped portion of the slot 309 and serves to carry the double fork 296 towards the right (Figure 23), thus freeing the tip 298 of the sector 294 from between the lugs 297. When the machine is started for the purpose of printing the ticket total, the rotation of the eccentric 295 with the shaft 200 has no effect on the sector 294 which then does not actuate the engaged counter.

*Control lever*

It has been seen that before the machine is started, the control lever 310 must be placed in the position corresponding to the nature of the operation that is to be performed. There are five types of operations corresponding to five positions of the control lever, to wit, as viewed from the bottom upwardly in Figure 2: (1) setting one of the individual totalizers A, B, D, or E to zero; (2) registering a single amount; (3) registering several related amounts which must then be added "multiple item registering"; (4) addition of these multiple item amounts or "ticket total"; and, (5) setting the day totalizer to zero. It has already been described how the control lever 310 affects the direction of rotation of the operating shaft 100, according to whether it is placed in the second or third of the above mentioned positions which correspond to a registering operation, or in another of its positions. The other effects produced in the machine by the movements of this lever will now be described.

The lever 310 has the general shape of a plate (Figure 27) the hub thereof being carried on the central shaft 300 and the handle 310' thereof being guided in a slot in the outer sheet-metal casing 105 of the machine. Notches in the slot make it possible to place the lever exactly in each of its five positions. However, the lower position, which corresponds to that involved in setting one of the partial totalizers to zero is normally blocked by the bolt 483 (Figure 2) of the lock 483a disposed to the right of lever 310, the key to which is in custody of some authorized person. The device described below prevents operation of the machine when the lever is in an intermediate position.

A roller 314 carried by an arm 315 (Figure 27) engages in a sinusoidal groove 316 in the body of lever 310. The arm 315 which is keyed on a pivot 317 is integral with a hook 435 (Figure 33) keyed to the same pivot 317 attached to the partition 102 of the machine. For each correct position of the lever 310 there is a bump in the sinusoidal groove 316, that is, a point at a definite distance from shaft 300. When the roller 314 is on one of the bumps, the hook 435 is lifted and does not prevent movement to the right of a plate 400 (Figure 33) this movement, as hereinafter described, being indispensable for starting the machine. If the lever 310 is stopped between two of its exact positions, the roller 314, being between two bumps of the groove, lowers the hook 435 which hooks onto a projection 436 of the plate 400 and blocks the machine. The safety arrangement just described operates also in the reverse direction, that is, during the operation it is not possible to move the operating lever 310 because the hook 435, being retained above the projection 436 of the plate 400 does not permit the arm 315 to pivot, so that the roller 314 remains blocked on one of the bumps of the slot 316 and immobilizes the lever 310.

During the operations in which the totalizers are set to zero, the keys 215 of the machine must be blocked against all manipulation, and the "zero" pawls 234 (Figure 17) must be raised to allow the plates 248 to leave their position of rest and to effect the movements required for the zero setting operation. As heretofore explained, the yoke 370 which extends the whole width of the keyboard, is titlted in counter-clockwise direction at the start of each zero setting operation, and this movement is controlled by the control lever 310 through intermediary of an arm 375 which carries a roller 318 that engages in a slot 319 of lever 310. The said movement of the yoke 370 brings it beneath projections constituting the right hand end of the followers 225 (Figure 17) which serve as a lower support for the detent arcs 223 of the key mechanism, thus preventing all rotation of the followers 225 that might result from manipulation of the keys. These are therefore blocked during the entire operation. Conversely, if one of the keys should accidentally remain depressed, the corresponding follower 225 will prevent the tilting of the yoke 370 and thus not permit the operating lever 310 to be brought into the position of readiness for setting a totalizer to zero. The shaft 343 which carries the yoke 370 likewise carries six lugs 363 (Figures 30, 31), that is, one for each "zero" pawl 234 with the exception of that of the numerical order of tens of thousands (in the day totalizer J) the operation of which will be described in the sixth following paragraph. When the yoke 370 is tilted, each lug 363 presses against a stud 234' (Figure 17) which is carried by the corresponding pawl 234 and withdraws the latter from the active position so as to disengage the lug 249 of each plate 248 and the toothed sectors 245. These movements take place both in the case of the five sectors that correspond to the five columns of keys as well as in the case of the sector of the next higher numerical order (thousands), which also has a lug 363. However, there is no lug 363 to release the sector for the highest order disk (the seventh) in the J or day totalizer. This is released in the manner described in the aforesaid sixth following paragraph.

*Interconnection of the control and selecting levers*

It is apparent that a correlation should exist between the positions of levers 310 and 290 (Figure 2); the connections used to produce this relationship between these two levers will now be described.

Laterally of the selecting lever 290 (Figures 23, 24) an arcuate member 320 is suspended by means of two levers 321 and 322 pivoting on pivots 323 and 323' respectively, attached to a support 324 (Figure 24) which ranges alongside the arcuate member 320 and is carried by the bars 211 and 212 which carry the supports 210 of the keys. Due to this mounting, the arcuate member 320 is able to move slightly, substantially about an arc of a circle having the shaft 300 as its center. A spring 325 tensioned between the support 324 and the arcuate member 320 tends to draw the latter upwardly but the arcuate member is retained by a hook 326 which is hooked to the pivot 327 that connects the arcuate member 320 to the lever 322 and attached, at 328, to the support 324 by means of a spring 329 that is stronger than spring 325. The latter is therefore normally tensioned. Locks 320 (Figure 24), one for each of the totalizers A, B, D, E and J are mounted in the support 324. Figure 24 shows the cylinder of one of the locks, indicated by 331. The keyholes for the locks appear in a vertical row to the left of handle 290' in Figure 2. One of the locks should be adapted to be actuated by the key intended for permitting the lever 290 to select the corresponding totalizer.

A plate 332 (Figures 26 and 24) has an elongated slot 332a which is guided by the lower, cylindrical periphery of the cylinder 331 and by a pin 333 which is attached to the body of the lock 320 and passes through a second narrower slot in the plate. The plate 332 is spring held towards the left by a tension spring 334 (Figure 24) attached to the support 324 and to the downturned right hand end of the plate. Above the plane of the plate 332 the cylinder 331 is flattened on its diametrically opposite sides, one of the flattened portions being shown in Figure 24. Adjacent the right hand portion of the slot 332a a second plate 335 is secured as by brazing or the like, to the top surface of the plate 332. The plate 335 lies in a plane wherein the cylinder has the aforesaid flattened portions. The left hand edge of the plate 335 is of such shape that it embraces the aforesaid opposite flattened portions of the cylinder 331 and thus prevents rotation of the cylinder until the plate 332 is pushed to the right against the action of the tension spring 334. In order to push the plate 332 to the right to permit the rotation of the lock cylinder 331, the lever 290 is provided with a solid portion having inclined faces between two slots 336 (Figure 26)

therethrough. Thus it is not possible to rotate a key in a lock 320 until the lever 290 has been properly positioned opposite to that lock so as to release the cylinder 331 for rotation by the key.

The cylinder 331 of the lock is provided at its lower portion with a cam-shaped bolt 337, which, when the selecting lever 290 is in correct position, engages in a slot 336 of lever 290 through one of the cut-out portions 338 (Figures 23) of the arc 320. When the cylinder 331 rotates, its bolt 337 forces the arcuate member 320 to rotate counter-clockwise (Figure 23) and the latter is not stopped until it strikes against the adjacent bolt. The descending movement of the arcuate member 320 turns the support lever 322 slightly counter-clockwise and this movement is transmitted by a lug 339 engaging in the bifurcated lower end of lever 322 and carried by the arm 340 of a yoke 360, which pivots about a shaft 361. The yoke 360 extends over the entire width of the key compartment and terminates, adjacent the control lever 310 (Figures 27 and 30) in an arm 362 which is connected by a link 341 to one of the arms of a bellcrank 342 pivoting about a shaft 350. The other arm of this bellcrank carries a pin 344 which engages in a slot 345 of the control lever 310. When the arcuate member 320 is pushed counter-clockwise by the bolt of one of the locks 330, the pin 344 is pushed towards the center of the machine to a position where it slides in the slot 345 and permits the lever 310 to move, which would not have been possible without actuating one of the locks 330 of the individual totalizers.

However, the length of the slot 345 is limited in such fashion that the lever 310 can only be moved between the four lowest positions shown in Figure 2. In the fourth position ("ticket total"), the pin 344 reaches the left end of the slot 345 as viewed in Figure 27, and the lever 310 cannot then be brought to its fifth position, corresponding to that adapted for setting the day totalizer J to zero. In order to make this possible, it is first necessary to push the selecting lever 290 upwardly to the end of its course, which is the position corresponding to selection of the day totalizer J. Slightly before the end of this movement the lever 290 strikes against a stud 346 (Figure 23) carried by the side of the arcuate member 320 and the arcuate member is raised, against the action of the strong spring 329. Then, only the first cut-out portion 338 (at the top) of the arcuate member 320 comes opposite the lock 331 of the totalizer J and permits the bolt 337 thereof to immobilize the lever 290 and the arcuate member 320. The upward movement of the arcuate member 320 is transmitted, as above described (except in the reverse direction) by the lever 322, yoke 360, link 431 and the bellcrank 342, to the pin 344 which is thus moved outwardly and away from shaft 300 to be completely disengaged from the slot 345 of the lever 310 and permits the latter to be placed in its fifth position which corresponds to setting the day totalizer J to zero.

Thus, as already described, during the operation of setting the individual totalizers to zero, the six first "zero" pawls 234 are drawn back by as many lugs 363 as are carried by the yoke 364. In order to set the day totalizer J (which has seven disks 110) to zero, it is necessary likewise to withdraw its "zero" pawl which corresponds to the higher numerical order (tens of thousands) and this is accomplished by a lug 388 (Figure 34) attached to the lever 322 that supports the arcuate member 320. This lug pushes back the pawl 234 in question during the rotation of the lever 322, which is effected by the movement of the selecting lever 299 preparatory of setting the day totalizer J to zero.

In order to avoid errors in the manipulation of the locks and in setting the amount to be registered, means are provided for making it impossible to actuate the locks when one or more of the keys are depressed, and the return of the key of an individual totalizer, if, at the end of the operation, one or more keys remain depressed. For this purpose the yoke 360 (Figures 30, 31) is flanked at the left hand end by an arm 365 carrying a roller 366 which, normally, when none of the locks is manipulated, occupies a position above the shoulder 369 on a lever 367 integral with the yoke 370. When the cylinder 331 of the lock of one of the individual totalizers is turned, the yoke 360 pivots clockwise as already described. The roller 366, as it descends, pushes the shoulder 369 of the lever 367 and thus imparts a rapid oscillatory movement to the yoke 370. When the roller 366 descends below the shoulder 369, the yoke 370 returns to its place under the action of a spring 371 (Figure 32) that connects it with the yoke 364, the latter being immobilized, as heretofore explained, by the roller 318 (Figures 32 and 27) engaging in the slot 319 of the control lever 310. The same oscillation of yoke 370 is produced when the cylinder of a lock is turned in the reverse direction to remove the key, the roller 366 in that case acting on the lower inclined surface of the shoulder 369. The yoke 370 serves to block the keys by acting on the shoulder 225a projecting from the followers (Figure 17), and, when a key is depressed, it is impossible to push back the yoke. It follows that, if it is desired to turn the cylinder of a lock when a key is depressed, the yoke 370 will strike the shoulder 225a of a follower 225 so that the roller 366 can neither descend nor ascend, and hence it will be impossible to manipulate the lock.

*Operation without using the totalizers as for making change*

In certain cases, for example for control purposes, or for simply making change, etc., it should be possible to operate the machine without registering or setting it to zero, that is, without actuating any of the totalizers and without using the key of one of the totalizers. For this purpose the selecting lever 290 is brought into its lower position, called the "making change" or "no sale" position in Figure 2. In this position of the lever 290 (Figures 23 and 31) a pin 372 attached to a projection on the body of the lever 290, engages into an inclined notch 368 provided at the upper portion of lever 367 which is integral with the yoke 370 and causes the latter to tilt counter-clockwise (Figure 23) where it becomes immobilized. Due to this, as already explained, the keys 215 are blocked against all manipulation, and conversely, when a key is depressed, the yoke 370 cannot tilt to the left and lever 290 cannot be brought to the "making change" position. Furthermore, it is not possible to place the lever 290 in the "making change" position unless the control lever 310 occupies the second or third position from the bottom ("simple registering" or "multiple item registering"). In fact, when the lever 310 is in another position, the yoke 364 is tilted, as has been seen, in a counter-clockwise direction (Figures 27, 31). The left hand arm (Figure 30) of the yoke 364 is flanked by a lug 373 which, as it oscillates with the yoke 364 comes into the path of the pin 372 of the selecting lever 290 and prevents the latter from engaging in the inclined notch 368 of lever 367. The latter, along with the yoke 370 is likewise tilted to the left so that the pin 372 as it strikes it, prevents the lever 290 from descending to the "making change" position. Conversely, when the selecting lever 290 is in this position, it is not possible to place the control lever 310 into the first, fourth, or fifth position because the pin 372, located ahead of the lug 373, prevents movement of the yoke 364 to the left, and, consequently, movement of lever 310.

Thus, as has been stated, the starting of the machine is initiated by the travel to the right of a plate 400 (Figure 33), the functions of which will be hereinafter more completely described. For this purpose it is necessary to lower a bolt 401 (Figure 33) which retains it in place as by hooking against a shoulder 401a on its lower face, irrespective of the type of operation that is to be performed by the machine.

When the operation involves the registering or setting to zero of one of the individual totalizers, preceded by the manipulation of one of the locks 330, the effect of this manipulation, as already described, is to initiate a pivotal counter-clockwise movement of the bellcrank 342 (Figures 27 and 33). The left hand arm of this bellcrank bears against a pin 348 carried by one of the arms 347 of a yoke 349 pivoting about shaft 350. The other arm 351 of the same yoke, which terminates in a fork 351a (Figure 33) embraces a pin 402 carried by the bolt 401. A spring, not shown, attached to the partition 102 and to the yoke 349, holds the arm 347 of the latter in contact with the bellcrank 342 so that when one of the locks 330 is manipulated, the movement of the lever 342 is transmitted to the bolt 401 which descends and frees the plate 400. When the operation contemplated is that of setting the day totalizer J to zero, for which the control lever 310 is brought into its highest position, it is this lever per se which, in pushing against the pin 348 by means of its inclined surface 352 (Figure 27) pivots the yoke 349 and thus lowers the bolt 401.

Finally, when the machine is intended to operate without registering or setting to zero, as during a so-called "making change" or "no sale" operation, the selecting lever 290 is preliminarily brought into the lower position corresponding to this type of operation. In its descent, the lever 290 strikes a lug 353 (Figure 23) of the arcuate member 320 and causes the latter to descend, which produces the same effect as the manipulation of one of the locks, that is, the pivoting of the support lever 322 and the yoke 360, movement of the rod 341 (Figure 33), pivoting of the bellcrank 342 and of the yoke 349 along with its arm 351, and lowering of the bolt 401. During these movements, the roller 366 of the arm 365 integral with the yoke 360 (Figures 30 and 31) becomes positioned below the shoulder 369 of the lever 367 which holds the lever 290 in its lower position, despite the tendency of the spring 325 to raise the arcuate member 320. The notch 368 at the tip of lever 367 into which the pin 372 of lever 290 engages, is of such shape that it permits the lever 290 to rise slightly, which induces a slight rotation of the lever 367 along with yoke 370, under the action of the spring 371 (Figure 32) in a clockwise direction so that shoulder 369 advances above the roller 366. In order to be able to raise the lever 290 into a position other than the "making change" position, it is necessary that the arcuate member 320 and the yoke 360 along with the arm 365 as well as the lever 367 return to their position of rest. The roller 366 however cannot rise over the shoulder 369 and push the lever 367 merely under the action of the spring 325 acting on the arcuate member 320. In order to raise the arcuate member 320, a hook 354 (Figure 23) is used which pivots on a shaft 355 carried by the lever 290. When the latter is in the "making change" position, the hook 354 hooks onto the pin 353 of the arcuate member 290, under the action of a spring 356 (Figure 23). As the lever 290 is being raised, the hook 354 carries the arcuate member 320 along, which causes the roller to rise above the shoulder 369. The arcuate member 320 moves upwardly slightly (its normal position) but the strong spring 329 then pulls it down and causes the hook 354 to move back against the action of its spring 356, after which the arcuate member 320, disconnected from the lever 290, is brought into the position of rest by the spring 329.

*Automatic operation of the control lever*

The most frequent operation of the machine is one involving simple registering, which requires that the control lever be in its second from the lowest position (Figure 2). However, this lever is often also in the fourth from the lowest position for adding and printing the total of several registering operations. In order to render the operation of the machine more expeditious, the lever 310 is automatically brought back to its second lowest position at the end of each operation done while it is in the fourth position. For this purpose the body of the lever 310 is provided, at the rear of the machine, with a small cam 376 (Figures 27, 28, 29) in the plane of which there is also disposed a feeler 377 suspended from two levers 378 and 379 pivoted on shafts 380 and 381 respectively, which are carried by a support 382 mounted on a stationary frame 600. The lever 378 which is of bellcrank type carries at the end of its other arm a pin 383 which, passing through an opening in the support 382, engages in the forked end of one of the arms of a bellcrank 384 pivoted on shaft 381. The other, likewise forked, arm of the bellcrank 384 operates a pin 385 attached to a lug 386. The latter is adapted to slide, by means of a slot 387, on a shaft 637 carried by the frame 600. The lug 386 which is normally to the right at the end of its course, as shown in Figure 27, is likewise supported by the end of a link 389, pivoted, at the other end to an arm 390 which pivots on the shaft 637. When the control lever 310 is brought into its fourth position, the cam 376 strikes the feeler 377 and forces it back towards the right, which action, due to cooperation of the bellcranks 378 and 384 pivots the latter clockwise against the action of a spring 391. As it pivots, the lever 384 carries the pin 385 along with the lug 386 to the left until the shaft 637 is at the right hand end of the slot 387. In this advanced position the lug 386, as it pivots clockwise on shaft 637, is able to strike a stud 392 attached to the body of the control lever 310 to give this lug an upward thrust. The arm 390 connected to the lug 386 by the link 389 is operated by the forked rod 394 which carries a roller 395 that cooperates with a cam 393 keyed onto the camshaft 200. This shaft, as already stated, effects one complete revolution during each operation of the machine. The shape of cam 393 is such that as the operation is started, the rod 394 is slightly raised and the lug 386, being in the advanced left hand position, hooks onto the stud 392 and remains there during nearly the entire duration of operation of the machine. Towards the end of the operation, the cam 393 abruptly raises the rod 394 and the stud 386 along with it. This movement, transmitted by the stud 392 to the lever 310, is of such amplitude that this lever, as it pivots on the central shaft 300, is brought into its second lowest position, which it must occupy when a fresh registering operation is to be effected. At the same time the spring 391 brings all of the aforementioned members into their position of rest.

*Motor elements*

So far, the totalizers per se as well as the operation of the elements of the machine which participate in an operation have been described. The motor elements which serve for starting the machine and rendering the aforesaid means capable of performing the pre-set operation will now be described.

The motive power which actuates the machine may be furnished (in the customary manner) by an electric motor disposed inside the machine, or also, in case the power fails, by the operator himself through agency of a crank. The two drive means may be used at will without the need of any clutch means.

The electric motor 501 (Figures 36 and 37), which may be of any suitable type and which is, preferably, of the single-phase auxiliary pole type, operating at a frequency of 40 to 50 cycles, and provided with a speed reducer 502, is suspended by arms 503 (Figure 37) on the journal 504 of the drive shaft 500 and its gear 505 meshes with the gear 506 loose on the shaft 500. The motor 501 furthermore is supported in resilient fashion on the bedplate 101 of the machine (Figure 36), the resiliency being provided by blocks of rubber 109. Due to this floating mounting, the gears 505 and 506 remain constantly in mesh and devoid of any shocks that the slight oscillations of the motor may produce during operation, as a result of rapid variations in the resisting torque.

The engagement between the gear 506 and the shaft 500 is effected, for the duration of the operation, by means of a roller clutch composed essentially of a bowl-shaped member 507 (Figure 37) integral with the gear 506, and a disk 508 keyed to the shaft 500. Three rollers 509 (Figure 36) each housed in a wedge-shaped recess in disk 508 serve to effect connection between the latter and the bowl-shaped member 507 when they are wedged between these two members as a result of the counter-clockwise rotation of the bowl-shaped member 507 (as viewed in Figure 36) carried around by the motor. The wedging of the rollers 509 furthermore is facilitated by springs 510 lodged in the body of the disk 508.

Furthermore, the shaft 500 carries gear 511 keyed thereto which, through intermediary of gears 512 and 513 keyed onto the shaft 150, is driven by a pinion 514 (Figure 36) keyed onto a shaft 515. The latter, which extends from the right-hand side of the machine (Figures 1, 35 and 36) carries a crank 516 which acts through intermediary of a roller clutch 517—518, said clutch having two rollers but otherwise being similar to that used between the motor and the shaft 500. Thus it is apparent that the shaft 500 can be driven either by the motor 501 or by the crank 516.

The drive shaft 500 which was described above makes one complete rotation per operation, which, when manual operation is contemplated, requires two complete turns of the crank 516. If operation is effected by the motor drive the rotation of the shaft 515 is limited to one rotation by the following mechanism: A pawl 519 (Figures 36 and 38) having two teeth 521 and 522 is adapted to pivot on the shaft 520 attached to the partition 102. The tooth 521 can engage into a notch 523a of a disk 523 attached to the shaft 500 and prevent the latter from being turned by the crank 516 if the machine is not unblocked, as hereinafter explained. The tooth 522 can engage into a peripheral recess (not shown) of a flat disk 524 (Figure 37), loose on the hub of disk 523, and carrying, perpendicular to its plane, three pins 525 each of which engages into a central aperture in each clutch roller 509. The tooth 522 holds the disk 524 in the disengaged position, whereas the pins 525 push the rollers, against the action of the springs 510, into the widest portion of the notches in the disk 508. Between the disk 524 and the disk 523 are also mounted (on the hub of the latter) a notched disk 526 (Figure 39) which likewise cooperates with the tooth 522 of the pawl 519, and a cam 527 which is integral therewith, as well as a circuit-breaking contact cam 528 (Figure 40) assembled in adjustable fashion on disk 523. The cams 527 and 528 cooperate with a bell crank contact lever pivoting about a stationary shaft 529 (Figure 36). One of the arms 530 (Figure 36) of this lever carries a roller 531 which is adapted to engage in the peripheral notches 527a and 528a of the two cams 527 and 528 at the same time; the other arm 532 of the contact lever (extending to the left of shaft 529 in Figure 36) terminates in a rod of insulating material 533 which, when the arm 532 pivots in clockwise direction, causes the engagement of two electric contacts 534 and 534'. The contact cam 527, integral with its notched disk 526 is subject to the action of coil spring 535 (Figure 39) which tends to make it turn clockwise ahead of the rotation of the drive shaft, but this movement is normally rendered impossible by the pawl 519, the tooth 521 of which holds the disk 526 in a position in which the roller 531 of arm 530 engages into the notch 527a of the cam 527 and at the same time into the notch 528a of cam 528 which is integral with the stopping disk 523.

In order to start the machine, it is therefore necessary first to retract the pawl 519 and for this purpose the large release key 440 (Figures 2 and 33) is depressed. The key 440 is affixed to the outer end of a rod 441 which is guided through a stationary block 442 disposed towards the center of the machine. The end of rod 441 carries a pin 444 which engages in the forked end of a bellcrank 450 pivoting about a shaft 449 and bearing, with its other end, against a shoulder 458 of the plate 400, which, as already recited, must travel to the right (Figure 33) when the operation of the machine is started. When the release key 440 is depressed against the action of a sufficiently strong spring 443, the bellcrank 450 pivots clockwise and releases the plate 400. It is to be noted that the plate 400 must be released by pressing on the key 440 even when it is desired to operate the machine manually by means of the crank 516. It will be recalled that the bolt 401 (Figure 33) which likewise holds the plate, has been retracted during the course of the movements involved in setting the selection lever 290 and control lever 310 in readiness, so that when the release key 440 is depressed the plate 400 can move to the right under the action of a powerful spring 403 attached to the plate at 438. In its movement to the right, the plate 400, which is guided by a large slot 429 surrounding the central shaft 300, pushes a link 430 and causes the pivoting, about a shaft 431, of one of the arms 432 of a yoke 433 the other arm 434 of which (Figure 36) is connected to a lever 536 attached to the shaft 520 which carries the pawl 519 fixed thereto. The latter is thus rotated clockwise and frees the disks 523, 526 and 524; due to the action of spring 535 (Figure 39) the cam 527 turns through a certain angle, advancing in proportion to the subsequent rotation of the shaft 500, pushes the roller 531, causing the bellcrank 530—532 to pivot, and closes the contacts 534—534', thus starting the motor. At the same time the pin-bearing disk 524 allows the rollers 509 to engage so that the whole system starts to turn along with the shaft 500.

Slightly before the shaft 500 has made a complete rotation, the plate 400 is brought back, as hereinafter described, to its position of rest, and, while, during this movement, it carries the rod 430 to the left, it causes the pawl 519 to turn counterclockwise. The latter first engages with the notch of disk 526 which is thus immobilized while the shaft 500 is still turning, and thus retensions the spring 535. The roller 531 of the arm of lever 530 nevertheless remains in separated position because only the cam 527 presents its notch in front of it, whereas the contact-breaking cam 523 still presents its circular face, so that the electric circuit still remains closed and is not opened until the actual end of the operation, when the cut-away portion of the cam 523 likewise comes in front of roller 531. At the same time the pin-bearing disk 524 is immobilized by the tip 522 of the pawl 519 and its pins 528 retract the rollers 509 so as to effect disengagement of the clutch, whereby the shaft 500 is stopped by the pawl 519, the tip 525 of which drops back into the notch of the disk 523. In this manner of inertia of the motor and its speed reducer does not affect the shaft 500, because, as soon as the latter stops, the bowl-shaped member 507, loose on shaft 500 turns freely with the motor until the motor stops.

As has been explained, the rotation of the drive shaft 500 is transmitted to the camshaft 200, by the gears 511, 537, 532 and thence, by way of the mechanism shown in Figure 13, to the shaft 100 carrying the totalizers. It is also transmitted to the shaft 150 by the gears 511 and 512, whereby the cam 150 of Figure 37 is rotated for the purpose previously described.

*Safety plate*

It has already been stated that at the start of each operation the plate 400, freed by manipulation of the large release key 440, moves to the right under the action of the spring 403 (Figure 33) and thus starts the motor 501.

The spring 403, attached to the plate 400 at 438 is attached at its other end to a rod 404 pivoted at 405 to an arm 406 which is able to pivot on the shaft 192 and which, normally, is kept at rest by a roller 407 carried by it and which engages in the side groove 408 of a plate-like cam 409 attached to shaft 200. The rod 404 is held in assembled relation with the plate 400 through intermediary of a knob 410 attached to the plate and engaging in a slot 411 of the rod. When the plate 400 moves to the right, its travel is limited by the length of the slot 411, the rod 404 remaining at rest.

During its movement to the right and its return movement, the plate 400 performs still other functions which will now be described. It has been stated that after a registering operation has been set in readiness and during the entire duration thereof, the keys 215 must remain latched by the locking arcs 229 which prevent the depressing of a new key or the freeing of the depressed keys. The arcs 229 are operated through agency of the plate 400 which for this purpose has an inclined groove 412 into which a pin 413 carried by a fork 414 (Figure 33), is able to slide. The latter is guided, at one of its ends, on the central shaft 300, and pivoted, at the other end, to an arm 415 keyed on a shaft 416 supported by the partition 102 and by a support 417 attached to the partition 103. The effect of the movement of the plate 400 to the right is to raise (through intermediary of pin 413) the fork 414 and to cause the arm 415 and shaft 416 to pivot in counterclockwise direction. Two identical arms 418 keyed to the ends of the shaft 416 carry a rod 419 which extends the whole length of the keyboard and engages, due to the above described movement in which it participates, in the notches 620 (Figure 17) of the links 224 that support the upper ends of the locking arcs 229. The latter are thus raised and block the key assembly for the duration of the operation. When, at the end of the operation, the plate 400 is brought back to the left, to its position of rest, all the movements just described occur again in the reverse direction and the keys are thus freed so as to be ready for setting for a new registering operation.

The return of the plate 400 to its position of rest is controlled by the cam 409 (Figure 33) keyed to the shaft 200 which is driven through one rotation during each operation. Slightly prior to completing the rotation, the depression 408a in the groove 408 of the cam 409 moves the roller 407 to the left, thus causing the arm 406 to pivot rapidly about the shaft 192, first to the left and then to the right. In its movement to the left, the arm 406 is accompanied by the rod 404, which pushes the plate 400 to the left, since the knob 410 on plate 400 is at that time engaging the right end of slot 411 in the rod 404. The plate, during this return movement, travels slightly beyond its normal position, thus permitting the pawl 450 to drop back in front of the shoulder 458 of the plate. During the time that the cam 409 is completing its rotation, the depression 408a of the groove 408 travels beyond the roller 407, which brings the arm 406 and the rod 404 back to the right, to their position of rest, and tensions the spring 403. Due to this, the plate 400 is likewise brought back slightly to the right and is stopped in its normal position when its shoulder 458 strikes against the pawl 450.

During the return movement, to the left, of the plate 400, which denotes the end of an operation, it is necessary to return the keys that have been depressed during the registering operation. For this purpose the rod 404 is pivoted to a rod 421 which, in turn, is pivoted to an oscillating lever 422 (Figures 33 and 33a) pivoting on shaft 423 and carrying a small plate 424 at its free end. The plate 424 has a notch 425 in which engages a rod 426 which passes through an opening in a link 427 pivoted on a bellcrank 428 on the shaft 361. Rod 426 extends over the whole width of the keyboard. When, towards the end of the operation, the rod 404 is moved to the left under the action of the roller 407 operated by the cam 409, this movement serves to cause the counter-clockwise pivoting of the yoke 374 (Figures 33 and 17) which strikes the followers 225 (Figure 17). The latter, as they pivot, raise the detent arcs 223, the studs 222 of which become disengaged from the studs 221 of the keys 215 and permit all of the depressed keys to rebound under the action of their coil springs 218. Immediately thereafter, when the rod 404 retracts slightly to the right, the yoke 374, and along with it, the detent arcs 223, return to their normal position.

It may accidentally happen that the person using the machine keeps his hand on the key 440, which would initiate a second operation. In order to guard against this eventuality, the following safety arrangement is provided.

Laterally of the pawl 450 (Figure 33) there is mounted, on pivot 449, a counter-pawl 452 provided with a curved groove 453 in which a pin 451 of pawl 450 is able to slide. A spring 454 tensioned between the pawl 452 and pin 451 keeps the latter at the left end of the groove 453 to hold the pawl 452 raised when the pawl 450 is in the position of Figure 33. This pawl 452 terminates in a hook 452a offset laterally so as to be located in the plane of the plate 400, slightly above a shoulder 455 of the latter. When the release key 440 is depressed, the hook 452a on counterpawl 452 is caused to bear against the top of the shoulder 455. If the key 440 remains depressed while the plate 400 returns to the left during the completion of an operation, the counter-pawl hook 452a will drop in front of the shoulder 455 of the plate at the instant when the latter rides slightly beyond its normal position to the left, as above recited, and renders the unintended initiating release of a second operation impossible. When the key 440 is released, it rises under the action of its spring 443, lifts the pawl 450 slightly ahead of the shoulder 458 on the plate, raises (through intermediary of spring 454) the counterpawl 452 and thus permits the plate 400, under the action of spring 403, to resume its normal position which is determined by the engagement of shoulder 458 with the pawl 450.

Repeat key

As hereinbefore recited, the keys depressed for performing a registering operation are freed and rise to their original positions at the end of the operation. However, if it is desired to register the same amount several times consecutively, it is desirable to leave the keys depressed so that it is sufficient merely to depress the release key 440 for each succeeding operation without going through any other preparatory movement. For this purpose the machine is provided with a key 460, called a "repeat key," disposed at the right of the keyboard below the key 440 (Figures 2 and 33). The key 460 is on the outer end of a rod 461 guided, along the partition 102, in the slot of a block 462 and provided with a coil tension spring 463. Near its lower end the rod 461 forms a claw 464 the inclined lower end of which (when the key 460 is depressed) pushes against a pin 468 integral with a lever 469 that pivots on the pivot 449, a coil spring (not shown) serving to draw lever 469 downwardly. In a groove 470 on lever 469 is engaged a pin 471 attached to one of the arms of an oscillating lever 472 (Fig. 33a) shaped like a fork, which is guided vertically by the end of the shaft 423. At its lower end the oscillating lever 472 carries a pin 426 which, as already recited, passes through a hole in the link 427 used for transmitting to the yoke 374 the movement that, at the end of an operation, serves to free the depressed keys. It is apparent that when the repeat key 460 is depressed, the movement impressed by the rod of the latter to the lever 469 serves to raise the oscillating lever 472 along with the pin 426, so as to cause the latter to issue from the notch 425 of the plate 424 and thus to disconnect the rod 421 from the link 427. Under these conditions the yoke 374, since it receives no impulse at the end of the operation, will not release the depressed keys, and this will continue as long as the repeat key 460 remains depressed. In order to avoid unintended rebounding of the latter, its claw 464 has a notch 466 into which the pin 468 engages under the action of a spring (not shown) as soon as the key 460 is completely depressed.

Key-freeing mechanism

When it is no longer desired to repeat the registration of the same amount, it is necessary to free not only the repeat key 460, but also the keys 215 of the keyboard. For this purpose a knob 475 is utilized, disposed at the right of the machine, in front of the crank 516 (Figs. 1 and 35). This knob 475 is carried by a link 476 pivoted, at the rear of the machine, to one of the three arms of a lever 477, pivoted on the end of a shaft 478 attached to the partition 102. To the lower end of lever 477 is pivoted a rod 479 the opposite end of which has a slot 480 into which engages a pin 481 which carries the lever 428 integral with yoke 374. When the operator pulls the knob 475 along with the link 476 which is guided at its front end by a slot 482 and a stationary lug 483, towards the front of the machine (that is, to the left in Fig. 35), this movement causes the lever 477 to pivot counter-clockwise about the shaft 478. The rod 479 moves backwardly, carries the lever 428 integral with yoke 374 along and causes the latter to pivot in a counter-clockwise direction, the effect of this being, as already described, to free the depressed keys 215, through intermediary of the followers 225 (Fig. 17). In its pivotal movement the lever 428 carries to the left the rod 427 (Fig. 33) along with the pin 426 and the lower end of the oscillating lever 472. The upper end of this oscillating lever describes a circular movement towards the right, about the shaft 423 as a center, in which the pin 471 (Figs. 33 and 33a) that is embraced in the curved slot 470 of lever 469 participates. The curvature of the slot 470 is less than that of the path of the pin 471, so that the lever 469 is slightly raised and its pin 468 issues from the notch 466 in the repeat key rod 461, permitting the key 460 to return to its normal position under the action of its returning spring 463. So that the lever 469 may be raised with greater facility against the action of the repeat key return spring 463, the rod 479 carries a lug 484 (Figs. 33 and 35) the upper inclined surface 484a of which comes beneath the pin 426 and pushes it up slightly. After the key 460 is freed, when the operator releases the aforesaid button 475 on the side of the machine, all of the members are brought back to the position corresponding to the normal operation of the machine, that is, the lever 469 along with the oscillating lever 472 are drawn back by the recall spring (not shown) of the lever 469 until the pin 426 engages into the notch 425 of the oscillating lever 422; the linkage 479—477—476 as well as the yoke 374 and its lever 428 are brought back to their place by a spring 485 tensioned between the latter lever and the lug 484 of the rod 479.

The same mechanism is likewise used (prior to starting the machine by pressing button 440) when it is necessary to correct any error made in manipulating the keys; thus, pulling on the knob 475 serves to free the already depressed keys 215. Since the pin 468 is disposed beyond the notch 466 of the repeat key (which is not depressed) this key is not in this case affected by the manipulation of the knob 475.

When, at the end of a registering operation, the depressed keys 215 are liberated in normal fashion, by retraction to the left of the plate 400, the movement transmitted to the lever 428 by the rods 421 and 427 will exert no reaction on the assembly of elements just described, because, during the oscillatory movement of the lever 428, its pin 481 simply slides in the slot 480 of the rod 479 without moving the latter or the elements associated therewith.

The freeing of the keys with the aid of knob 475 must take place only before the machine is started, that is, before the plate 400 moves to the right on Figure 33. In order to avoid improper manipulations, the third or central arm of the lever 477 (Figure 35) carries a stop 474. If the knob 475 is pulled after the plate 400 has already moved to the right, the stop 474, as it pivots with the lever 477 about the shaft 478, strikes the lower horizontal surface of the large notch 429 in plate 400, by means of which the plate 400 is guided on shaft 300, and prevents manipulation of the mechanism used for freeing the keys until the plate 400 returns to its position of rest, after completion of the operation.

*General locking*

The operation of the machine, which in all cases, requires that the plate 400 be moved to the right, can be prevented by means of the general lock 486 disposed at the right of the machine (Figures 1 and 35). The rotary cylinder of this lock carries three arms 487, 488, and 489. When the lock is closed, the arms come into the position shown in Figure 35, that is, the arm 487 moves beneath the pin 402 of the bolt 401 which holds the plate 400 at the bottom and therefore prevents the starting of the machine. At the same time, a pin 490 attached to the arm 487 comes in contact with a lever 491 integral, through agency of member 492 (Figures 30 and 32) with the yoke 370; the pin 490 therefore tilts the yoke 370 which blocks all the keys 215 in the position of rest so that it becomes impossible to manipulate them. The second arm 488 of the cylinder, which is hook-shaped, hooks onto a pin 493 of the rod 479 and thus prevents the manipulation of the mechanism used for releasing the keys through the agency of the knob 475. Finally, the third arm, 489, is pivoted to a link 494 pivoted in turn to a lever 495 that pivots on the stationary pivot 483 (Figures 33 and 35). A pin 499 carried by the lever 495 (when the lock is being closed) strikes a claw 496 of a latching arc 497 which is thus rotated clockwise. The arc 497 is guided by two knobs 498 and 498′ engaging in arcuate slots in the latching arc, which is normally held in its original position by a spring (not shown). The arc 497 at its back has two notches 446 and 457 disposed, normally, laterally of the rods 441 and 461 of the release key 440 and the repeat key 460. These rods each carry a pin, 445 and 467 respectively, which engage in the notches 446 and 457 when the keys 440 and 460 are depressed. However, the closing of the lock 486 raises the latching arc 497 and the notches become separated from the rods 441 and 461, so that it becomes impossible to depress either one of the keys 440 and 460. Although it is still impossible to move the selecting lever 290, except in the lower position, it is not possible to manipulate the locks 331 of the totalizers because of the blocking of plate 400 by the bolt 401. Thus, all unauthorized manipulation of the cash register is prevented by the general lock 486.

*Modifications*

In a modified embodiment of the totalizer drive means, use is made, in each regulating mechanism, of a single toothed sector in lieu of the two toothed sectors 240 and 245 hereinbefore described. In this modified construction, the rotation of the drive shaft always starts in the same direction, irrespective of the nature of the operation that is to be performed. If the operation is one involving setting a totalizer to zero, the selection of the latter becomes possible when the drive shaft starts to rotate, said shaft carrying the totalizers (i. e. the disks thereof) along during its movement; however, when the shaft stops, at the end of its first stroke, the totalizer disks become separated from their respective carriers and the shaft returns to its normal position without bringing along the disks that it carried along during its forward movement or stroke. On the other hand, if the operation is one involving registering, the forward stroke of the drive shaft 100 is effected in so-called "empty" (no-load) fashion without carrying the totalizer disks along; the latter are not brought into engagement with their respective studs 122 until the brief stoppage of the drive shaft at the end of its first stroke, after which it carries them along during its return rotation. This simplified operation of the cash register is possible because of several modifications in the selecting mechanism, in the operation of the drive shaft and central shaft, and in the arrangement of the operating mechanisms. These modifications will now be described.

In lieu of the slotted profiled cam 151 (Figure 8) the cam shaft 150 carries two cams 550 and 551 (Figures 44 and 45) with which cooperate two curved levers 554 and 555 each of which carries a roller, 552 and 553 respectively, which rolls on the periphery of the corresponding cam 550 or 551. The two levers 554 and 555 which are able, under influence of the cams 550, 551, to pivot on a stationary pivot 556, each terminate in a lug 557, the striking of which against a pin 558 (or 559) of the cam 550 (or 551) serves to return such one of the levers 554 or 555 into its normal position as the cam 550 or 551 had caused to pivot. At the opposite end, each of the levers 554, 555 terminates in an enlarged portion (Figures 46 and 47) in which a slot 560 and 561, respectively, is provided. Into these two slots engages the end of a lever 562 that is keyed to the shaft 154, which is mounted in the stationary support 155 in such fashion as not only to be able to rotatably oscillate but also slide axially to a slight extent.

The shaft 154 derives its sliding movement from an oscillating lever 565 (Figure 44) adapted to pivot on a stationary pivot 566, the lever having a forked end engaging in a recess 564 in the left hand end of the shaft. The oscillating lever 565 carries two rollers 567 and 568 which alternately cooperate with a cam 569 keyed on the shaft 168. An oscillation imparted to the shaft 168 (by manipulation of the control lever 310, as already described in connection with Figure 10) is translated therefore into a movement of shaft 154 to the left or to the right, depending on whether the cam 569 pushes roller 567 or 568 of the oscillating lever 565.

The oscillatory rotary movement of the shaft 154 is imparted thereto by the lever 562. The slots 560 and 561 into which the end of the lever 562 engages (said lever accompanying the shaft 154 in its sliding movement) are so shaped, that, when positioned at the left in the slots (Figure 46), the end of lever 562 is only raised by the curved lever 554 when the latter oscillates under the influence of the cam 550. On the other hand, when the end of lever 562 is positioned, due to sliding of shaft 154, in the right-hand portion of the slots 560 and 561 (Figure 47) it is the curved lever 555 which alone can raise the lever 562, thus oscillating the shaft 154.

The bosses of the cams 550 and 551 have such angular positions with respect to shaft 150, that, when the shaft 154 is in the right hand position, which is the case when the control lever 310 is placed in a position preparatory to a zero setting operation, the shaft 154 is rotated through intermediary of cam 551 and the levers 555 and 562, when the machine is set in operation, and is brought back to its normal angular position at the instant that the drive shaft 100 (after having rotated one revolution) is stopped prior to its return rotation. The rotary oscillation of the shaft 154 serves to permit selection of the totalizers that are intended to participate in the operation, as described in connection with the mechanism for shifting the selector shaft 125 or the sleeve 183 and shown in Figures 7 to 12. On the other hand, when the control lever 310 is moved for a registering operation, this movement is transmitted by the rack 169 (Figure 10) to the shaft 168 and by the cam 569 and the oscillating lever 565 to the shaft 154 and to the lever 562, the end of which becomes positioned in the left-hand portion of the slots 560 and 561 (Figure 46). In this case, it is the curved lever 554 which oscillates the shaft 154 at the instant at which the drive shaft 100 is stopped after its forward rotation. At this instant, selection of the totalizers destined to participate in the operation can be effected, and their disks are carried along during the return rotation of the drive shaft 100.

From the foregoing, it is apparent that rotation of the drive shaft 100 is always effected in the same direction, which makes the operation of the same by the direction changing arrangement of Figures 13 to 16 superfluous. In the modified construction the rotation of the drive shaft is derived, as heretofore, from two cams 187 and 188 (Figure 41) keyed to the cam shaft 200 and which act on the two rollers 190 and 191 of a double lever 189 that pivots on shaft 192. At its upper end, at 193, the lever 189 is pivoted to two rods 571 and 572. The rod 572, through agency of a pin 573 drives a toothed sector 574 which is loose on the central shaft 300 and which meshes with the pinion 202 keyed on the drive shaft 100. The pinion 202 meshes in turn with a pinion 575 which meshes with a toothed sector 576 keyed on the central shaft 300. In this manner, when, as the machine is started, the cam shaft 200 makes a complete rotation along with its cams 187 and 188, the latter, due to their shape, will impart to the drive shaft 100 its one-turn rotation, followed, after a short stoppage, by a one-turn rotation in the opposite direction, and at the same time the central shaft 300 will partake of its usual movement. So that there may be no delay in the rotation of the central shaft 300 with respect to that of the drive shaft 100, the rod 571 strokes the toothed sector 576 by means of pin 577 on the sector and engaging a slot in the rod, and thus corrects any play in the transmission elements that may manifest itself towards the end of the travel.

At its lower end, at 578, the arm of the toothed sector 574 is pivoted to a rod 590 which, through agency of pin 591, operates the frame 643 that participates in the operation of the indicator, as hereinafter described.

Thus, as already recited, the modified operation of the drive shaft 100 makes it possible, in the case of each regulating mechanism, to replace the two toothed sectors (240 and 245) by a single toothed sector 592 (Figure 48) which participates in all the operations, both that of registering as well as that of setting to zero. Moreover, the operation of the regulating mechanism is substantially the same as that previously described. During each of its movements the toothed sector 592 is accompanied by the plate 248 which is now rendered integral with the toothed sector 592 by means of two struts or connecting pins 593 (Figures 48 and 49). The locking arrangement, with its members 249 to 255 is the same as that previously described in connection with Figure 17.

The movements of the mechanisms shown in Figures 41 to 50 during a registering operation and during a zero setting operation are as follows:

Preliminary to starting the machine for effecting registering, the selecting lever 290 is manipulated so as to select the individual totalizer that is to participate in the operation, and also the control lever 310, which is placed in a position corresponding to the nature of the operation that is to be performed, thus, "simple registering," or "multiple item registering" (Figure 2). The movement of the control lever 310 is translated into rotation of the shaft 168 (Figure 44) so that the cam 569 pushes the oscillating lever 565, along with the shaft 154 and the lever 562 to the left, and so that the end of lever 562 becomes positioned at the left in the slots 560, 561 (Figure 46) and cannot be raised except by the curved lever 554.

When the machine is started, the shaft 200 (Figure 41) starts to rotate in the direction of the arrow and almost immediately its cams 187 and 188 impart a leftwise or counterclockwise rotation to the toothed sector 574, and then, after a brief stoppage, bring it back to the position shown. The pinion 202 keyed to the operating shaft 100 transmits, due to this fact, a complete rotational clockwise turn to the drive shaft, then, after a brief stoppage, one rotation in the reverse direction. At the same time, by action of the pinion 515, the toothed sector 576 keyed to the central shaft 300, receives a movement similar to that of sector 574 but in the reverse direction. The operating shaft 100, the lugs 138 (Figures 49 and 48) of which engage in the grooves 139 of the wheels 137, carry the latter along, and with them, the toothed sectors 592 of all of the operating mechanisms. Every time that one of the lugs 249, during the forward movement, strikes the rod of a depressed key (or a zero pawl), it interrupts the rotation of the operating mechanism to which it belongs and thus stops the corresponding gear 137. Each operating mechanism remains blocked in the position it has attained, due to its bolt 250. Since the gear is stopped while the shaft 100 continues its rotation until its travel is completed, the clutch arrangement 138—123—122 pivots and completes its rotation along with the inclined lugs 138 and 122 until the forward travel of the shaft 100 is completed. It is to be noted that during all this first phase of the movement, no totalizer disk is carried along, because the selection has not yet been effected.

At the instant when the drive shaft 100 stops after its forward travel, the boss of the cam 550 (Figure 44) reaches the roller 552 of the curved lever 554 and causes the latter to pivot, which, in turn, raises the end of the lever 562 (Figure 46) and causes the shaft 154 to pivot. As was described in connection with Figures 6 to 10, the pivoting of shaft 154 imparts to the selecting shaft 125 the axial movement in which the selected totalizer participates, the notched cam catches 110' of which come into the plane of the corresponding dogs 122. The return movement of the toothed sectors 574 and 575 and of the drive shaft 100 then commences.

In its return rotation, the drive shaft 100 does not immediately carry the totalizer disks 110 and the gears 137 along. Such carrying-along, in the case of each numerical order, starts only at the instant at which the dog 138, as it encounters the groove 139 of the gear 137, engages therein and resets the clutch arrangement. At the same instant the notch 254 of segment 255 comes adjacent the roller 253 of the locking device and permits the bolt 250 to withdraw and unlock the entire corresponding operating mechanism. From this moment on, the gear 137 through agency of the clutch device 138—123—122 carries the totalizer disk or disks 110 of the same numerical order of the selected totalizer or totalizers along, and also, through intermediary of pinion 242, the toothed sector 592 and all of the operating mechanism until the position of rest of the latter is attained, that is, until the return rotation of the drive shaft 100 is completed. It will be apparent that in each numerical order, the totalizer disks 110 accompany the drive shaft during as many tenths of a rotation as the operative mechanism has been able to make tenths of its forward travel, before being arrested by a depressed key, and this number of tenths is equal to the numerical value of the depressed key. Thus, for example, if the figure to be registered in a given numerical order is "7," the operating mechanism is stopped by the depressed key "7," after seven tenths of its travel; the clutch mechanism has accompanied the gear 137 during seven tenths of a rotation, then it pivots and effects the remaining three tenths without the gear 137, but with the inclined and disengaged dogs 138 and 122. On the return travel, the dogs 138 and 122 remain inclined and disengaged from their notches 139 and 121 during the first three tenths of the rotation, then become reset when the dog 138 encounters the groove 139, and carry the totalizer disks 110 along for seven tenths of a rotation, thus causing them to register the figure "7." When the shaft 100 and the operating mechanisms stop, the boss of the cam 550 (Figure 44) comes out of engagement with roller 552 of lever 554, and the pin 558 as it strikes the lug 557 of the lever 554 brings the latter to its normal position, as well as lever 562 and the shaft 154, following which the selecting shaft 125 slides with the totalizer or totalizers that have participated in the operation and separates the cams 110' of the disks 110 from the dogs 122. The machine is thus ready for setting up the ensuing operation.

During an operation involving setting a totalizer to zero, the operation does not differ much from that just described. The preparatory manipulation of the control lever 310 serves to cause (through agency of shaft 168, cam 569 and oscillating lever 565) the shaft 154 to slide to the right so that the end of the lever 562 comes into the right-hand position of the slots 560, 561, as shown in Figure 47.

When the machine starts, the boss of the cam 551 serves to raise the curved lever 555 by means of the roller 553 and the said curved lever actuates the lever 562 and the shaft 154, which makes it possible to select the totalizer that it is desired to set back to zero. At this instant, the cams 187 and 188 (Figure 41) as above described, set the toothed sectors 574 and 578 in rotation and, along with them, the operating mechanisms and the drive shaft 100. The clutch arrangements 138—123—122 being normally in active position, all the totalizer disks 110 of the selected totalizer accompany the shaft 100 until each of them is stopped at zero position (by the tooth 140 of its indicia wheel 120 striking the stop 281—Figure 20). When a disk 110 attains this position, its dog 122, which continues to rotate with shaft 100, becomes inclined or disengaged, and pivots the bar 123 and the dog 138, which thus ceases carrying along its gear 137, along with the toothed sector 592. The segment 255, which continues to turn with the shaft 300, advances the bolt 250 which blocks all the operating mechanisms in the position thus attained.

At the end of the forward travel of the shaft 100, the cam 551 becomes disengaged from the roller 553, and the curved lever 555 is brought back to its normal position by the pin 559 which, at this instant, strikes the lug 557 of the lever 555. The latter lowers the lever 562, and the shaft 154, as it pivots in the reverse direction, brings the selecting shaft 125 back to its normal position, separating the totalizer disks 110 from their dogs 122. The return rotation of the shaft 100 is therefore effected without carrying along the disks 110. During this return rotation, the dogs 122 and 138 become reset in proportion as each of these encounter the groove 139 of the corresponding gear 137, which, from this moment on, brings the operating mechanism, unlatched by its segment 255, to its position of rest.

When a registering operation or a zero-setting operation is contemplated during the forward travel of the mechanism, the toothed sector 574 (Figure 41) through agency of its pin 578 carries the rod 590 to the right, and, towards the end of the travel, serves to cause the clockwise pivoting of the frame 643 along with the bar 642 which pushes all of the forked levers 631 (Figure 48) against the hubs of the plates 248, which is necessary for the functioning of the indicator which will now be described.

*Indicator*

The indicator is composed essentially of sets of rectangular plates 601 (Figures 1, 36, 51, 52, 53) carrying on one face the characters or figures destined to compose the desired indication.

These sets of plates are grouped in two series, the plates of one of the series carrying their inscription facing the operator and those of the other series facing the customer, so that each complete indication will appear on the two faces of the cash register. In order to have these two indications appear simultaneously, the two sets of plates (which, in the two series, must cause the same sign or figure to appear) are united in pairs to a common operating means. Thus, the sets of plates that indicate the hundreds of each of the two indications constitute a pair, and the same is true of the plates that respectively indicate the tenths, units, etc., and is also true of the two sets of plates that carry the conventional indicia, as the case may be, that denote the nature of the operation under way or the totalizer that is participating. It is to be noted that the two sets of plates constituting a pair are not placed back to back with respect to each other; on the contrary, so that the indication on each face of the cash register may be correctly composed, the two sets of plates, for example those of the hundreds range, which constitute a pair, are disposed at the opposite ends of the indicator, so that their figures are the last ones at the right in each of the indications.

In the embodiment shown, each series comprises eight sets of plates, to wit: one (the first at the left) for the conventional indicia, and seven others for the figures 0 to 9 which makes it possible to compose every amount up to 99999.99. Each plate 601, except the last of each set, is prolonged at the bottom by a rod 602 and in each set, the rods are offset laterally, one with respect to the other (Figures 51 and 53) so as to be arranged in gradients. The rods 602 of each set pass through apertures 602a (Figure 36) of corresponding shape in the frame 600 of the indicator and in a guide plate 603 supported, above the frame 600, by mounts 604. Each plate is able to occupy an upper position in which the figure that it carries is visible behind the window of the indicator while the lower end of its rod 602 is at the level of the frame 600. It attains a lower position by descending vertically a distance (height) equal to that of the plate 601 so as to uncover the ensuing plate of the set. Since the first plate of each set is the one which carries the figure "0," and since the other figures follow in order on the successive plates, it is apparent that, in order to compose or set up any desired amount, it is merely necessary to lower as many plates in each set as there are units in the amount that is to be set up in the corresponding numerical order. The last plate of each set need never be lowered; consequently it is stationary and has no rod.

The raising of the plates 601 lowered during a preceding operation and the lowering of the plates when setting up the amount of the operation under way is effected by means of a manipulating member 605 (Figure 36) shaped like an inverted trough which extends over the whole width of the plate assembly and rests on a bar 606 within the trough and engaging its underside. The bar 606 is guided vertically by two rods 607 which support it and which slide inside the mounts 604. The trough-like member 605 is provided with lateral outwardly extending lugs 608 which pass between the plates 601 between the adjacent sets (Figures 36 and 51). Each lug 608 is provided with a carry member such as a resilient roller 609 which is inserted in the space between the sets of adjacent plates to engage the edges of all of the plates on either side thereof. The friction between the roller 609 and the edge of the plates 601 is sufficient, during the lowering operation, to carry down along with the rollers 609, those of the plates which are not retained in the upper position.

The descent of the plates is controlled by the following mechanism:

Two pairs of vertical rods 610 (Figures 36 and 51) are pivoted at the top to the bar 606 and at the bottom to two levers 611 adapted to pivot on pivots 612 attached to the supports 613 which are associated with the bedplate 101 of the machine. Each lever 611 has a notch 614 in which engages a roller 615 attached to an arm 616 which is keyed to the shaft 192. Between the two arms 616 and keyed to the shaft 192 is a bell-crank 618 the two arms of which carry the rollers 619, 619' respectively. The rollers 619, 619' cooperate respectively with cams 620, 621 keyed on the shaft 200 which makes one rotation per operation; due to this fact, the lever 618 imparts an oscillation to the shaft 192 during the course of each operation. This oscillating movement of the shaft 192 is transmitted by the arms 616, the rollers 615, the levers 611 and the rods 610 to the trough-like member 605 in the form of a descending movement followed by an ascending movement. The shape of the cams 620, 621 is such that at the start of each operation all of the plates 601 are raised and remain in their upper position until, towards the end of the operation, the trough-like member 605 descends and carries along those plates which have meanwhile been released for this purpose. The release of the plates is effected with the aid of the following mechanism, which is identical for each of the numerical orders.

Below the frame 600 and the lower end of the rods 602 when the plates 601 are in upper position, is disposed a series of juxtaposed slats 622 (Figures 36, 51, 52, 53, 54) one for each pair of sets of plates 601. Each slat 622 carries a pair of horizontal lugs 623 and 624 (Figures 54 and 53) which become positioned below the rods of the two sets of plates of the same numerical order and bear with their free ends on the top surfaces of the horizontal legs of angle irons 625 ranged along the frame 600 there being an angle iron 625 in front of the frame and another one to the rear of the frame. Each slat is guided longitudinally by its lengthwise slots 626 into which engage pins 627, and, in the extreme right slot (Figure 51), a pin 628. At the right-hand end the lower edge of each slat 622 is cut out to form a rack 629.

When a slat 622 is in its extreme left position, as it is in Figures 51 and 53, its lugs 623 and 624 support the rods 602 of all the indicating plates 601 of the two sets of plates of the corresponding numerical order. These plates, of which one set faces the operator and the other set the customer, are therefore all in upper position and make visible the zero inscribed on the first plate of each set. Since the rods 602 of the plates are offset in gradients, as shown in plan view in Figure 53, it is merely necessary to move a slat 622 along with its lugs 623 and 624 to the right a certain number of "steps" (each of which is equal to the distance to which each rod 602 is offset with respect to the following rod) so as to permit as many plates in each of the two sets which this slat controls, to descend to their lower position and uncover the inscription carried by the first non-lowered plate.

Thus, for example, when, in a given numerical order, the figure to be registered is "4," the slat 622 corresponding to the same numerical order must be moved four steps to the right, which will permit lowering of the first four plates carrying the figures 0, 1, 2, 3, respectively, and enable the figure "4" to be visible on the ensuing plate, which is not lowered. Each rack 622 is for this purpose driven from the keyboard through intermediary of the operating mechanism of the same numerical order. Each operating mechanism, in addition to the elements already described, also includes, pivoted at 630 to the plate 248 (Figure 17), a fork-shaped lever 631, the bifurcated end of which cooperates with a pin 633 on a toothed sector 632 pivoting on the shaft 300. The pivotal movement of the lever 631 with respect to the plate 248 is limited by the hub 248' of this plate, which strikes the middle portion of the lever 631, and which is curved so as to encompass the hub. It has already been explained how, during the course of each registering opeartion, this plate 248 turns clockwise an angular distance proportional to the number of units that are to be registered in the numerical order to which it belongs, and how it is brought back to its position of rest at the end of the operation. The movements of the lever 631 are transmitted by the pin 633 and a link 634, to a curved arm 635 integral with a helical gear 636 and adapted to rotate therewith on a shaft 637 (Figures 17 and 51) supported by lugs 638 of the frame 600. The helical gear 636 meshes with a pinion 639 keyed to a small cross shaft 640 likewise supported by the frame 600. The shaft 640 moreover carries a gear 641 that meshes with the rack 629 of the slat 622. The transmission ratios of all these elements are such that the rotation of plate 248, limited by the depression of a key, effects a movement to the right of the slat 622 a number of "steps" equal to the figure carried by the depressed key. Due to this fact, the same number of plates 601 are released in each of the two sets of a pair so as to descend and uncover the ensuing plate on which the same figure becomes visible. The movements of the transmission elements are controlled by the lever 631 and the pin 633 of the toothed sector 632 in the following manner:

The amount of a preceding operation indicated by the plates 601 remains visible until the next operation, during the course of which, the preceding indication disappears, giving place to the new indication. Although the plate 248 has been brought back to its position of rest, at the end of the previous operation, by the means already described, the pin 633 of the sector 632 has been kept in place with the aid of the arrangement used for blocking the slats 622 and which is hereinafter described. Due to this fact, the fork 631 has performed a movement composed of a rotation about the pin 633 and a translatory movement along the line 630—633. When, at the start of the operation that is being performed, the plate 248 again moves in clockwise fashion and carries the forked lever 631 along with it, the latter will perform the aforesaid composite movement but in the reverse direction, until its curved middle portion rests against the hub 248' of the plate 248.

If, starting from this instant, the movement of the plate 248 continues, which will be the case when the figure to be marked up is larger than the figure marked up during the course of the preceding operation, the lever 631 will describe a simple rotation about shaft 300 and move the pin 633 along with the sector 632, rod 634 and the other transmission elements, until the position is reached that corresponds to the new figure that is to be marked up.

If the new figure is equal to the one marked up previously, the lever 631 will stop at the instant in which it bears against the hub 248' of the plate 248.

Finally, if the new figure is smaller than the preceding figure, the lever 631 will stop, along with the plate 248, without coming in contact with the hub 248' thereof. In order to have the indicator mark the new figure it is therefore necessary that the lever 631 be pushed against the hub of plate 248 by bringing the sector 632, along with its pin 633, back to the position which corresponds to the new figure. This is effected by means of a round bar 642 (Figure 17) which extends the whole width of the key compartment and constitutes one of the sides of a rigid frame, of which the other sides are formed of a pair of arms forming a yoke 643 adapted to pivot on the shaft 350. The yoke 643 is connected by an arm 644 (Figure 27) to a fork 654 which carries a roller 646 cooperating with a cam 647 keyed to the camshaft 290. The shape of this cam is such that at the instant when the sectors 240 or 245 (depending on whether a registering or a zero setting operation is involved) have completed their forward movement and are momentarily stopped, the cam 647 imparts to the fork 645 a rapid movement to the left which is translated to the bar 642 as a clockwise oscillation. During the course of this oscillation, the bar 642 strikes the back of the curved portion of all the levers 631 which have come to rest upon being separated from the hub of the corresponding plates 248, and pushes them towards the latter. The levers 631 which partake of this movement carry the pins 633 and the corresponding sectors 632 along and place them in the position corresponding to the figure that is to be marked up for each of them. The corresponding indicator plates 601, being thus freed by the slats 622 controlled by the pin 633, the amount of the operation under way will appear in the indicator at the instant in which the inverted trough shaped member 605 is lowered by the means above described. It is to be noted that the indicator shows not only the amount of a registering operation but also that of the amount removed from a totalizer during a zero setting operation, because the control of the indicator is effected by the participation of the plates 248 when the latter are moved by the toothed sectors 240 (registering operation) or by the toothed sectors 145 (zero setting operation).

In order to neutralize any possible play in the pivots, it is necessary to insure correct alignment of the slats 622 immediately after their movement, before the freed plates 601 have started their descent. Thereupon, until the end of the operation under way and until the start of the ensuing operation, the slats 622 must be locked against all untimely movement. For this purpose an aligning device is provided, driven through agency of the camshaft 290. A bell crank 648 pivoting on shaft 192 (Figures 51, 52) carries at the end of one of its arms a roller 649 that cooperates with a cam 650 keyed on the shaft 290. A spring (not shown) tends to force the roller against the surface of the cam 650. The other arm of the bell crank 648 is connected, through rod 651, to one of the ends of a beam 652

(Figures 51 and 52) suspended so as to pivot on one of the shafts 640 (the seventh one, starting from the right of Figure 51, in the embodiment shown) of the mechanism used for operating the slats 622. At its other end the beam 652 is connected, by a pin 654 in a slot 653, to the aligning device per se. The latter is composed of two levers 655, 655' (Figures 51 and 53) pivoting on screw pivots 656 (Figure 51) screwed into the stationary bars 657 which flank the slats 622 on either side and which carry the pins 627 that serve as guides for the slats 622. At their free end, the levers 655, 655' are connected by a transverse blade 658 which is adapted to engage in the hollows between the teeth 659 provided on the lower face of the slats 622 and of which the pitch corresponds to the step displacement of the slats. When the machine is at rest, the cam 650 presents a circular surface of large radius (Figure 52) to the roller 649, said surface serving to hold the bell crank 648 in such position that the right-hand end of the beam 652 is drawn downwardly and the blade 658 is raised and engages between the teeth 659 of the slats 622 which are, due to this circumstance, correctly aligned and blocked against all movement. At the start of the operation, the cam 650 presents its surface of smaller radius to the roller 649 and, under the action of its aforementioned spring, the bell crank 648 pivots counterclockwise and raises the rod 651 and the beam 652, the other end of which descends and withdraws the blade 658 from between the teeth 659. At this instant the slats 622 start to move, preparatory to marking up the new amount on the indicator. As soon as the slats have been moved, the cam 650 again pushes the lever 648 back and blocks the slats 622, aligning them with precision in their new position, which they retain until the end of the operation, while the plates 601 descend and show up the amount relating to the operation that is being performed.

It has been stated that at the end of the operation, the pins 633 of the sectors 632 are held against all movement by the aligning device. It will be apparent therefore that while the slats 622 are blocked by the blade 658, the transmission elements (including the rods 634 which connect each of these slats to a pin 633) are likewise immobilized, so that the pins 633 and the toothed sectors 632 are effectively blocked until the instant in which the slats 622 must be moved preparatory to setting up the indicator.

The operation of the indicator, as so far described, involves the seven pairs of sets of plates 601 which carry the figures needed for composing the amount of the operations performed. The indicator however has an eighth pair of sets of plates (starting from the right) which do not indicate figures but only the signs identifying the individual totalizers that participate in the operation or designating the nature of the operation.

This pair of sets of plates is consequently not operated by means of the plates 248 which accompany the toothed sectors 240 or 245, but directly through the selecting lever 290, which, as hereinbefore explained, is disposed, previously to each operation, in a position which determines the selection of one of the individual totalizers or of only the day totalizer (for setting it to zero) or when operations are performed without any totalizer as in so-called "making change" or "no sale" operations.

Laterally of the selecting lever 290 (Figure 55) and loose on the central shaft 300 is disposed a toothed sector 632a provided with a pin 633a, and a forked lever 631a, identical to those already described and having the same reference numbers without the suffixes. However, this lever 631a is pivoted at 630 to the body of the selecting lever 290 and is adapted to bear against the hub 690 of this same lever 290. Due to the fact that all of the indicator elements remain blocked, from the end of the preceding operation until the indication pertaining to the operation under way makes its appearance, the connections described may prevent the movement, prior to any operation, of the selecting lever 290, especially when this movement must be in an upward direction. In order not to prevent such movement of the lever 290, the rigid rod 634 connecting the pin 633a to the curved arm 635 is replaced by an extensible rod composed of two parts 634 and 634' (Figure 55) pivoted respectively to the pin 633a and to the arm 635. Each of the parts has a clamping pin 671 and 671' respectively, engaging in slots 672' and 672, respectively of the other portion of the rod, so that the rod 634—634' can be lengthened. When the lever 631 bears against the hub 690 of the selecting lever 290, the latter moves upwardly and carries the lever 631a and the toothed sector 632a along; the portion 634 of the extensible rod moves from right to left, being carried along by the pin 633a.

The pin 671' of the right hand portion 634' of the extensible rod engages in the forked end of a bell crank 673 adapted to pivot on the shaft 192. The other arm of the bell crank 673 is shaped as a hook 674 which is disposed adjacent the cam 620 keyed to the shaft 200. At the start of each operation, when all of the plates of the indicator are raised as explained above, due to the rotation of the cams 620 and 621, a stationary pin 675 attached to the side of cam 620 strikes the hook 674 and tilts the lever 673 in counterclockwise direction. Due to this, the right-hand portion 634' of the extensible rod, previously extended by manipulation of the selecting lever 290, is pushed towards the left so that the pins 671 and 671' reach the bottom of the slots 672' and 672 respectively, and the rod 634 is reduced to its minimum length; furthermore, it is moved entirely to the left, by pivoting the lever 631 and the toothed sector 632a, the pin 633a of which moves in the slot of the lever 631a. Thereupon, during the stoppage of the drive shaft 100, when the bar 642, as above described, pushes back all of the levers 631, it likewise acts on the lever 631a of the mechanism under discussion and brings it back against the hub 690 of the selecting lever, thus placing the toothed sector 632a along with its knob 633a in the position which corresponds to the indicia that the first pair of plates are supposed to exhibit. This indicia will show up at the same time as the amount to which the operation relates, at the instant that the manipulating member 605 is lowered, as above described.

Printing

The printing mechanism (hereinafter called the "printer") intended for printing the amount relating to each operation as well as other useful data, either on a ticket delivered to the customer or on a record strip which remains in the machine, is operated by the toothed sectors 632 which have already been mentioned in discussing the indicator drive arrangement.

The printer, housed in the left portion of the machine, between the partition 104 and a support plate 700 (Figure 56) furnishes the following printed documents:

(1) The ticket that is to be delivered to the customer and on which are printed the name of the firm, the date, the transaction number of the ticket, and the amount registered or cancelled; when the amount registered involves several items, the word "total" and the result of the addition of the various items (called "ticket total") are likewise printed. Alongside the amount is printed a sign identifying the individual totalizer, as A or B, etc. which effected the registering. Likewise, a conventional sign, for example "RI," placed crosswise on a line alongside the amount indicates a zero setting operation, as when obtaining the total registered in an individual totalizer.

(2) The transaction serial number, the amount involved in the operation, and the identifying sign of the totalizer are likewise printed on a record strip which remains inside the machine, in a compartment locked by means of a key.

(3) The cash register herein described makes it possible to use slips filled in by the seller, in lieu of tickets. These slips are cancelled by the machine which prints thereon the date, the transaction number, and the amount, which latter is at the same time registered by the proper totalizer or totalizers.

The types used for printing the amounts of the operations involved are disposed on the periphery of print wheels 702 (Figure 57) each having twenty teeth which carry two series of figures from 0 to 9 and which are arranged to rotate freely on a shaft 701 attached to the partition 104. Each wheel 702 is toothed, and meshes with an intermediate pinion 703 which is loose on a shaft 704 and which meshes in turn with a special gear 705 (Figures 56, 57). The gears 705 are each keyed on the end of a tubular shaft 706, said shafts being sleeved on each other and supported by a shaft 707 carried by the partition 102 and by a journal 708 turning with the shaft in the support plate 700. The journal 708 likewise carries a gear 705, the last one at the left in Figure 56. The support plate 700 is rigidly associated with the left-hand partition 104 by the struts 709 and the shafts 701 and 704 of the gears 702 and 703. The tubes 706 and the shaft 707 (of which all axial movement is prevented by a yoke 711 attached to the plate 700) derive rotational movement from the plate 248 and the toothed sectors 632 of the operating mechanisms previously described (Figure 17). For this purpose, each tubular shaft 706, as well as shaft 707, carries, near its right-hand end, a gear 710 (Figures 56 and 17) that meshes with one of the aforesaid toothed sectors 632. It will be recalled that there is one such sector for each numerical order for the amount that is to be registered by the machine, and that during the course of the operation each sector is brought, by the plate 248 and the forked lever 631, into an angular position which corresponds to the number of units that are to be registered in the numerical order under consideration. For each toothed sector 632 there is a gear 710, and at the other end of the shaft 707 or the tube 706 is a gear 705 the amplitude of rotation of which is therefore determined by the figure that is to be registered and printed. It is to be noted that, like the sectors 632, the gears 705, during the course of successive operations pass from one active position directly to the following one without passing through an intermediate position of rest.

The printed impression on the paper which, along with the inking ribbon, passes beneath the type wheels 702, is obtained by the blows of three hammers 720, 721 and 722 (Figures 60, 61) which strike the paper at the place where the characters are to be printed. Behind the gears 702 and at their lower level is attached a transverse bar 712 (Figures 57 and 60) which rigidly connects the plate 700 to the partition 104 and carries the unchanging text of the label that is to be printed on all the tickets, that is, the text for the bottom of the ticket and the heading thereof. Separation of the ticket to be issued is effected between these two portions of the label so that the legend at the bottom of the ticket will be on the issued ticket while the heading will be printed at the top of the ticket that is to be issued during the following operation. Back of the label type set-up 712 is the dating device, the shaft 713 of which (Figures 59 and 60) is supported by the partition 104 and the plate 700. On this shaft is keyed the first of the type disks 714 which is that representing the tens of the day-of-the-month figure; the other disks, the types of which compose the date, are carried by the right-hand ends of tubular shafts 715 sleeved on each other and on the shaft 713. The opposite ends of the shafts 715 and 713 extend beyond the left-hand wall of the machine (Figure 59) and carry knobs 716 thus permitting the desired date to be set up by hand. The correct alignment of the dating disks is insured by pressure springs 717 (Figure 60) retained by one of their ends in a support 718 attached to the partition 104.

The three hammers 720, 721 and 722 which serve for printing the ticket are disposed beneath a horizontal sheet metal member 719 which separates them from the above described type wheel compartment but said member has apertures to allow the hammers to strike the type that is to be printed. The hammers, each of which has the shape of a prismatic body lagged with resilient material, are attached to levers pivoting about a shaft 725 attached to the partition 104 (Figures 60, 61). The dating hammer 720 is carried by two levers 730 supported at their free end by an operating rod 726 (Figure 60); a similar rod 727 supports the ends of the two levers 731 which carry the stamping hammer 721 and a third operating rod 728 supports the levers 732 of the hammer 722 which prints the amount of the operation. All of these levers are furthermore supported, on the common shaft 725, by interposed rings 734. The hammer 722 has a small independent portion 723 (Figure 61) intended for printing the number of the ticket and adapted to be rendered inoperative, which is necessary when several items are to be registered; these do not receive any number, only the total amount receives one.

The operation of the hammers is effected through agency of the operating rods 726, 727 and 728 which are extended through the partition 104 to the inside of the machine and are there pivoted to the vertical operating rods 740, 741 and 742 respectively (Figures 64 and 66). At their upper end the three rods each have a slot which encompasses the operating shaft 500 which, when operated by the electric motor, makes one revolution. On the shaft 500 is keyed a cam 736 (Figures 64 and 66) which serves for operating the hammers 720, 721 and 722. A second cam 737, likewise keyed to the shaft 500, operates another hammer 724 intended for effecting the printing on the record strip, as hereinafter described.

Each of the three rods 740, 741 and 742 is drawn downwardly by a spring 743 attached in turn to a stationary support 745 common to the three springs. The rod 742 which operates the hammer 722 that prints the amount, carries, near its tip, a pin 746 (Figures 64 and 66) which passes through slots 747 provided in the upper portion of the rods 740 and 741 and on which is attached a roller 748 that cooperates with the cam 736. This cam is of circular shape with a peripheral notch 749 (Figure 64) that comes in front of the roller 748 at the instant when the printing is to take place. At that instant, the roller drops into the notch 749 under the action of spring 743 which pulls the rod 742 down, and the two rods 740 and 741, previously retained by the pin 746 descend at the same time. The pairs of levers 730, 731 and 732 therefore pivot rapidly on their shaft 725 and the three hammers 720, 721 and 722 rapidly strike the type wheels through the paper and the interposed inking ribbon, after which the cam 736 brings all these members back to their position of rest.

During the printing of the items that are to be added up on a ticket, the small partial hammer 723 must remain inoperative; likewise, the hammers 720 and 721 must remain immovable because the order number of the ticket, the firm's name label, and the date must only be printed once, at the same time as the ticket total. The immobilization of the hammers 723, 720, and 721 is effected through the control lever 391 when the latter is placed in its third lowest position or the "multiple item registering" position. It has been explained that, when the lever 310 is moved, the shaft 168 which extends between the partitions 103 and 104 (Figures 6 and 7) receives a rotational movement, the amplitude of which depends on that of the movement of the lever 310. Near the partition 104, that is, near the printing mechanism, the shaft 168 carries a cam 750 (Figures 7 and 65) having a side groove in which engages a pin 751 carried by a link 752. When the control lever is in its third position, the link 752, which is normally in its lower position, is drawn upwardly by the cam 750 and the pin 751. At its lower end the link 752 is pivoted to a lever 753 (Figure 64) adapted to pivot about the pivot 754 attached to the frame 104. When the link 752 is raised, it raises the lever 753 and brings a lug 755 on the free end of the latter below a pin 756 attached to the rod 740 which operates the hammer 720. This pin passes through the rod 740 and engages in the upper portion of an elongated hole in the rod 741 which operates the hammer 721. When (at the instant that printing takes place) the rods 740 and 741 are freed by the notch 749 of the cam 736, they are prevented from descending by the pin 756 which strikes the lug 755; only the rod 742 descends and actuates the hammer 722. In order to avoid printing the number of the ticket during this operation, the partial hammer 723 is arranged to move out of the way, being supported by a rod 729 and guided vertically in the body of the hammer 722 (Figure 57). Close to its end, near the hammer 722, the lever 732 of the latter has a slot 757 (Figure 57) in which slides a pin 758 carried by an arm 733. The latter has a slot that passes over the shaft 725 of the hammers so that the arm 735 may partake of a slight, nearly horizontal movement. The bifurcated left end (Figure 57) of the arm 733 grasps a transverse bar 760 integral with the rod 729 that carries the disappearing hammer 723 while at its opposite end the arm 733 has a notch 761, shaped like an arc of a circle, in which engages a pin 762 of a disconnecting lever 763 (Figures 64 and 68). This lever is adapted to pivot on the tube 706' which is the outer one of the coaxial tubes 706, and its upper arm carries a pin 764 which engages in a profiled slot 765 of the lever 753. When the rod 752 raises the lever 753, the disconnecting lever 763 pivots counterclockwise, its pin 762 pulls the arm 733 to the right (as viewed in Figure 57) so that its pin 758, as it follows the inclination of the slot 757, descends and lowers the arm 733 along with the bar 760 and the hammer 723, a sufficient extent so as to render it inoperative while the large hammer 722 strikes to print the amount.

As has been stated, in addition to the cam 736 the shaft 500 carries a cam 737 which controls the printing of the amounts and the order numbers on a record strip with the aid of a hammer 724 (Figures 60, 64 and 65). This hammer is integral with a lever 766 adapted to pivot on the shaft 754 attached to the partition 104, through which an arm of the lever 766 passes by means of a suitable aperture (Figure 65). The lever 766, which a strong spring 768 tends to tilt counterclockwise, is pivoted to a rod 769, which has a slot in its opposite end encompassing the shaft 500 on which the rod 769 is thus guided. The rod 769 carries a roller 770 which cooperates with the cam 737, the shape of which is identical with that of the cam 736. It will be apparent therefore that when the notch of the cam 737 comes in front of the roller 770, the latter engages therein, and allows the spring 768 to pull the lever 766 abruptly counterclockwise (as viewed in Figure 64) the effect of which is that the hammer 724 strikes the blow necessary for effecting the printing with the aid of the diametrically spaced second series of types carried by the printing wheels 702.

During a zero setting operation, it is necessary, in addition to the amount relating to the operation, to print a distinctive symbol, for example "RI" to indicate that the operation involved is not a registering operation. For this purpose, a rod 773 (Figure 64) is employed which is pivoted at its lower end to a short lever 774 pivoting on the shaft 754. Rod 773 is guided, near its upper and enlarged end, by the shaft 168, of which a circular recess engages in an axial slot of the rod 773. The upper enlarged end of the rod 773 also has a profiled transverse slot in which engages a pin 772 attached to the right hand side (Figure 65) of the cam 759 keyed on the shaft 168. When the latter, at the same time as the control lever 310, is in one of its extreme positions, which is the case when the day totalizer J or one of the individual totalizers A, B, D or E is to be set to zero, the pin 772 lowers the rod 773 and, along with it, a curved bar 775 (Figure 69) which is integral therewith and passes through an aperture in the partition 104. The curved bar 775 is pivoted, by a pivot 776 (Figures 64 and 69), to the first gear 703' (Figure 59) of the intermediate gears 703 which does not mesh with a type wheel 705 (like the other gears 703) but with a special gear 705' (Figure 56) which carries on only one of its teeth the symbol that designates the zero setting operation. When the rod 773 is lowered, this movement is transformed, by wheel 705', into a rotation which brings the type thereof opposite the hammer 722, so that the distinctive symbol that designates the zero setting operation will be printed alongside the amount of the operation.

Above the type wheels 782 (Figure 60) is disposed the paper roller 781 of the record strip. The paper unrolls from a spool 780 sleeved on a stationary shaft 782 and passes over two guide rollers 783 which hold it in horizontal position between the hammer 724 and the wheels 782; thence the paper is guided by other rollers 784 to the take-up spool 785 on which the printed strip is stored, as at 786. Between the adjacent guide rollers 783 and 784 and above the paper is a glass reading prism 787 which makes it possible to read the amount printed; for this purpose, the paper constituting the strip is translucent and the prism is of the total reflection type, its hypothenuse serving as a reading mirror. The spool 786 which receives the printed roll is composed of two semi-cylinders held together by a bolt 788 and a spring 789 which presses the two semi-cylinders against each other. A key 790 having two pins (Figure 63) forming a fork is introduced between the two halves of the spool 785. This key also engages in a slot provided in the end of the shaft of the winding device 791, adapted to rotate in the partition 104, and which extends into the interior of the machine (Figure 65). The key 790 therefore connects the shaft 791 integrally with the spool 785 and makes it possible to rotate the latter, along with the roller 786, manually. In order to remove the printed roll, it is merely necessary to withdraw the key 790, which permits the two halves of the spool to be brought together for withdrawing the roll. The compartment containing the rollers 781 and 786 is separated from the other portions of the printing mechanism by sheet metal members 792 and 793 and is accessible from the exterior by a door (not shown).

The end of the shaft 791 which extends inside the machine through the partition 104 (Figures 63, 64, 65, 67) carries a pawl mechanism which insures the automatic advance of the record strip. This mechanism comprises a cup 794 keyed on the shaft 791, a loose plate 795 (Figure 67) having two semi-segmental cut-out portions, and a cover 796 (Figures 64 and 65) extended by an arm 797 rigidly mounted on the plate 795. In the two cut-out portions of the plate 795 (Figure 67) two rollers 798 are lodged which are subjected to the action of two small springs 799 housed in holes of the plate 795 so that each roller 798 is wedged between the plate and the interior surface of the cup 794. When the plate 795 turns in the direction of the arrow (Figure 67) it therefore carries the cup 794 and the shaft 791 along. Exteriorly of the cup 794 is a stationary block 800 (Figures 64 and 67) having a cut-out portion shaped like an inclined plane in which is lodged a roller 801 which acts as a retaining pawl on the cup 794 when the latter turns in a direction opposite that of the arrow in Figure 67. A small operating arm 802 (Figure 64) which turns on the shaft 791 is pivoted at 803 to a rod 804 the bifurcated end of which encompasses the shaft 500 on which it is thus guided. The rod 804 carries a roller 805 which engages in a groove of a plate 806 keyed to the shaft 500. The shape of the groove is such that, during the rotation of the shaft 500, the rod 804 is first drawn to the right (Figure 64) and then, after the printing is effected, brought back to its initial position, and the arm 802 participates in these movements. A spring 807 hooked to the end of the arm 797 draws the latter towards the pin 803 which connects the arm 802 to the rod 804, so that the arm 797 along with the cover 796 and the plate 795 participate in the movements of the arm 802, under the action of the forward acting spring, and under the thrust of the pin during the return movement. During this return movement, the plate 795 carries the shaft 791 of the spool 786 along and causes the record strip to advance one step.

The uniform advance of the record strip for each printing operation thereon is insured by the following regulating mechanism: Two arms 811 keyed to a shaft 810 (Figures 60, 62, 63) carry a pressure roller 812 which normally bears on the roll of paper 786. The shaft 810 which passes through the partition 104 carries, on the other side (Figures 64, 65), an arm 813 to which is attached a pin 814 which comes into the path of the arm 797. While the latter pivots under the action of spring 807, it encounters the pin 814 and stops while the small arm 802 still continues its rotation. The amplitude of pivotal movement of the arm 797 (and along with it, of the spool 785 of the roll 786) is therefore regulated by the position of the pin 814, that is, by the diameter of the roll 786, and the shape of arm 797 is such that in proportion as the diameter of roll 786 increases, the amplitude of the pivotal movement of the arm 797 decreases so as to advance the paper a fixed amount for each operation.

A safety device prevents the operation of the machine when the paper of the record strip is exhausted. Before the feed roller 781 is a retaining member 816 the arms of which 817 are keyed to a shaft 818 carried by the partition 104 which it traverses. A torsional spring 819 (Figure 63) which surrounds the shaft 818 and is attached to this shaft and to the partition 104, tends to rotate the shaft and thus presses the retaining roller 816 against the roll of paper. At the end of shaft 818 is keyed an arm 820 (Figures 63, 65) pivoted also to a rod 821 connected in turn to an elbow link 822 which, supported by small brackets 823 near the bedplate of the machine, extends the whole length of the latter. Near the other side of the machine, the elbow link 822 is pivoted to a vertical rod 824 (Figures 33, 35) the upper end of which carries a pin 825 that engages in a slot 826 at the lower end of the locking arc 497. The paper supply of the record strip is wound on a supply spool cut in two longitudinally, the two halves being held together by the paper per se. When the latter is nearly exhausted, the two halves of the spool 780 separate and drop.

Due to this, the retaining roller 816 pivots counterclockwise, and passes beneath the shaft 782 of the spool 780. Under the action of its spring 819, the shaft 818 participates in this movement and its arm 820 raises the rod 821 and, through intermediary of the link 822, the rod 824 and the pin 825, the locking arc 497 is likewise raised and blocks the release key 440, thus preventing the starting of the machine.

The strip of paper that furnishes the tickets is constituted, inside the machine, of a large roll 828 carried by a spool 827 (Figures 60 and 62) attached to the partition 104; the roll is retained laterally by a disk 829 attached by a knurled nut 830. The paper coming from roll 828 is guided by the rollers 831 and 832 and then passes, between the table 719 and a sheet metal member 833 which protects it from contact with the inking ribbon 834, to a drive mechanism. This latter comprises a cylinder 835 and two pressure rollers 836 (Figures 60, 61, 63). The drive cylinder 835 is supported at one side by a journal 837 attached to a sheet metal member 838 which supports the table 719, and at the other side in the partition 104 beyond which the shaft of the cylinder carries a pinion 839. This pinion (Figures 61, 64) meshes with a gear 840 loose on a stationary shaft 841. The hub of the gear 840 constitutes a cup in which is lodged a unidirectional roller drive device analogous to that which operates the record strip drive means. Its roller-carrying plate 842 (Figure 65) is integral with a cover that terminates in an arm 843 (Figure 64). A lever 844 pivoting on the shaft 841 is pivoted at 845 to a rod 846. The operation of the drive device being identical with that of the record strip, it suffices to state that the gear 840 is only driven clockwise when the lever 844 pivots, in the same direction, on the shaft 841, which will occur due to the drive exerted by the plate 805 keyed on the shaft 500 and due to its groove 848 in which engages a roller 849 of an arm 850 which pivots on the shaft 150 and is pivoted on the rod 846. At each movement of the gear 840 which meshes with the pinion 839, the drive cylinder 835 turns rapidly through such an angular distance that the paper is advanced the length of one ticket.

The pressure rollers 836 are freely mounted above the cylinder 835, on eccentric studs 851 of a rod 852 pivoted in the partition 104 and in a stationary support 853 (Figures 60, 61, 62, 63). The angular adjustment of the rod 852 therefore makes it possible to modify (as required) the pressure exerted by the rollers 836 on the paper; for this purpose a handle 854 is employed which is keyed to the rod 852 and which terminates in a knob 855 (Figure 61). One of the faces of the support 853 which comes above the paper is bisected and provided with teeth (Figure 63) so that the printed ticket, pushed out of the machine by the drive means 836—835, can be readily torn off.

It is apparent that during the printing of several amounts that are to be added up on the same ticket, the paper must be advanced, during each printing, only the extent of one line and not the whole length of the ticket. This modification in the paper drive means is operated by the control lever 310 which, in order to effect the operation in question, is placed in its third lowest position or multiple item registering position. In this position of the lever 310 the position of the shaft 168 is such that the cam 756 keyed to this shaft holds the rod 752 raised (Figures 64, 65). The lever 753 which the rod operates is therefore raised to the right of its shaft 754 and lowered at the left. At the left-hand end, the lever 753 carries a pin 857 which, normally, is beyond the path of the arm 843 of the paper advancing device, but it comes into its path when it is lowered. In this case the arm 843 is stopped by the pin 857 after one rotation of small amplitude and remains bearing against this pin, due to the action of its spring 858, until the lever 844 returns, the amplitude of oscillation of which does not change, and the pin-pivot 845 of which serves to bring the arm 843 back to its normal position. The slight oscillation thus produced by the arm 843 is sufficient to impart to the ticket paper, through intermediary of gear 840, pinion 839 and the drive cylinder 835, an advancing movement amounting to the space of one line of printing by the wheels 702. Thereupon, after the ticket total is printed, the ticket is moved normally so that its total length is equal to that of an ordinary ticket plus the length occupied by the printing thereon of the additional items.

Zero-setting operations upon the totalizers A, B, J, etc. will cause the issuance of an ordinary ticket except that a distinctive symbol, printed along side the amount (and also on the record strip) indicates that a zero-setting operation was involved.

On the shaft 701 of the type printing wheels 702 and to the right of the latter (Figure 58) are analogous wheels 860 which serve for printing the serial number of each operation, both on the ticket as well as on the record strip. These wheels 860, the twenty teeth of which carry two series of figures from 0 to 9, are operated by a counting mechanism so as to add, for the purpose of each printing, one unit to the previously printed figure. Each wheel 860 is flanked by a ratchet wheel 861, each having two series of ten teeth separated by projections 862 (Figure 57) that are diametrically opposite each other. On the shaft 701 of the wheels is pivoted a frame 863 the two lateral sides of which carry a shaft 864 on which are mounted drive pawls 865 which cooperate with the ratchet wheels 861. The pawls 865 are angularly offset with respect to each other (Figure 57) to an extent slightly greater than the height of one tooth of the whel 861 so that, normally, only the pawl that cooperates with the wheel 860 of the units can act on the latter so as to turn it the length of one tooth and thus add one unit to the figure that is to be printed. When this wheel, after having made a half-revolution, reaches the "9" position, the ensuing wheel 860 (the tens wheel) must advance one unit. At this instant the units pawl 865 is disposed in front of a notch 862 and engages therein, thus permitting the shaft 864 to pivot slightly under the action of a spring 866 and to bring the following pawl 865 (the tens pawl) into engagement with the corresponding wheel 861. During the ensuing oscillating movement of the frame 863 which operates the wheels 861, two of them (the units and the tens wheels) will each be advanced one unit, which will cause the units wheel 860 to pass from the "9" position to the "0" position. When the second wheel 861 likewise reaches the "9" position, its notch 862 will permit the third pawl 865 to act so as to operate the hundreds wheel 860 and so forth until the fourth and last wheel 860. The correct angular position of the wheels 860 is insured by means of pawls 867 pivoting on a small stationary shaft 868 and engaging, under the action of leaf springs 869 attached to the cross bar 712, between the teeth of the wheels 861.

The driving of the gears 861 integral with the type wheels 860 is effected through intermediary of the frame 863. The shaft 864 which carries the pawls 865 and is mounted between the two lateral sides of the frame, is connected to a rod 870 (Figures 59, 64) bent in such fashion as to encompass the gear 840 (Figure 64) and pivoted at the opposite end, at 871, to a guide arm 872 pivoted on the hub of the member 844 of the ticket paper drive means. A hook 873 (Figures 64, 65) freely mounted on the pivot 845 of the member 844 is adapted to hook onto the extension of the pivot shaft 871 between the rod 870 and the arm 872; it is held in this position by a spring 874 tensioned between the same and the member 844. Each oscillation of the member 844

(itself driven by the rod 846), (and also lever 850 and cam 806) is thus transmitted, by the rod 870, to the frame 863 which makes a complete oscillation, and, by the aid of one or more pawls 865, adds one unit to the figure set up by the wheels 860. However, during the printing of several items on a single ticket, these items are not given an order number because such a number is only assigned to the ticket total. The wheels 860 therefore must not be actuated while the items that are to be added are being printed. It has been explained that, while they are being printed, the travel of the arm 843 is limited to a small amplitude by the pin 857 of lever 753 (Figure 64). The arm 843 carries a pin 875 disposed ahead of the hok 873. The adjacent face of the hook is of such shape that, when the arm 843 is stopped while the lever 844 continues its movement, the reaction of the pin 875 raises the hood 873 and disconnects it from the guide arm 872, against the tension of the spring 874. The wheels 861 are therefore not actuated and the number set up by the wheels 860 remains unchanged. When the members above described return to their normal position, which takes place when the ticket total is printed, the hood 873 again hooks onto the pin 875 under the pull of spring 874.

When the type wheels 702 and 860 are brought into position for printing the amount and the serial number, they must be aligned and held in place for the duration of the printing. The alignment is insured by the horizontal bar 878 of a frame 879 (Figures 60, 70) which is adapted to oscillate on the stationary shaft 880 supported by the partition 104 and the support plate 700, so as to cause the bar 878 to engage between the teeth of the wheels 702 and 860. To the frame 879 is attached a rod 881 which passes through a hole in the partition 104 and is pivoted to a rod 882 which connects it to an oscillating lever 883 pivoting about the shaft 884 of a drive cylinder 885 of the ink-ribbon device. The upper arm of the oscillating lever 883 carries a roller 886 which cooperates with a cam 887 keyed to the shaft 500. The shape and the angle of attack of this cam are such that the oscillating lever pivots in counter-clockwise fashion after the wheels 702 and 860 have set up the figures that are to be printed but before the printing per se. The bar 878 is then drawn between the teeth of the wheels 702 and 860 and blocks them in correct alignment until the printing is completed, after which the cam 887 allows the oscillating lever 883 to return to its position of rest, under the action of a coil spring (not shown). The wheels 702 and 860 are thus freed so as to be able to set up the figures that are to be printed during the course of the following operation.

The oscillating lever 883 at the same time drives the inking ribbon 834. This endless ribbon passes over the type printing wheels 702 and 860, as well as their drive wheels 703 and 705 (Figures 57, 60), and is adapted to move by being guided by the rollers 888, 889, and 890. The ribbon 834 passes also over an inking roller 891 covered with a layer of felt soaked with ink, then over the drive roller 885 and finally over a tensioning roller 892. The latter is adapted to rotate between two cheeks 893 subjected to the action of springs 894 that are also attached to a strut 895 connecting the support plate 700 to the partition 104. To the end of shaft 884 which passes through the partition 104 to the interior of the machine is keyed a ratchet wheel 896 (Figure 70) adapted to be operated by a pawl 897 pivoted to the lower arm of the oscillating lever 883 and subjected to the pressure of a spring 898. During each printing operation, when the oscillating lever oscillates so as to align and block the type wheels, the pawl 897 rotates the ratched wheel 896 to the extent of one tooth, so that the cylinder 885 drives the inking ribbon 834 for a corresponding distance.

Thus, as previously recited, the machine is also suitable for cancelling (during each operation), a slip filled out in advance, for example by the salesman. In that case no tickets need be issued. When the machine is to operate in this fashion, the roll 828 of ticket paper is first removed and during each operation the slip is pushed into the slot between the table 719 and the sheet metal paper protector 833 (Figures 60, 62) so as to print the amount involved in the operation, the order number and the date. The hammer 721 carrying the firm label must remain inoperative as also the pressure rollers 836, the latter so as to facilitate passage of the slip. For this purpose the handle 854 is used (Figures 61, 62) the knob 855 of which can be moved axially. The rod 899 of the handle is adapted to engage in one of the two holes "T" or "F" (Figure 62) of the support plate 700, where it is held by the pressure of a spring 900. When the rod 899 engages in the hole "T" which corresponds to the aforesaid operation of the machine when tickets are issued, the eccentricity of the studs 851 of the shaft 852 is directed in a downward direction (Figure 60) and the rollers 836 are pressed against the drive cylinder 835. Moreover, the end of the handle 854 engages in a recess 901 of the table 719 and obstructs the slot between this table and the sheet metal member 833. On the other hand, when the handle is placed in the position "F" so as to operate on sales slips, the end of the handle is withdrawn from the recess 901 and thus unblocks the path of the slips; at the same time the rollers 836 are raised so as not to press on the cylinders 835 and in turn to set free the slot through which the slips pass.

Below the hammer 721 (Figure 60) which must be immobilized, is a lever 902 which is adapted to pivot on a stationary shaft 903. The upper end of the lever 902 is formed as a hook adapted to hook onto a rod 904 integral with the hammer 721. The body of the lever 902 is provided with a curved slot 905 in which engages a pin that carries the end of a curved lever 907 the opposite end of which is keyed to a shaft 908 pivoting between the partition 104 and the sheet metal member 838 which supports the table 719. On the end of shaft 908 which passes through the sheet metal member 838 is attached a small lever 909, the opposite end of which is adapted to obstruct the recess 901 of the table 719. Normally, the lever 909 is lowered by the tail end of the handle 854 (Figure 62) against the action of a spring (not shown) which tends to raise the free end of the lever 909. The pin 906 of the lever 907 is then at the top of the slot 905 (Figure 60) and thus holds the hooked lever 902 separated from the rod 904 of the hammer 721. But if the handle 854 is placed in the position "F," its tail end becomes disengaged from the lever 909 which rises under the action of its spring and causes its shaft 908 to pivot along with the lever 907, the pin 906 of which pulls the lever 902 to the right so as to hook the latter to the rod 904 of the hammer 721 and to immobilize the latter.

The novel and improved cash register described and shown herein affords many advantages not heretofore obtainable in previously known registers. The construction is simplified to such an extent that the number of parts required is greatly reduced, and a large number of the parts used are duplicates. This affords a lowering of manufacturing costs, even though the register can perform all of the operations required, and can easily be modified to perform special operations or computations in accordance with the wishes of customers having special requirements.

The simplicity of construction of the register is illustrated particularly in the manner in which the amount set up on the keyboard is simultaneously inserted into all of the selected totalizers while the shaft 100 is rotating in one direction, merely by the rods 123 which carry the studs 122 that engage the individual totalizer wheels. The studs 122 also act to stop the totalizer wheels at their intended positions, thus preventing them from being carried past these points by their momentum. The novel and simplified construction of the register, in accordance with my invention, also permits a total to be obtained from anyone of the totalizers (except the general totalizer G) with only a single cycle of operation of the machine, during which cycle the selected total is printed and made to appear on the indicator, while the totalizer is returned to zero. The general G totalizer cannot be returned to zero, but the total thereon can be read through the proper window 106 on the front of the machine. It will be understood that these windows 106 will normally be covered by a hinged door or the like which is clocked and can only be opened with a key. By means of the windows 106 the proprietor can read the totals upon the totalizers without resetting them to zero.

The lock 433a prevents anyone from resetting the individual totalizers A, B, D or E to zero, the proprietor generally retaining the key as well as the key to the day totalizer J in his possession so that unauthorized persons cannot reset the totalizers. The same key that fits the register lock 486 can fit the lock 433a and the lock for the cover over the windows 106, so that the totals can only be ready, and the totalizers reset only by authorized personnel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a cash register; a totalizer comprising a series of totalizer wheels of different numerical orders; an operating shaft for said totalizer; means driving said shaft from its position of rest first in one direction and then in the other direction to return it to its rest position in each operating cycle; and individual clutch means between each individual totalizer wheel and said operating shaft, operative to connect said totalizer wheels with said operating shaft during any portion of its movement in either direction.

2. In a cash register; a plurality of totalizers, each totalizer comprising a series of totalizer wheels of different numerical orders; an operating shaft for said totalizer; means rotating said shaft from a position of rest, first in one direction and then in the other direction to return it to its rest position in each operating cycle; individual clutch means between each individual totalizer wheel and said operating shaft, operative to connect said totalizer wheels with said operating shaft during any portion of its rotation in either direction; and selecting means operable to activate at least one of said clutch means.

3. In a cash register; a totalizer comprising a series of totalizer wheels of different numerical orders; an operating shaft for said totalizer; means driving said shaft from its position of rest first in one direction and then in the other direction to return it to rest position in each operating cycle; clutch means between each totalizer wheel and said operating shaft, operative to connect said totalizer wheels with said operating shaft during any portion of its movement in either direction; an amount keyboard; and means responsive to the keys displaced on said keyboard, operative to actuate said clutch means until the amount entered in any order by the displaced keys is registered in the corresponding order disk in said totalizer.

4. In a cash register; an operating shaft; means for rotating said shaft from its rest position, first in one direction, and then back to its rest position in each operating cycle; a totalizer comprising a series of coaxial totalizer wheels of different numerical orders, said wheels having central apertures and said operating shaft passing through said apertures coaxially with said wheels; an amount keyboard having a series of keys for each numerical order to be registered; and clutch means between said operating shaft and each of said totalizer wheels and cooperating with said keyboard, said clutch means being operative to simultaneously transmit through said operating shaft to said totalizer wheels the amount that is set up on said keyboard, during a rotation of said shaft in one direction.

5. In a cash register; an operating shaft; means for rotating said shaft from its rest position, first in one direction and then back to its rest position in each operating cycle; a plurality of coaxial totalizers, each totalizer comprising a series of coaxial totalizer wheels of different numerical orders, said wheels having central apertures and said operating shaft passing through said apertures coaxially with said wheels; an amount keyboard having a series of keys for each numerical order to be registered; and clutch means between said operating shaft and each of said totalizer wheels and cooperating with said keyboard, said clutch means being operative to simultaneously transmit through said operating shaft to said totalizer wheels the amount that is set up on said keyboard during a rotation of said shaft in one direction.

6. In the cash register described in claim 5, one of said totalizers being a day totalizer operable to register therein the sum of the amounts registered in the other totalizers.

7. In the cash register described in claim 5, selecting means operable to render said clutch means selectively operable with respect to at least one of said totalizers.

8. In the cash register described in claim 5, one of said totalizers being a period totalizer operable to register therein the sum of the amounts registered in the other totalizers; an amount indicator, indicator gears driving said indicator;

and means linking said operating shaft with said indicator gears and said period totalizer and operable to actuate said indicator to indicate the total amount registered in said period totalizer in response to a movement of said operating shaft.

9. In the cash register described in claim 8; a printing means connected to said operating shaft and operative to simultaneously print upon a strip of paper or the like the amount appearing in the indicator.

10. In a cash register; a rotative operating shaft operative to transmit to a totalizer the amount set up upon a keyboard; and a series of rods carried by said shaft for rotation therewith and for rotation with respect to said shaft to cause respective driving engagement between said shaft and the registering elements of the totalizer.

11. In a cash register; an operating shaft; means to drive said shaft from a rest position, first in one direction and then back to its rest position; a series of totalizers, each totalizer comprising a series of adjacent disks of different numerical orders arranged upon said shaft in coaxial relationship therewith; clutch means between said shaft and each of said disks, said clutch means being operative, during the rotation of said shaft in one direction, to simultaneously register a number of a numerical order in the corresponding disk of each totalizer; and selecting means operative to render said clutch means inoperative with all the disks of any totalizer.

12. In the cash register described in claim 11, each of said totalizer disks being laterally shiftable from a first position where they cannot be engaged by said clutch means, to a second position where they are engageable by said clutch means; and means for simultaneously laterally shifting all of the disks of a totalizer from said first position to said second position.

13. In the cash register described in claim 12, means operated by said shaft operating means in timed relationship with said shaft, to shift all of the disks of a totalizer after the shaft has completed its rotation in one direction but before it commences its rotation in the other direction.

14. In a cash register, an operating shaft, operable to transfer to registering totalizers the amount set up on an amount keyboard; and also operable to transfer to a printer and an indicator the amount registered in the totalizer; means to rotate said operating shaft in one direction to control registering in the totalizers, and in the other direction to control the transferring of the registered amount from the totalizers; and a rotatable sector controlling the indicator and printer, said operating shaft being connected to rotate said sector, and means causing said sector to be rotated in the same direction to actuate the indicator and printer irrespective of the direction of rotation of said operating shaft.

15. In a cash register, an operating shaft having an operating cycle of a rotative movement in one direction from a position of rest, and then back again, means to drive said shaft through an operating cycle, operating means including an amount keyboard, a totalizer selecting lever, and a control lever shiftable to two positions to control the register for completely registering single item sales, or individual items of multiple item sales, during a cycle of movement of said operating shaft, said control lever being shiftable to a third position for controlling the totalling of multiple item sales; and means actuated by the machine in its operation to return said control lever to the single item sale position after a multiple item totalling operation has been completed.

16. In a cash register, a totalizer comprising a series of adjacent rotatable disks of different numerical orders; an operating shaft operable to rotate from a rest position to a second position and back to said rest position; clutch means connecting each of said disks to said shaft for rotation therewith during its movement in either direction; means operable to shift said disks axially to connect or disconnect said clutch means; and means to rotate said clutch means to connect or disconnect said disks from said operating shaft.

17. In a cash register, a plurality of totalizers, each comprising a series of rotatable disks of different numerical orders; a drive shaft and means to rotate it in one direction; an operating shaft; means connecting said operating shaft to said drive shaft and operable to rotate said operating shaft first in one direction and then in the other direction during movement of said drive shaft in one direction; individual clutch means between each individual totalizer wheel and said operating shaft, operative to connect said totalizer wheels with said operating shaft during any portion of its movement in either direction; and means operable to selectively shift said totalizers axially to render said clutch means effective or ineffective.

18. In the device described in claim 11, said clutch means comprising studs protruding from said operating shaft, and cooperating notches in said rotatable disks, said studs being pivotally connected to said operating shaft for rotative movement out of engagement with said notches; and means operative to normally maintain said studs in said notches.

19. In the device described in claim 18, said last mentioned means comprising springs connected to said studs and operative to resiliently maintain said studs in said notches.

20. In a device of the class described, an operating shaft; means for rotating said shaft from a rest position first in one direction and then in the other direction back to its rest position; a series of rods carried by said shaft adjacent its periphery and parallel to its axis, each of said rods being mounted for independent rotation with respect to said shaft; a series of coaxial totalizer disks of different numerical orders mounted for rotation about the axis of said operating shaft, said shaft and rods passing centrally through said disks; each of said disks comprising a portion forming an annular surface having notches facing said operating shaft; each of said rods having a series of radial studs fixed thereto and spaced along its length so as to be engageable with the notches in all of the disks of the same numerical order; means resiliently holding said rods positioned so that said studs are engaged in said notches; and means operable to rotate said rods with respect to said operating shaft to disengage said studs from the notches.

21. In the device described in claim 20, a series of annular elements arranged upon said operating shaft for coaxial rotation with respect thereto, there being one such annular element for each of said rods; said rods each being provided with another fixed radial stud coplanar with the studs engageable with said disk notches; each of said annular elements having a single notch for cooperation with one of the last mentioned studs on the rod of one numerical order; and means for holding said annular elements against rotation; said single notches being so shaped with respect to their respective studs as to cause rotation of its rod and disengagement of the stud from its notch when an annular element is held stationary while the operating shaft is rotating, the rotation of said rod being effective to disengage the other studs thereon from the totalizer disks; whereby rotation of said annular elements is transmitted to said totalizer disks only when all of the studs on said rods engage the notches of both said annular elements and said totalizer disks.

22. In the device described in claim 21, means operable to shift said totalizer disks axially at the end of the rotation of said operating shaft in one direction, said axial movement being sufficient to displace the notches in the totalizer disks from the planes of rotation of the studs on the rods.

23. In the device described in claim 22, said annular elements having means operative to keep the studs disengaged from the notches, against the action of said resilient means.

24. In the device described in claim 23, said resilient means being effective to rotate said rods and re-engage the studs in the notches of said annular elements during movement of the operating shaft in the reverse direction.

25. In the device described in claim 24, an indicator having a series of numbers for each numerical order corresponding to said rods carried by said operating shaft; and connecting means between said indicator and said annular elements, operable to control the indicator to indicate the amount transferred from the annular elements to the totalizer disks during rotation of the operating shaft in one direction, or the amount transferred to the annular elements from the totalizer disks during rotation of the operating shaft in the other direction.

26. In the device described in claim 25, a printing mechanism comprising a series of rotatable printing disks, one for each of the rods carried by the operating shaft, said printing disks having raised printing numerals thereon; and connecting means between said printing disks and said annular elements, operable to position the printing disks in accordance with said annular elements and said totalizer disks.

27. In the device described in claim 26, a keyboard having a row of keys for each numerical order of an amount to be registered, and means connected to said annular elements and controlled by the keys of said keyboard when depressed, to stop an annular element and hold it against rotation with said operating shaft, whereby the amount registered on a totalizer disk will correspond to the number of the key that has been depressed in any numerical order.

28. In the device described in claim 27, control means operative to select the direction of rotation of said operating shaft away from and towards its position of rest; and means operable to shift the totalizer disks axially so that their notches are not in the planes of rotation of said studs; and means connecting said last mentioned means to said control means to shift said totalizer disks before the operating shaft leaves its position of rest or before it begins its rotation back to that position, depending upon the direction of its rotation away from its position of rest.

29. In the device described in claim 28, said indicator comprising a set of indicia carrying plates in stacked arrangement; narrowable support means operable proportionally to the number to expose; the remaining arrangement carrying on its exterior plates the number or corresponding indicia to expose.

30. In the device described in claim 29, locking means operable to lock the totalizer selecting plate in selected positions; a control lever operable to control the direction of rotation of said operating shaft away from its rest position, when the selected lever is in an unlocked position.

31. In a device of the class described, a totalizer comprising a series of totalizer wheels of different numerical orders; an operating shaft for said totalizer; means for driving said shaft in either direction from its position of rest, and then back to its position of rest in each operating cycle; and clutch means carried by said operating shaft for each totalizer wheel, said clutch means being operative to connect said totalizer wheels with said operating shaft during any portion of its movement in either direction.

32. In the device described in claim 31, said totalizer wheels being mounted coaxially with respect to said operating shaft; a set of annular elements mounted for rotation coaxially with said operating shaft; said clutch means being operative to connect said totalizer wheels to said annular elements for simultaneous rotation with said shaft.

33. In the device described in claim 32, resilient means for maintaining said clutch means in driving engagement with said wheels and elements, said clutch means being operative to overcome said resilient means and simultaneously disengage its driving engagement with said wheels and elements; and means operative to hold said wheels against rotation whereby said clutch means overcomes said resilient means to permit rotation of said operating shaft in either direction independently of said wheels or elements.

34. In a machine of the class described, a rotatable and axially slidably mounted disk having an inner annular surface provided with a radially extending notch; a rotatable operating shaft passing through and coaxial with said disc; a radial stud pivotally mounted on said shaft and operable to engage the notch in said disk; means resiliently holding said stud in engagement with said notch for driving relationship between said disk and said shaft; means operable to hold said disk against rotation to disengage said stud from said notch; and means operable to shift said disk axially in either direction to engage or disengage said stud and notch.

35. In a cash register, a totalizer comprising a series of coaxial adjacent disks of different order numbers; an operating shaft coaxial with said disks and passing therethrough; means for rotating said operating shaft, and clutch means between said shaft and each totalizer disk operative to drive said disks from said shaft, said clutch means being operative to positively stop rotation of said disks while disengaging the connection between said shaft and disks; said clutch means comprising a rod on said shaft, and a stud fixed to said rod, there being one rod and stud for each totalizer disk; said rods being rotatable to engage and disengage said studs with said disks.

36. In a cash register, a totalizer comprising a series of coaxial adjacent disks of different order numbers; an operating shaft coaxial with said disks and passing therethrough; means for rotating said operating shaft and clutch means between said shaft and each totalizer disk operative to drive said disks from said shaft, said clutch means being operative to positively stop rotation of said disks while disengaging the connection between said shaft and disks, said clutch means comprising a rod on said shaft, and a stud fixed to said rod, there being one rod and stud for each totalizer disk; said rods being rotatable to engage and disengage said studs with said disks; an amount indicator; and an amount keyboard, said keyboard being operative to control said clutch means to enter an amount in said totalizer when said operating shaft rotates in one direction; and said totalizer being operative to control said clutch means to transfer to the indicator the amount registered in the totalizer, as said operating shaft rotates in the opposite direction.

MARCEL DEMEULENAERE.

References Cited in the file of this patent

UNITED STATES PATENTS

| Number | Name | Date |
|---|---|---|
| 1,693,279 | Kreider | Nov. 27, 1928 |
| 1,761,651 | Brand | June 3, 1930 |
| 1,817,816 | Green | Aug. 4, 1931 |
| 1,839,371 | Brand | Jan. 5, 1932 |
| 1,869,849 | Helsel | Aug. 2, 1932 |
| 1,870,004 | Green | Aug. 2, 1932 |
| 1,950,475 | Bryce | Mar. 13, 1934 |
| 1,982,722 | Zimmer | Dec. 4, 1934 |
| 2,055,522 | Dicke | Sept. 29, 1936 |
| 2,070,061 | Pasinski | Feb. 9, 1937 |
| 2,115,118 | Neureiter | Apr. 26, 1938 |
| 2,146,292 | Fuller | Feb. 7, 1939 |
| 2,210,021 | Breitling | Aug. 6, 1940 |
| 2,279,858 | Breitling | Apr. 14, 1942 |
| 2,282,120 | Demeulenaere | May 5, 1942 |
| 2,369,252 | Robertson et al. | Feb. 13, 1945 |
| 2,386,364 | Spurlino | Oct. 19, 1945 |
| 2,417,563 | Moser | Mar. 18, 1947 |
| 2,422,186 | Demeulenaere | June 17, 1947 |
| 2,443,652 | Carey | June 22, 1948 |
| 2,485,695 | Carlstrom | Oct. 25, 1949 |

FOREIGN PATENTS

| Number | Country | Date |
|---|---|---|
| 105,047 | Sweden | July 21, 1942 |